(12) United States Patent
Powell et al.

(10) Patent No.: US 10,402,609 B2
(45) Date of Patent: Sep. 3, 2019

(54) BARCODE-READING SYSTEM

(71) Applicant: The Code Corporation, Draper, UT (US)

(72) Inventors: George Powell, Draper, UT (US); Ming Lei, Princeton Junction, NJ (US); Ryan Hoobler, Salt Lake City, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 15/856,964

(22) Filed: Dec. 28, 2017

(65) Prior Publication Data

US 2018/0121692 A1     May 3, 2018

Related U.S. Application Data

(63) Continuation of application No. 15/063,284, filed on Mar. 7, 2016, now Pat. No. 9,858,459, which is a
(Continued)

(51) Int. Cl.
     *G06K 7/00*      (2006.01)
     *G06K 7/10*      (2006.01)
     (Continued)

(52) U.S. Cl.
     CPC ....... *G06K 7/10564* (2013.01); *G06K 7/0004* (2013.01); *G06K 7/089* (2013.01);
(Continued)

(58) Field of Classification Search
     CPC ...... G06F 1/1632; G06K 7/0004; G06K 7/01; G06K 7/015; G06K 7/10; G06K 7/10009;
(Continued)

(56) References Cited

U.S. PATENT DOCUMENTS 7,156,311 B2 *   1/2007   Attia ................. G06F 17/30879
                                              235/462.08
8,162,218 B2    4/2012   Meier
(Continued)

FOREIGN PATENT DOCUMENTS

| | | |
|---|---|---|
| CN | 203838715 U | 9/2014 |
| JP | 2004032507 A | 1/2004 |
| WO | 2015083979 | 6/2015 |

*Primary Examiner* — Seung H Lee
(74) *Attorney, Agent, or Firm* — Timothy P. O'Hagan; Ray Quinney & Nebeker

(57) ABSTRACT

This patent specification describes a barcode-reading enhancement accessory for a mobile device having a barcode-reading capability. The accessory may include an outer case and an inner carriage. A mobile device is encased in the inner carriage, and the combination of the inner carriage and the mobile device may be accommodated in the outer case. The inner carriage is configured to accommodate a mobile device of a particular size such that a mobile device of a different size may be accommodated in the outer case using a different inner carriage. The accessory may also include an optic system to fold an optical path of a field of illumination of a light source of the mobile device and/or a field of view of a camera of the mobile device.

20 Claims, 66 Drawing Sheets

Related U.S. Application Data continuation-in-part of application No. 14/964,434, filed on Dec. 9, 2015, now Pat. No. 9,721,131, and a continuation-in-part of application No. 14/923,027, filed on Oct. 26, 2015, now Pat. No. 9,818,010, and a continuation-in-part of application No. 14/883,103, filed on Oct. 14, 2015, now Pat. No. 9,430,687, and a continuation-in-part of application No. 14/799,464, filed on Jul. 14, 2015, now Pat. No. 9,858,460, and a continuation-in-part of application No. 14/726,765, filed on Jun. 1, 2015, now Pat. No. 9,330,290, and a continuation-in-part of application No. 14/581,821, filed on Dec. 23, 2014, now Pat. No. 10,248,821, and a continuation-in-part of application No. 14/527,645, filed on Oct. 29, 2014, now Pat. No. 10,192,086.

(51) Int. Cl.
*G06K 7/08* (2006.01)
*H02J 7/00* (2006.01)
*H01M 2/10* (2006.01)

(52) U.S. Cl.
CPC ..... *G06K 7/10722* (2013.01); *G06K 7/10732* (2013.01); *G06K 7/10881* (2013.01); *H02J 7/0045* (2013.01); *H01M 2/1022* (2013.01)

(58) Field of Classification Search
CPC ........... G06K 7/10386; G06K 7/10554; G06K 7/10881; G06K 7/1091; G06K 7/14; G06K 9/228; H04M 1/11
See application file for complete search history.

(56) References Cited

U.S. PATENT DOCUMENTS

| | | |
|---|---|---|
| 8,750,637 B2 | 6/2014 | Stroem |
| 9,257,396 B2 | 2/2016 | Uzoh |
| 2003/0025822 A1 | 2/2003 | Shimada |
| 2003/0030923 A1 | 2/2003 | Hsu |
| 2004/0056956 A1 | 3/2004 | Gardiner et al. |
| 2006/0131419 A1 | 6/2006 | Nunnik |
| 2006/0284987 A1 | 12/2006 | Wolf, II |
| 2007/0158220 A1 | 7/2007 | Cleereman et al. |
| 2007/0205287 A1 | 9/2007 | Tien |
| 2008/0142599 A1 | 6/2008 | Benillouche |
| 2012/0061462 A1 | 3/2012 | Shadwell |
| 2013/0109316 A1 | 5/2013 | Lee |
| 2013/0155253 A1 | 6/2013 | Wood |
| 2014/0017955 A1 | 1/2014 | Lo |
| 2014/0171150 A1 | 6/2014 | Hurst et al. |
| 2014/0313377 A1 | 10/2014 | Hampton |
| 2014/0327815 A1 | 11/2014 | Auger |
| 2015/0126244 A1 | 5/2015 | Moran |
| 2015/0126245 A1 | 5/2015 | Barkan et al. |
| 2015/0317503 A1 | 11/2015 | Powell |
| 2016/0012269 A1 | 1/2016 | Kowalczyk et al. |
| 2016/0104016 A1 | 4/2016 | Deal |
| 2016/0104017 A1 | 4/2016 | Deal |
| 2016/0171357 A1 | 6/2016 | Kwon |
| 2016/0180128 A1 | 6/2016 | Utykanski |
| 2016/0180129 A1 | 6/2016 | Utykanski |
| 2016/0188932 A1 | 6/2016 | Powell |
| 2016/0188933 A1 | 6/2016 | Powell |
| 2016/0188934 A1 | 6/2016 | Powell |
| 2016/0232389 A1 | 8/2016 | Gifford |
| 2016/0321483 A1 | 11/2016 | Utykanski |
| 2016/0321485 A1 | 11/2016 | Utykanski |
| 2016/0373629 A1 | 12/2016 | Jung |
| 2017/0004340 A1 | 1/2017 | Powell |

\* cited by examiner

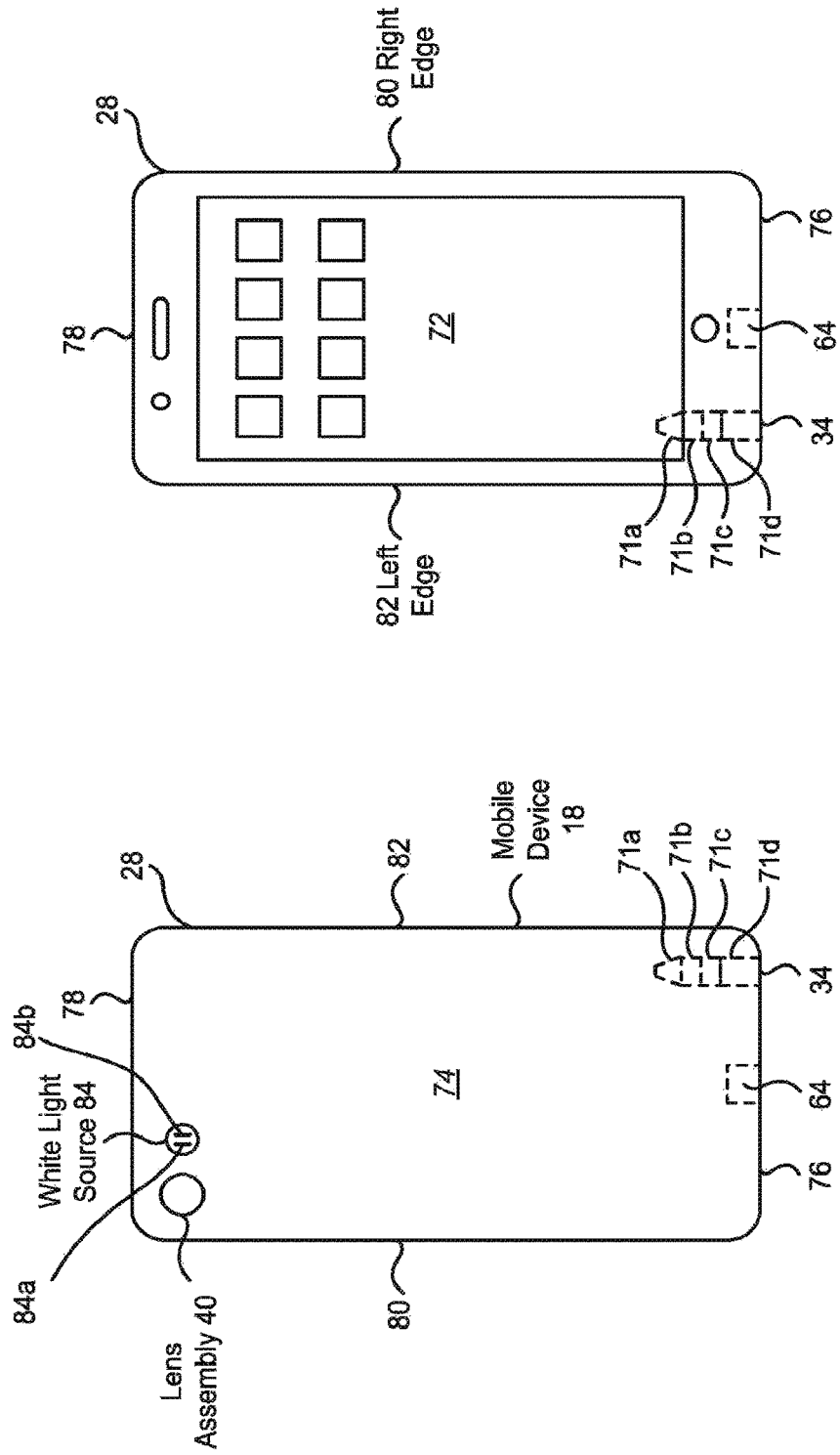

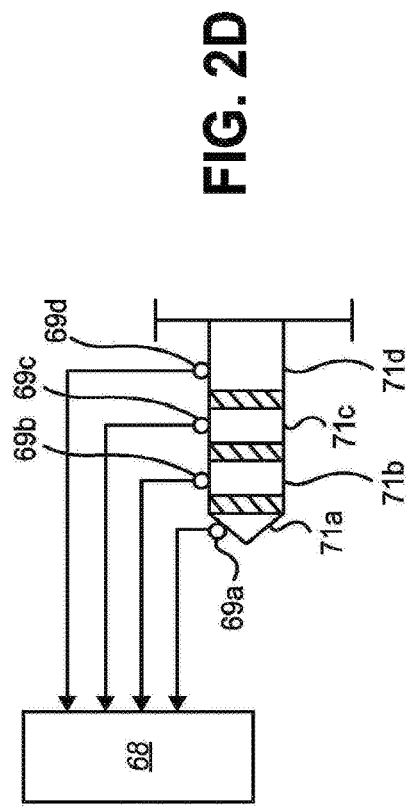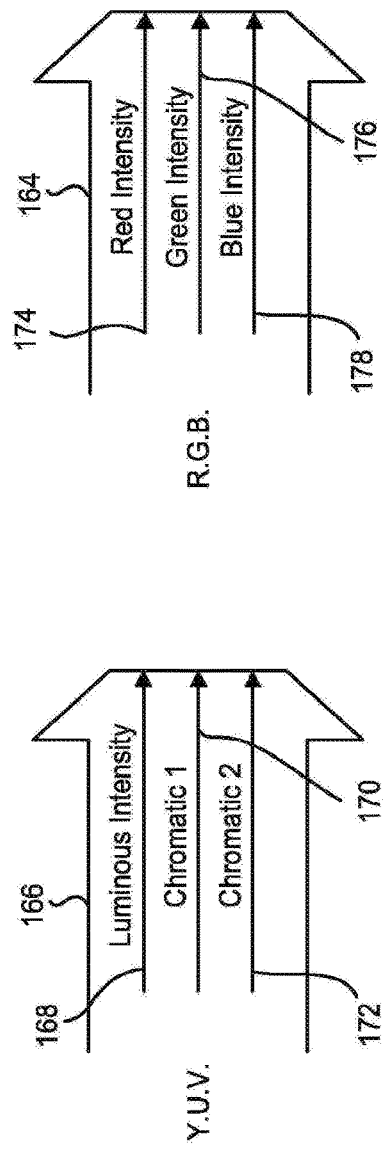

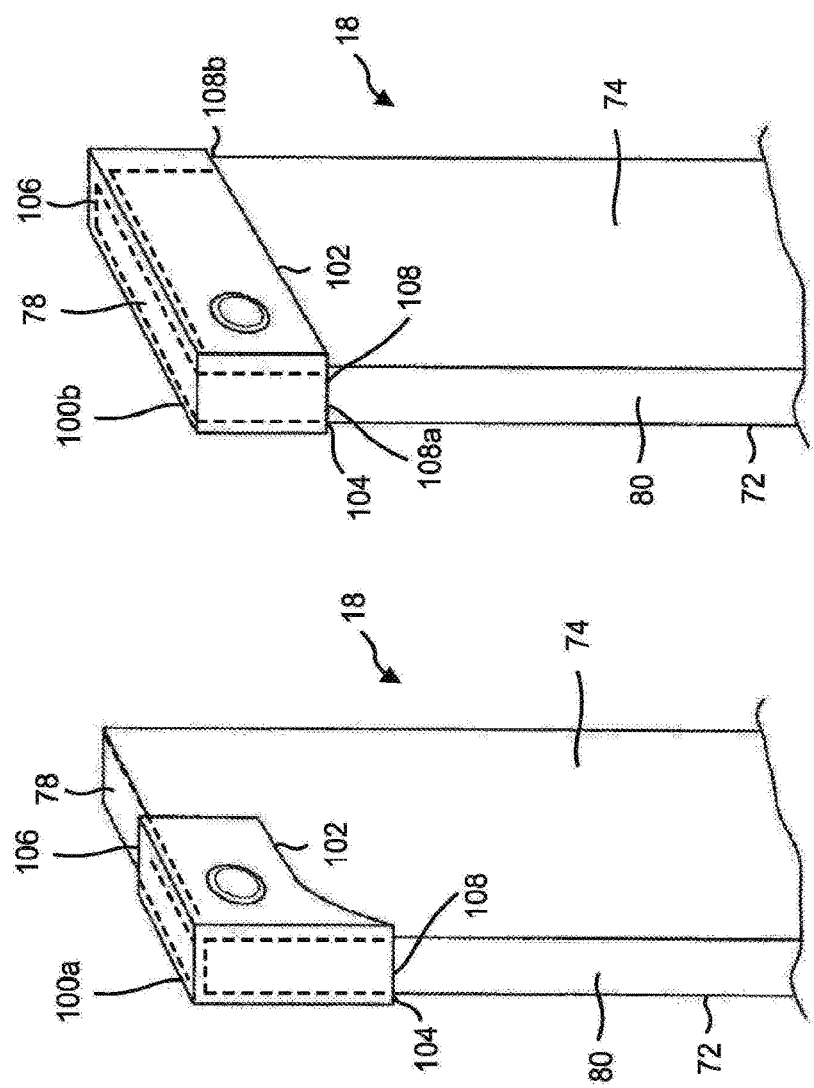

Group ID ～ 740
    License ID ～ 742
        Qty. Purchased : XX ～ 744
        Qty. Used      : YY ～ 746
        Qty. Remaining : ZZ ～ 748

Group ID ～ 750
    License ID ～752a
        Qty. Purchased : Unlimited ～754a
        Qty. In Use     : N/A ～756a
        Qty. Remaining : N/A ～758a
    License ID ～752b
        Qty. Purchased : XX ～754b
        Qty. In Use     : YY
        Qty. Remaining : ZZ
                      756b
                758b

760

| ID | Expire |
|---|---|
| 1 | MM/DD |
| 2 | MM/DD |
| 3 | MM/DD |
| 4 | MM/DD |
| 5 | MM/DD |
| 6 | MM/DD |
| 7 | MM/DD |
| 8 | MM/DD |

BARCODE-READING SYSTEM

RELATED APPLICATIONS

This application is a continuation of U.S. patent application Ser. No. 15/063,284 (the "'284 application"), filed Mar. 7, 2016, and entitled "BARCODE-READING SYSTEM". The '284 application is a continuation-in-part of U.S. patent application Ser. No. 14/964,434, filed Dec. 9, 2015, which issued as U.S. Pat. No. 9,721,131 on Aug. 1, 2017, and entitled "BARCODE-READING SYSTEM".

The '284 application is also a continuation-in-part of U.S. patent application Ser. No. 14/923,027, filed Oct. 26, 2015, which issued as U.S. Pat. No. 9,818,010 on Nov. 14, 2017, and entitled "BARCODE-READING SYSTEM".

The '284 application is also a continuation-in-part of U.S. patent application Ser. No. 14/799,464, filed Jul. 14, 2015, and entitled "A BARCODE-READING SYSTEM".

The '284 application is also a continuation-in-part of U.S. patent application Ser. No. 14/581,821, filed Dec. 23, 2014, and entitled "BARCODE-READING ENHANCEMENT SYSTEM FOR A COMPUTING DEVICE THAT COMPRISES A CAMERA AND AN ILLUMINATION SYSTEM".

The '284 application is also a continuation-in-part of U.S. patent application Ser. No. 14/527,645, filed Oct. 29, 2014, and entitled "BARCODE-READING ENHANCEMENT SYSTEM FOR A COMPUTING DEVICE THAT COMPRISES A CAMERA AND AN ILLUMINATION SYSTEM".

The '284 application is a continuation-in-part of U.S. patent application Ser. No. 14/726,765, filed Jun. 1, 2015, which issued as U.S. Pat. No. 9,330,290 on May 3, 2016, and entitled "BARCODE READER HAVING MULTIPLE ILLUMINATION SYSTEMS AND MULTIPLE SETS OF IMAGING OPTICS", which is incorporated by reference as though set forth herein in its entirety.

The '284 application is a continuation-in-part of U.S. patent application Ser. No. 14/883,103, filed Oct. 14, 2015, which issued as U.S. Pat. No. 9,430,687 on Aug. 30, 2016, and entitled "DIFFUSE BRIGHT FIELD ILLUMINATION SYSTEM FOR A BARCODE READER", which is incorporated by reference as though set forth herein in its entirety.

BACKGROUND

Smartphones and other types of portable, hand-held computing devices, such as tablet computers, are in widespread use today, most often in connection with entertainment, communications and office productivity. Most smartphones include a camera, and applications have been developed for using the camera to read barcodes. In a typical known application an image feed from the camera is displayed on the display screen of the smartphone.

SUMMARY

This patent specification relates generally to a mobile device having barcode-reading capabilities and a barcode-reading enhancement accessory for the mobile device.

In accordance with another embodiment, a barcode-reading system for a mobile device includes a barcode-reading enhancement accessory and a barcode-reading application. The barcode-reading enhancement accessory is secured to the mobile device and the barcode-reading application is stored in a memory of the mobile device and executable by a processor of the mobile device. The mobile device includes a camera for capturing an image of a barcode in a field of view of the camera, a white light source for projecting a field of illumination into the field of view of the camera, the memory, and the processor for executing an operating system and applications stored in the memory.

The barcode-reading enhancement accessory may include at least one optic system. The at least one optic system is within the field of illumination of the white light source and may include an optical substrate. The optical substrate may not be within the field of view of the camera, and may have a front major surface and a back major surface arranged generally perpendicular to an optical axis of the camera, and between which light from the white light source is transferred by total internal reflection primarily in a direction traverse to the optical axis. The optical substrate comprises one or more extraction features configured to extract light from the optical substrate into the field of view of the camera.

The barcode-reading application may include an image capture function for controlling the white light source and the camera to capture the image of the barcode, the image of the barcode being affected by the at least one optic system; a decoder function for receiving the image of the barcode and generating decoded data representing data encoded in the barcode; and a relay function for sending the decoded data to a remote server via a wireless connection established between the mobile device and a network.

The barcode-reading enhancement accessory may further include a dark field illumination system. The dark field illumination system may include at least one dark field illuminator for directing illumination into the field of view of the camera at an angle greater than 45 degrees from the optical axis. The dark field illuminator may be a colored light-emitting diode (LED) with an illumination spectrum narrower than an illumination spectrum of the white light source.

The barcode-reading enhancement accessory may include a battery for powering the dark field illumination system, and the image capture function of the barcode-reading application may further control the dark field illumination system through a communication interface between the mobile device and the barcode-reading enhancement accessory.

The at least one optic system may include a reflective surface within the field of view of the camera for folding the optical axis and the field of view about the optical axis from its initial direction extending generally perpendicular from a back side surface of the mobile device to a folded direction extending into a region around a top side of the mobile device. The front major surface and the back major surface of the optical substrate may be arranged generally perpendicular to the optical axis in the folded direction.

In accordance with another embodiment, a barcode-reading enhancement accessory for securing to a mobile device may include at least one optic system within a field of illumination of a white light source of the mobile device. The optic system may include an optical substrate, not within the field of view of the camera. The optical substrate may have a front major surface and a back major surface arranged generally perpendicular to an optical axis of the camera, and between which light from the white light source is transferred by total internal reflection primarily in a direction traverse to the optical axis. The optical substrate may include one or more extraction features configured to extract light from the optical substrate into the field of view of the camera.

In accordance with another embodiment, a barcode-reading enhancement accessory for a mobile device having a barcode-reading capability may include at least one optic system including an optical substrate and an optical pipe. The optical pipe may be configured to transfer a light from a white light source of the mobile device to the optical substrate. The optical substrate may be configured to inject illumination into a field of view of a camera of the mobile device. The accessory may also include a communication interface for communicating between the barcode-reading enhancement accessory and the mobile device.

In accordance with another embodiment, a barcode-reading system for a mobile device may include a barcode-reading enhancement accessory secured to the mobile device and a barcode-reading application stored in a memory of the mobile device and executable by a processor of the mobile device. The barcode-reading enhancement accessory may include a diffuse bright field illumination system comprising at least one white light source powered by a battery within the barcode-reading enhancement accessory, and an optical substrate comprising a front major surface and a back major surface arranged generally perpendicular to an optical axis of the camera, and between which light introduced from the at least one white light source is transferred by total internal reflection primarily in a direction traverse to the optical axis. The optical substrate may include one or more extraction features configured to extract light from the optical substrate into the field of view of the camera.

The barcode-reading application may include an image capture function for controlling the at least one white light source through a communication interface between the mobile device and the barcode-reading enhancement accessory and controlling the camera to capture an image of a barcode, a decoder function for receiving the image of the barcode and generating decoded data representing data encoded in the barcode, and a relay function for sending the decoded data to a remote server via a wireless connection established between the mobile device and a network.

The barcode-reading enhancement accessory may include a dark field illumination system. The dark field illumination system may include at least one dark field illuminator powered by the battery within the barcode-reading enhancement accessory and directing illumination into the field of view of the camera at an angle greater than 45 degrees from the optical axis.

The barcode-reading enhancement accessory may include a reflective surface within the field of view of the camera for folding the optical axis and the field of view about the optical axis from its initial direction extending generally perpendicular from a back side surface of the mobile device to a folded direction extending into a region around a top side of the mobile device. The front major surface and the back major surface of the optical substrate may be arranged generally perpendicular to the optical axis in the folded direction.

In accordance with another embodiment, a barcode-reading enhancement accessory may include a diffuse bright field illumination system comprising at least one white light source powered by a battery within the barcode-reading enhancement accessory, and an optical substrate, not within the field of view of the camera, having a front major surface and a back major surface arranged generally perpendicular to an optical axis of the camera, and between which light from the at least one white light source is transferred by total internal reflection primarily in a direction traverse to the optical axis. The optical substrate may include one or more extraction features configured to extract light from the optical substrate into the field of view of the camera.

In accordance with another embodiment, a barcode-reading enhancement accessory may include a diffuse bright field illumination system configured to inject an illumination into a field of view of a camera of a mobile device. The diffuse bright field illumination system may include a light source and an optical substrate. The optical substrate may be configured to transfer light generated by the light source and direct illumination into the field of view of the camera. The accessory may also include a communication interface for communicating between the barcode-reading enhancement accessory and the mobile device. The barcode-reading enhancement accessory may include a dark field illumination system including at least one dark field illuminator for directing illumination to a near field of the field of view of the camera. The near field is a field within a predetermined range from a face of the barcode-reading enhancement accessory.

In accordance with another embodiment, a barcode-reading system includes a barcode-reading enhancement accessory and a barcode-reading application. The barcode-reading enhancement accessory is secured to the mobile device, and may include at least one optic system. The at least one optic system may include a dark field illumination system comprising at least one dark field illuminator powered by a battery within the barcode-reading enhancement accessory and directing illumination into the field of view of the camera at an angle greater than 45 degrees from an optical axis of the camera.

The barcode-reading application is stored in a memory of the mobile device and executable by a processor of the mobile device. The barcode-reading application may include an image capture function for controlling the dark field illuminator through a communication interface between the mobile device and the barcode-reading enhancement accessory and controlling the camera to capture an image of a barcode, a decoder function for receiving the image of the barcode and generating decoded data representing data encoded in the barcode, and a relay function for sending the decoded data to a remote server via a wireless connection established between the mobile device and a network.

The at least one optic system may include a reflective surface within the field of view of the camera for folding the optical axis and the field of view about the optical axis from its initial direction extending generally perpendicular from a back side surface of the mobile device to a folded direction extending into a region around a top side of the mobile device. The dark field illumination system may direct illumination into the field of view of the camera at an angle greater than 45 degrees from the optical axis in the folded direction.

In accordance with another embodiment, a barcode-reading enhancement accessory may include at least one optic system. The optic system may include a dark field illumination system comprising a plurality of dark field illuminators powered by a battery within the barcode-reading enhancement accessory and directing illumination into the field of view of the camera at an angle greater than 45 degrees from an optical axis of the camera.

In accordance with another embodiment, a barcode-reading enhancement accessory may include a dark field illumination system including at least one dark field illuminator for directing illumination to a near field of a field of view of the camera. The near field may be a field within a predetermined range from a face of the barcode-reading enhancement accessory. The accessory may include a communication interface for communicating between the barcode-reading enhancement accessory and the mobile device.

BRIEF DESCRIPTION OF THE DRAWINGS

FIGS. 2B and 2C show a back side surface and a face surface of an exemplary mobile device that may be used in the barcode-reading system.

FIG. 2D shows an exemplary tip/ring/ring/sleeve (TRRS) connector.

FIG. 2E shows an image output format.

FIGS. 4A and 4B illustrate an exemplary corner-positioned attachment useful in a barcode-reading enhancement system.

FIG. 22C depicts an exemplary database for recording pre-paid licenses that may have been purchased by an individual, organization, company or other group of users.

DETAILED DESCRIPTION

Figure 1:
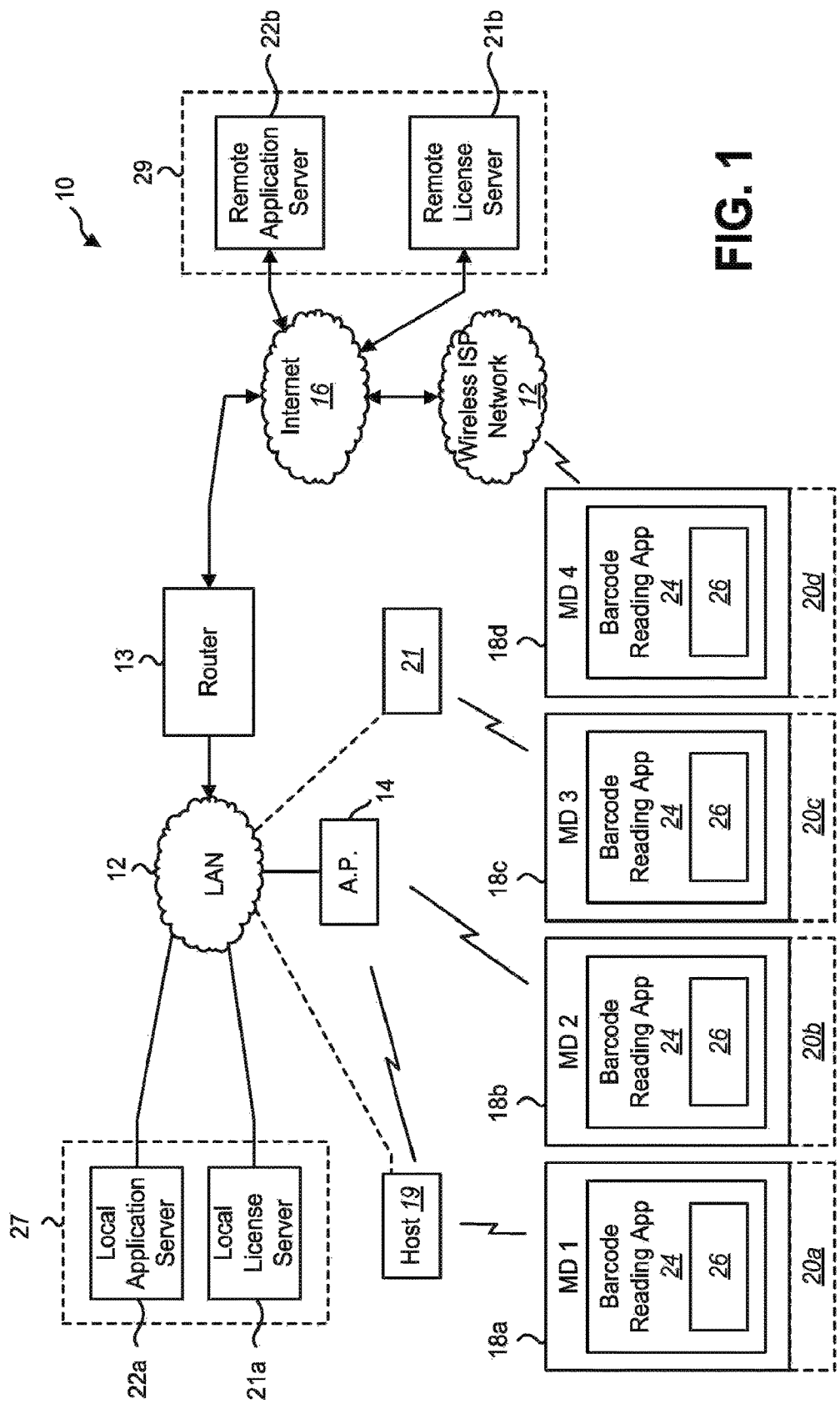
FIG. 1 illustrates an example of a barcode-reading system.

FIG. 1 depicts a system 10 according to one embodiment of the present application wherein mobile devices 18a-18d obtain: i) at least one barcode-reading application 24 from an application server 22a or 22b; and ii) obtain licensing (e.g., a license key 26) necessary for the operation of the at least one barcode-reading application 24 on the mobile devices 18a-18d from a licensing server 21a or 21b.

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet."

The application server may be, for example, a local application server 22a or a remote application server 22b. Similarly, the license server may be a local license server 21a or a remote license server 21b. The application server and the license server may operate on distinct hardware or may operate on the same hardware server. For example, the local application server 22a and the local license server 21a may operate on the same hardware server 27 or on distinct hardware servers, each coupled to a local area network (LAN) 12. Similarly, the remote application server 22b and the remote license server 21b may operate on the same hardware server 29 or on distinct hardware servers, each coupled to the Internet 16.

The system 10 may include a LAN 12 to which each of the local application server 22a and the local license server 21a are connected. The LAN 12 may further include at least one wireless access point 14 enabling LAN communications with mobile devices (for example, mobile devices 18b and 18c) as well as other computing systems such as a host computer 19 and/or a charging station 21 (e.g., a station for providing power to the mobile device 18 for charging its battery).

The LAN 12 may be coupled to the Internet 16 via a router 13. Although FIG. 1 depicts the LAN 12 coupled to the Internet 16 via a single router 13, such connections may employ multiple routers and firewall systems, including demilitarized zone (DMZ) networks.

Figure 2A:
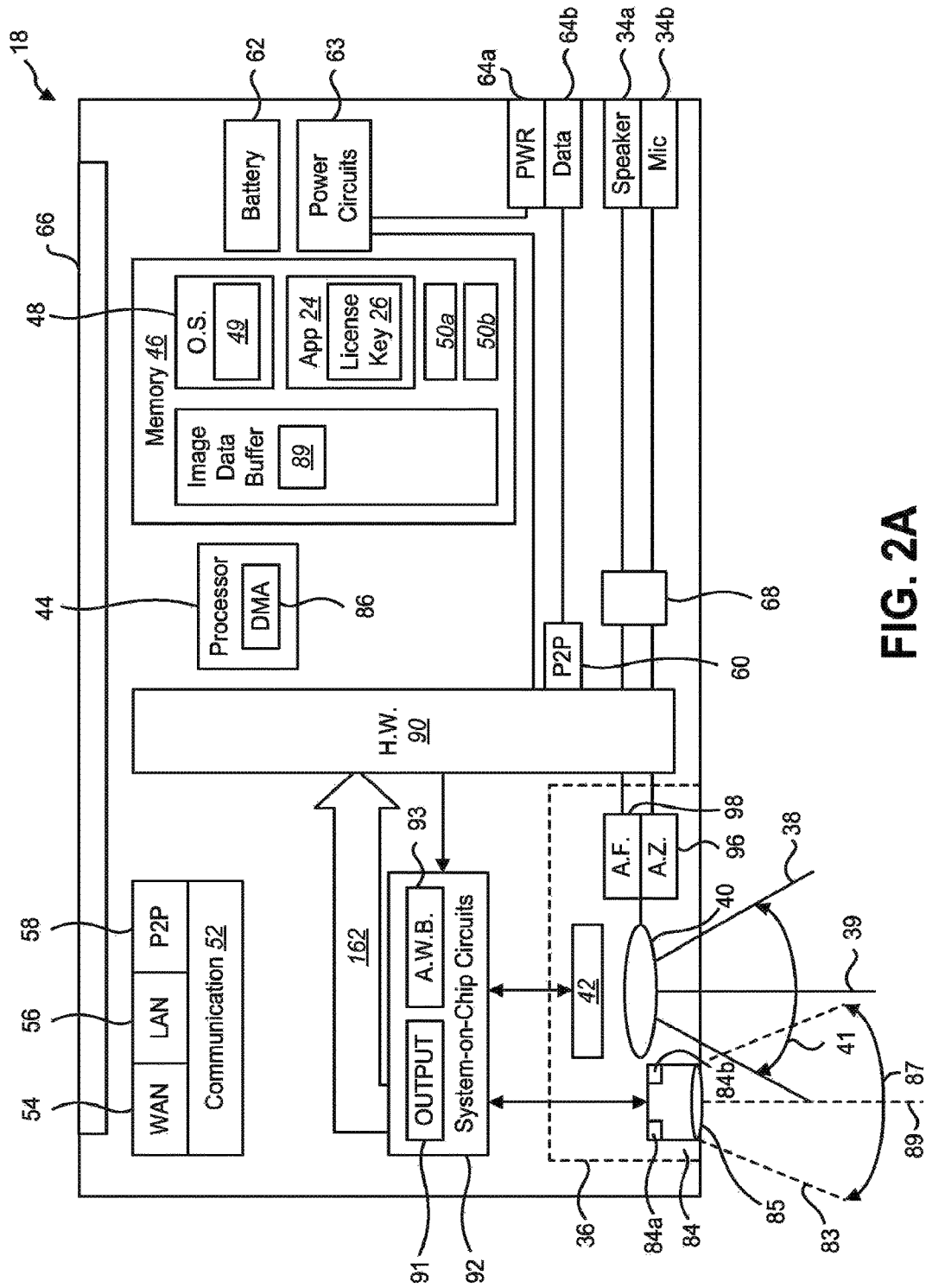
FIG. 2A is a block diagram of an exemplary mobile device useful in a barcode-reading system.

Referring to FIG. 2A in conjunction with FIG. 1, each of the mobile devices 18a-18d may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize Wi-Fi™ (IEEE 802.11) or similar wireless local area communication protocols for communication with a wireless access point 14 of a wireless portion of a LAN 12, such that the mobile device itself may be an addressable endpoint on the LAN 12, i.e., the mobile device may be assigned an IP address and may be capable of IP communications with other devices over the LAN 12 using IP protocols such as Transmission Connection Protocol (TCP), Uniform Datagram Protocol (UDP), etc. The wireless access point 14 and the LAN communications module 56 may function in accordance with any known wireless communications protocol, including but not limited to the IEEE 802.11 standards, which are sometimes referred to as Wi-Fi™ As will be discussed in more detail, a mobile device, 18b for example, utilizing its LAN communications module 56 may obtain at least one barcode-reading application 24 from an application server 22a or 22b and its license key from a license server 21a or 21b via the LAN 12 and, as applicable, the Internet 16.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the mobile device such that the mobile device may be capable of IP communications with other devices over the wireless ISP network 17 using IP protocols such as TCP, UDP, or the like.

Remote devices (e.g., devices coupled to the Internet 16) may be logically connected to the LAN 12 using a Virtual Private Network (VPN) technology. As such, a mobile device, 18d for example, coupled to communicate with the wireless ISP network 17 utilizing its WAN communications module 54 may, utilizing a VPN technology, be an endpoint on the LAN 12. As such, a mobile device 18 may obtain at least one barcode-reading application 24 from the remote application server 22b (or local application server 22a utilizing VPN technologies) and its license key 26 from the remote license server 21b (or the local license server 21a utilizing VPN technologies) via the wireless ISP network 17 and, as applicable, the Internet 16.

The wireless point-to-point communication interface 58 may form a wireless point-to-point communication link with another compatible system, such as a host computer 19 and/or charging station 21, utilizing Bluetooth® or similar wireless point-to-point communication protocols. The host computer 19 and/or charging station 21 in turn includes a wired and/or wireless LAN interface for communication with a switch (not shown) or the wireless access point 14 of the LAN 12 such that the host computer 19 may be an addressable endpoint on the LAN 12. As will be discussed in more detail, a mobile device, 18a or 18c for example, coupled to communicate with the host computer 19 utilizing its wireless point-to-point communication interface 58 may obtain at least one barcode-reading application 24 from an application server 22a or 22b and its license key 26 from a license server 21a or 21b via its point-to-point connection to the host computer 19 and/or charging station 21 which communicates with the servers via the LAN 12 and, as applicable the Internet 16.

FIGS. 2B and 2C illustrate a back surface and a face surface of an exemplary mobile device 18, respectively. Referring to FIGS. 2B and 2C, the mobile device 18 may comprise a housing 28 with a plurality of external surfaces such as a face surface 72 and a back surface 74 which is generally parallel to the face surface 72 and separated from the face surface 72 by four (4) edge surfaces (each orthogonal to, and extending about the perimeter of, both the face surface 72 and the back surface 74, including a bottom edge 76, a top edge 78 (which is parallel to the bottom edge 76), a right edge 80 and a left edge 82 (which is parallel to the right edge 80).

The face surface 72 may include a user interface such as a capacitive multi-touch display screen 66 (e.g., with a glass cover), which is shown in FIG. 2A, and may define the face surface 72 of the housing 28.

Referring to FIG. 2C, the nomenclature bottom edge 76, top edge 78, right edge 80, and left edge 82 have been chosen because they correspond to the bottom, top, right, and left sides of the display screen 66 of the face surface when the display screen 66 is operated in a portrait mode. Each of the right edge 80 and the left edge 82 may be of equal length and longer than each of the bottom edge 76 and the top edge 78 (which may also be of equal length).

Referring to FIG. 2A, the mobile device 18 may include a processor 44 and a memory 46. The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, the barcode-reading application 24, the license key 26, one or more other applications 50a, 50b, and a data buffer including an image data buffer 89. In operation, the processor 44 may execute instructions embodied in the operating system 48, the barcode-reading application 24, and each of the other applications 50a, 50b. Hardware circuits 90 interface the processor 44 with peripheral systems including, but not limited to, a (multi-touch) display screen 66, a wireless communication system 52, a hardwired point-to-point communication interface 60, an audio interface 68, a camera assembly 36, and a white light source 84 (e.g., an illuminator or a flash for utilizing the camera assembly 36 for photography).

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector 64 such as a USB connector or an Apple® Lightning Connector®).

The audio interface 68 may include circuits for generating analog audio signals on a speaker connector 34a and receiving analog microphone input on a microphone connector 34b. The speaker connector 34a and the microphone connector 34b may be embodied as a single tip/ring/ring/sleeve (TRRS) connector typically referred to as a head-set connector. FIG. 2D shows an exemplary (female) TRRS connector. The TRRS connector includes four contacts: tip contact 71a, ring 1 contact 71b, ring 2 contact 71c, and sleeve contact 71d, along the side of recesses 69a, 69b, 69c, and 69d, which contact the corresponding contacts of the (male) TRRS connector of an audio jack when inserted within the recess. Typically the contacts are for left audio, right audio, microphone, and ground in the order of tip, ring 1, ring 2, and sleeve. A microphone input signal may be a potential difference between the ground contact (sleeve) and the microphone contact (ring 2) generated by a microphone coupled thereto.

Referring to FIG. 2A, the camera assembly 36 may include a (color) photo sensor 42 (i.e., an array of image sensors) positioned parallel to each of the face surface 72 and the back surface 74 and a lens assembly 40 with an optical axis 39 orthogonal to the photo sensor 42 and defining a center line of a camera field of view 38 extending outward from the back surface 74 of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have an angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera assembly 36 may further include an auto zoom module 96 and/or an autofocus module 98 which may serve to control an optical zoom setting and/or autofocus setting of the camera, respectively. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the photo sensor 42.

The photo sensor 42 may be coupled to system-on-chip circuits 92 which include an output module 91 and an auto-white balance module 93. In one embodiment, the output module 91 may control the operation of the photo sensor 42 (e.g., exposure, gain, and coupling of pixels to analog-to-digital (A/D) converters for image read out), format the digital intensity values of each pixel of the photo sensor 42 for color image output, and make the color image output available for writing to the image data buffer 89.

In another embodiment, the output module 91 may perform image processing on images captured by the photo sensor 42. Control of the photo sensor 42 and image pre-processing which may be performed by the system on chip circuits 92 are described in more detail in U.S. patent application Ser. No. 14/717,112, entitled "BARCODE READER" and filed on May 20, 2015, which is hereby incorporated by reference in its entirety.

The auto-white balance module 93 may perform auto-white balance algorithms on the captured image to enhance the quality of color photographs captured by the photo sensor 42 under different illumination conditions. The digital image output 162 (which may be the color image or a result of processing the image one or more times in accordance with the teachings of U.S. patent application Ser. No. 14/717,112) may be written to the image data buffer 89. The mobile device 18 may include a direct memory access (DMA) system 86 which may be a part of the processor 44. The DMA 86 provides for direct writing of the digital image output 162 from the camera assembly 36 to the image data buffer 89.

The camera assembly 36 may further include a white light source 84. The white light source 84 may include one or more LEDs 84a, 84b controlled by the system-on-chip circuits 92.

In an exemplary embodiment, a first LED 84a may be a white LED. The color of a white LED is typically described using a Kelvin temperature scale with 1500° K representing a warm color "white," such as that of candlelight, and 9500° K representing a cool color "white," such as that of a blue sky. The exemplary white LED may be within this range. Alternatively, the exemplary white LED may have a color between 4000° K and 7000° K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface 74 and having an illumination axis 88 perpendicular to the back surface 74 and an illumination angle 87 which substantially coincides with the field of view 38 of the camera assembly 36. In operation, the system-on-chip circuits 92 may control each LED 84a, 84b independently; and control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

FIG. 2E shows two exemplary image output formats. The image output format from the photo sensor 42 (or from the output module 91 prior to any image processing as described in U.S. patent application Ser. No. 14/717,112) may be in either R.G.B. format 164 and/or Y.U.V format 166. The Y.U.V. format 166 may include, for each pixel, a luminous intensity 168 indicative of the overall intensity of light incident on the pixel during the exposure period, a first chromatic 170 representative of a first dimension of color of the light incident on the pixel during the exposure period, and a second chromatic 172 representative of a second dimension of color incident on the pixel during the exposure period.

The R.G.B. format 164 may include, for each pixel, a red intensity value 174 indicating the intensity of red light incident on the pixel during the exposure period, a green intensity value 176 indicating the intensity of green light incident on the pixel during the exposure period, and a blue intensity value 178 indicating the intensity of blue light incident on the pixel during the exposure period.

Returning to FIG. 2A, the mobile device 18 may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

Referring to FIG. 2A in conjunction with FIG. 1, in an exemplary embodiment, the operating system 48 may include an application retrieval system 49 which obtains the barcode-reading application 24 and the applications 50a, 50b from the application server 22a or 22b. In one embodiment, the operation of the application retrieval system 49, which may obtain the barcode-reading application 24 and the other applications 50a, 50b from the application server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application server 22a or 22b.

Figure 3A:
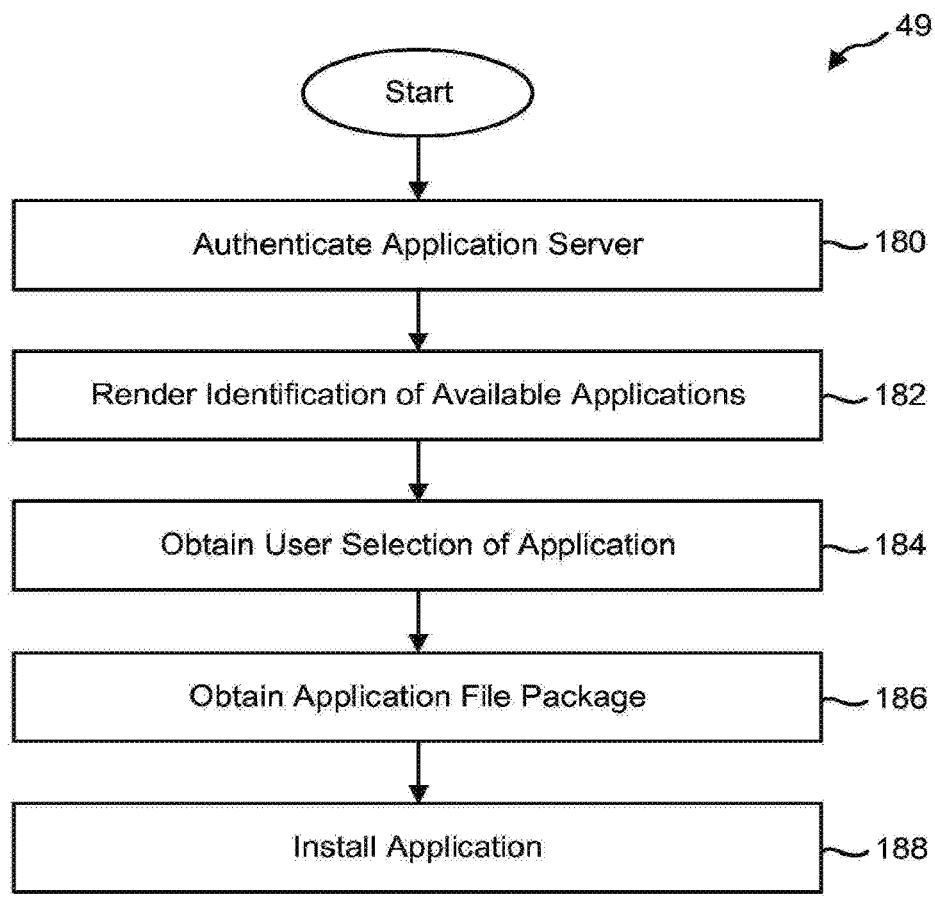
FIG. 3A is a flow diagram of an exemplary process for an operation of an application retrieval system.

FIG. 3A is a flow diagram of an exemplary process for the operation of the application retrieval system 49. Step 180 represents the application retrieval system 49 of the mobile device 18 establishing a secure connection to the application server 22a or 22b over the LAN 12, the wireless ISP network 17 and/or the Internet 16 and authenticating the application server 22a, 22b (i.e., mutual authentication between the mobile device and the application server). The mutual authentication may be established by using any conventional authentication protocol.

Step 182 represents rendering, on the display screen 66 of the mobile device 18, identification of applications which are available to the mobile device 18 for downloading. Step 184 represents obtaining user selection of an application to download.

Step 186 represents obtaining an application file package (e.g., an install package) from the application server 22a or 22*b*. The application file package may be temporarily stored in the memory 46 of the mobile device 18.

Step 188 represents installing the application. The installation process may include un-packing the install package and writing an executable application 50 to the memory 46.

Figure 3B:
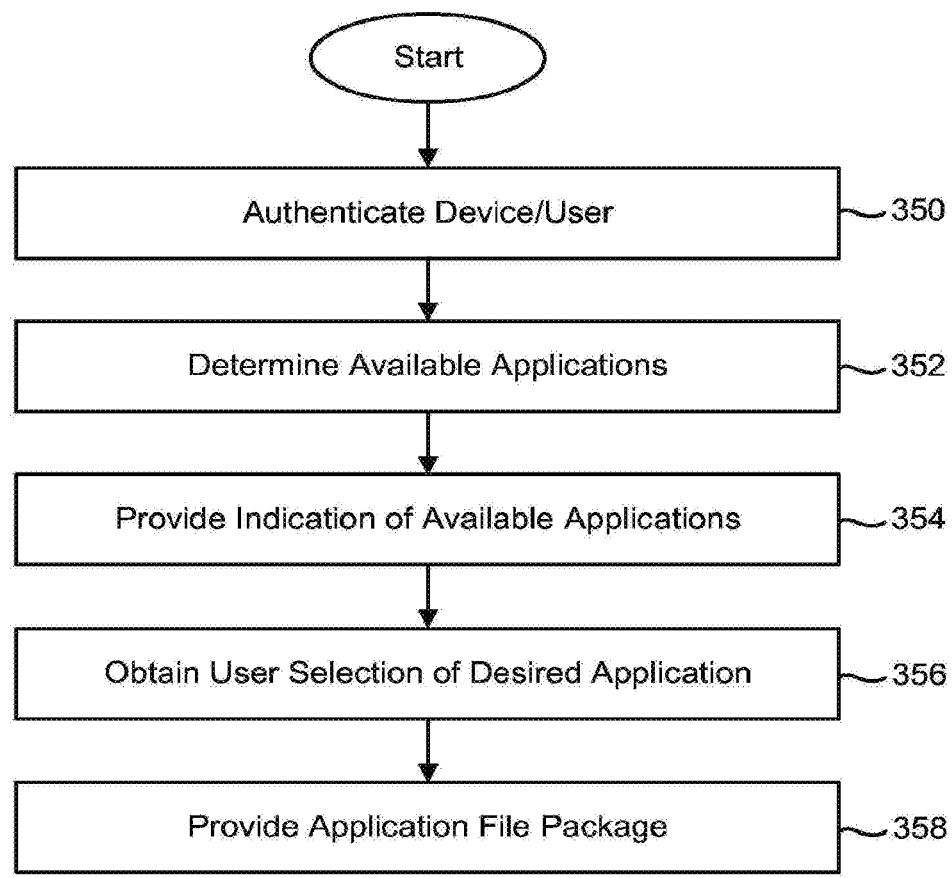
FIG. 3B is a flow diagram depicting an exemplary process for an operation of an application server.

FIG. 3B is a flow diagram depicting an exemplary process for operation of an application server 22*a*, 22*b*. Step 350 represents the application server 22*a*, 22*b* establishing a secure connection with the mobile device 18 over the LAN 12, the wireless ISP network 17, and/or the Internet 16 and authenticating the mobile device 18 and/or the user of the mobile device 18. Authenticating the user of the mobile device 18 may include: i) authenticating the individual to which the mobile device 18 is assigned or the individual using the mobile device 18, utilizing a combination of a user ID and a password or similar schemes for authenticating an individual, and/or ii) authenticating an organization, company, or other group of users to which the mobile device 18 is assigned, utilizing a combination of a user ID and a password or other similar schemes for identifying whether the mobile device 18 has been assigned to the organization, company, or group and authenticating the assignment. The user ID may be unique to each mobile device 18 or common for all mobile devices 18 assigned to the organization, company, or group.

Step 352 represents the application server 22*a*, 22*b* determining a plurality of one or more applications (the barcode-reading application 24, applications 50*a*, 50*b*, etc.) available for download based on the individual, organization, company, or other group to which the mobile device 18 is assigned.

Figure 3C:
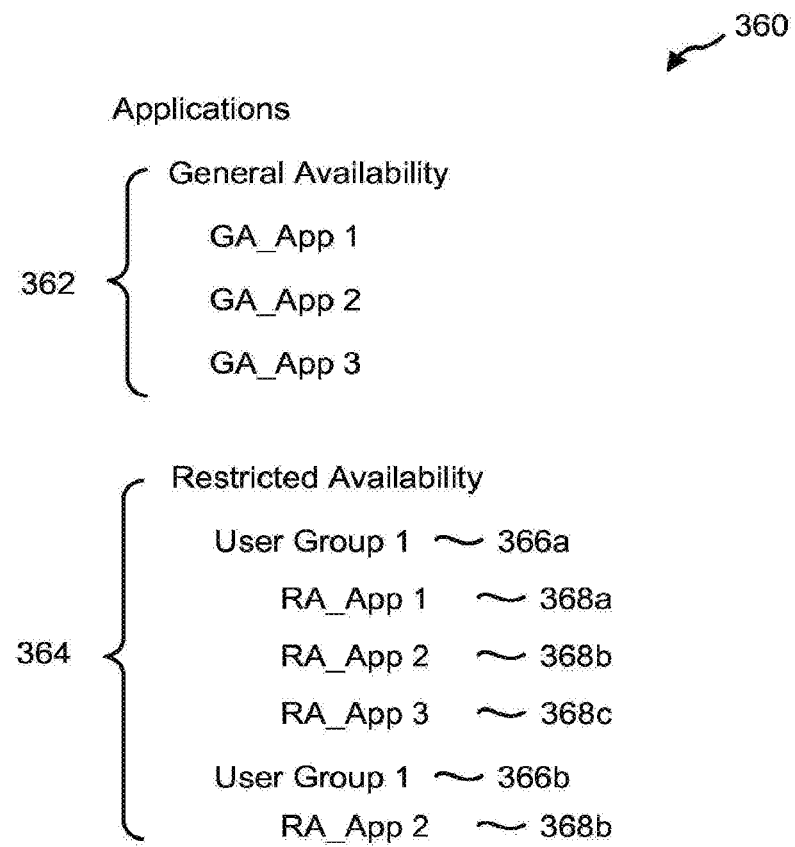
FIG. 3C shows an exemplary structure of a database of applications for downloading.

Turning briefly to FIG. 3C, the application server 22*a*, 22*b* may contain, or have access to, a database 360 which identifies generally available applications 362 which are available to any mobile device 18 without regard to the identification of the user, organization, company, or group to which the mobile device 18 is assigned; and restricted applications 364 which are available only to certain individuals, organizations, companies, and groups. For restricted applications 364, the database 360 may associate each user group 366*a*, 366*b* with identification of those restricted applications 368 available to that user group 366*a*, 366*b*. Each user group may be an individual, organization, company, or other group. For example, user group 1 366*a* may have access to restricted applications 368*a*, 368*b*, and 368*c*, and user group 2 366*b* may have access to restricted application 368*b*. In each case these restricted applications may be applications written custom for the user group (and therefore are not made available to other user groups) or may be licensed to the user group (and therefore made available to those user groups which obtained a license for the application).

Returning to FIG. 3B, step 354 represents the application server 22*a*, 22*b* providing an indication of the available applications to the mobile device 18. The available applications may include any of the generally available applications 362 and/or the restricted applications 364. The indication of the available applications may include, for each application, a display screen icon representing the application. The indication of available applications may not include all available applications but may include only those available applications within parameters established by the user, for example available applications which meet search criteria provided by the user. As such, step 354 may include making a search function available to the mobile device 18, obtaining search criteria or search terms from the user of the mobile device 18, and selecting matching applications that meet the search criteria from the applications available to the individual, organization, company, or group.

Step 356 represents the application server 22*a*, 22*b* obtaining a user selection of a desired application. The desired application may be one of the available applications indicated to the user at step 354.

Step 358 represents the application server 22*a*, 22*b* providing an application file package for the desired application to the mobile device 18. The application file package may be provided to the application retrieval system 49 of the mobile device 18 which is provided for writing the file package to a non-volatile memory and unpacking and loading the contents of the file package to generate instructions which, when loaded to a memory, may be executed by the processor 44.

Certain applications such as the barcode-reading application 24 may: i) require a license key from a license server 21*a*, 21*b* to enable operation of the application, ii) operate in a base mode of operation without a license key but require a license key from a license server 21*a*, 21*b* to enable at least one enhanced function to operate in an enhanced mode of operation, and/or iii) require a license key from a license server 21*a*, 21*b* to continue operating, or continue operating in the enhanced mode of operation, following the passage of time or following a threshold level of usage based on the time and/or the quantity of instances with which certain functions were performed (such as the quantity of decoding a barcode of a certain symbology or symbologies).

The at least one enhanced function may be a function of decoding a barcode symbology that the barcode-reading application 24 (e.g., the decoder) is restricted from decoding in the base mode of operation. Alternatively or additionally, the at least one enhanced function may be a function of decoding multiple barcodes in sequence at a rate that is faster than a rate at which the barcode-reading application 24 (e.g., the decoder) can decode multiple barcodes in sequence in the base mode of operation. Alternatively or additionally, the at least one enhanced function may be a function of decoding a quantity of barcodes of a particular symbology that exceeds a restricted threshold quantity of barcodes of the particular symbology that the barcode-reading application 24 (e.g., the decoder) can decode in the base mode of operation.

Alternatively or additionally, the at least one enhanced function may remove a demonstration restriction function (i.e., a demonstration factor that makes output of decoded data useful for demonstration purposes only) under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced function may enable at least one enhanced image processing function that improves an ability to decode an image of a barcode and is not operable when the decoder operates in the base mode of operation. The enhanced image processing function may include preforming additional image processing algorithms which alter the image captured by the camera assembly 36 prior to execution of the algorithms which attempt to decode a barcode depicted within the image.

In accordance with another embodiment, the base mode of operation may include a base decoding mode of operation and a demonstration mode of operation. In the base decoding mode of operation, the barcode-reading application 24 may drive the camera assembly 36 to capture an image of a barcode and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology.

In the demonstration mode of operation, the barcode-reading application 24 may apply at least one enhanced barcode-reading function to decode the barcode, and perform at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device 18.

The barcode-reading application 24 may perform an upgrade function in the demonstration mode of operation. The upgrade function may enable user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may communicate to the licensing server 21a, 21b one of: i) a unique identification code of the mobile device 18, or ii) a user identification code identifying a controller of the mobile device 18.

In accordance with another embodiment, the barcode-reading application 24 (e.g., a decoder application) running on the processor 44 of the mobile device 18 may be configured to control the camera assembly 36 of the mobile device 18 to capture an image of a barcode. The image of the barcode may be affected by at least one optic system of the camera assembly 36. The decoder application may utilize a base decoder function for attempting to decode a barcode if an enhanced decoder mode has not been authorized for the mobile device 18, and utilize an enhanced decoder function for attempting to decode the barcode if the enhanced decoder mode has been authorized for the mobile device 18.

The enhanced decoder function may include a function of decoding a barcode symbology that the decoder application is restricted from decoding if the enhanced decoder mode has not been authorized for the mobile device 18. Alternatively or additionally, the enhanced decoder function may include a function of decoding multiple barcodes in sequence at a rate that is faster than a restricted rate at which the decoder application can decode a sequence of multiple barcodes if the enhanced decoder mode has not been authorized for the mobile device 18. Alternatively or additionally, the enhanced decoder function may include a function of decoding a quantity of barcodes of a particular symbology that exceeds a restricted quantity of barcodes of the particular symbology which the decoder application can decode if the enhanced decoder mode has not been authorized for the mobile device 18. Alternatively or additionally, the enhanced decoder function may remove a demonstration restriction function (i.e., a demonstration factor that makes output of decoded data useful for demonstration purposes) under which the decoder application functions when the enhanced decoder mode has not been authorized for the mobile device 18, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device 18, or iii) a function which restricts the decoded data or the scrambled decoded data from a barcode of at least one particular symbology from being displayed on a display screen of the mobile device 18. Alternatively or additionally, the enhanced decoder function may enable at least one enhanced image processing function which improves an ability to decode an image of a barcode and is not operable if the enhanced decoder mode has not been authorized for the mobile device 18. The enhanced decoder mode may be authorized by obtaining a license code from a licensing server 21a, 21b.

The decoder application may be configured to subject the license code to a predetermined algorithm to determine at least one operating permission authorized by the license code. The enhanced decoder function may correspond to the at least one operating permission authorized by the license code. The decoder application or any other application may be further configured to obtain the license code from the licensing server 21a, 21b by communicating to the licensing server one of: i) a unique identification code of the mobile device 18, or ii) a user identification code identifying a controller of the mobile device 18.

The barcode-reading application 24 (and the decoder application) disclosed above may be embodied on a computer-readable medium. The barcode-reading application 24 (and the decoder application) includes instructions executable by the processor 44 of the mobile device 18 for performing the functions disclosed above.

Figures 20A, 20B:
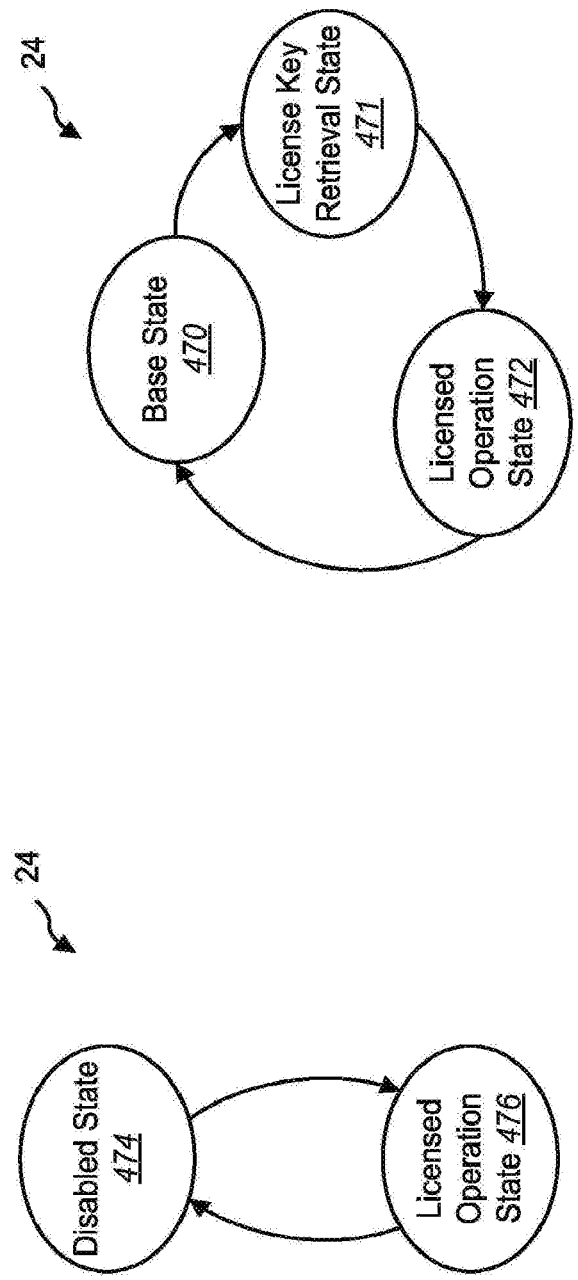
FIG. 20A is a state machine diagram depicting two states of operation in a barcode-reading application in accordance with one embodiment.
FIG. 20B is a state machine diagram depicting three states of operation in a barcode-reading application in accordance with another embodiment.

FIG. 20A is a state machine diagram depicting two states of operation in a barcode-reading application 24 in accordance with one embodiment. The first state of operation may be a disabled state 474 (which may also be referred to as a base state). In the disabled state 474, at least one function of the barcode-reading application 24 is disabled such that the barcode-reading application 24 may not output useful decoded data for further processing or transmission by the barcode-reading application 24 but may be capable of connecting to a licensing server 21a, 21b to obtain a license to transition the barcode-reading application 24 to a licensed operation state 476 (which may also be referred to as an enhanced operation state). The at least one function that may be disabled includes: i) an image capture function which, if enabled, would enable capturing an image of a barcode for image processing and decoding, ii) a decoding function which, if an image of a barcode is captured, would decode the image of the barcode to generate decoded data, iii) a data processing function which, if decoded data is generated, would process the decoded data as part of a useful workflow, and/or iv) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

The licensed operation state 476 may enable the function(s) that is/are disabled when the barcode-reading application 24 is in the disabled state 474 such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

There may be two sub-embodiments of the licensed operation state 476. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 from the disabled state 474 to the licensed operation state 476. The restrictions may be symbology restrictions, time restrictions, and/or quantity restrictions.

Figure 21:
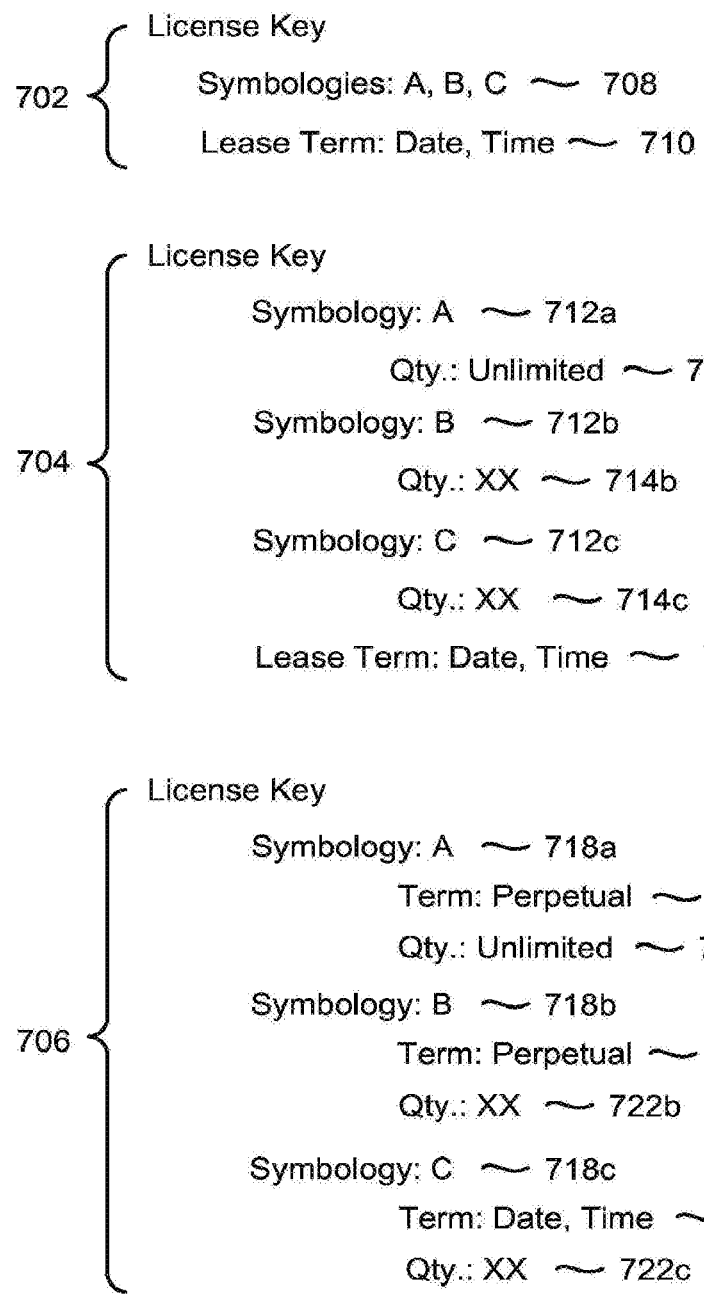
FIG. 21 shows examples of a data structure of a license key in accordance with some embodiments.

FIG. 21 shows examples of a data structure of a license key in accordance with some embodiments. A first example license key 702 may include data fields (that may be encrypted) which specify the symbologies 708 (for example, symbologies A, B, and C that correspond to a Universal Product Code (UPC), a Quick Response (QR) Code, and a Portable Data File (PDF)-417) and a lease term 710. The lease term 710 may specify a date and time at which the license key 702 expires. In response to receipt of this license key 702 (and decryption of the license key 702 if encrypted) the barcode-reading application 24 may transition to the licensed operation state 476, decode the specified symbologies 708 when in the licensed operation state 476 (while remaining disabled for decoding other symbologies not specified in the license, for example for a data matrix), and at the end of the lease term 710, transition back to the disabled state 474 (unless a new license key with an updated lease term 710 is received prior to expiration, which functions to extend the expiration of the lease term).

A second example license key 704 may include data fields (that may be encrypted) which specify the symbologies 712a-c (for example, symbologies A, B, and C that correspond to a UPC, a QR Code, and a PDF-417), and a licensed quantity of decodes 714a-c for each symbology 712a-c. The licensed quantity of decodes for a particular symbology, for example the licensed quantity 714a for symbology 712a, may be unlimited. The licensed quantity of decodes 714b-c for symbologies 712b-c may be limited to a specified quantity. The entire license key 704 may further include a lease term 716 which may specify a date and time at which the license key 704 expires. In response to receipt of this license key 704 (and decryption of the license key 704 if encrypted) the barcode-reading application 24 may transition to the licensed operation state 476, and decode the specified symbologies 712a-c when in the licensed operation state 476 up to the licensed quantities 714a-c. The barcode-reading application 24 may remain disabled for decoding other symbologies not specified in the license (e.g., symbologies other than 712a-c), automatically disable each of symbologies 712b-c when the total quantity of decodes of each symbology 712b-c exceeds the licensed quantity 714b-c (unless a new license key increases the quantity), and transition back to the disabled state 474 (unless a new license key with an updated lease term 710 is received prior to expiration, which functions to extend the expiration of the lease term). In this arrangement, the ability to decode symbologies 712b-c will expire upon the earlier of: i) reaching the maximum quantity of decodes 714b-c, or ii) expiration of the lease term 716.

A third example license key 706 may include data fields (that may be encrypted) which specify the symbologies 718a-c (for example, symbologies A, B, and C that correspond to a UPC, a QR Code, and a PDF-417), a license term 720a-c for each symbology 718a-c, and a licensed quantity 722a-c for each symbology 718a-c. The license term 720a-c may specify a date and time at which the license for that particular symbology 718a-c expires. The license term may be perpetual (e.g., license term 720a-b) or time limited (e.g., license term 720c). The licensed quantity of decodes for a particular symbology may be unlimited (e.g., the licensed quantity 722a for symbology 718a), or may specify a specific quantity (e.g., the licensed quantity 722b-c for symbologies 718b-c).

In response to receipt of this license key 706 (and decryption of the license key 706 if encrypted) the barcode-reading application 24 may transition to the licensed operation state 476, and decode the specified symbologies 718a-c when in the licensed operation state 476 up to the licensed quantities 722a-c for each symbology and for the duration of the license term 720a-c for each symbology. The barcode-reading application 24 may remain disabled for decoding other symbologies not specified in the license (e.g., symbologies other than 718a-c), and automatically disable each of symbologies 718b-c when the earlier of: i) the expiration of the license term 720a-c for each symbology 718a-c expires, or ii) the total quantity of decodes of each symbology 718b-c exceeds the licensed quantity 722b-c, each being subject to extension by a new license key with an increased term duration or an increased quantity.

Each of the license keys may be a data file, specifying the symbologies, the license terms, and the license quantities as depicted in FIG. 21. The data file may be encrypted utilizing an encryption key (e.g., a private key of a public/private key pair). The encrypted data file may form the license key and may be decrypted by the barcode-reading application 24 utilizing an encryption key (e.g., a public key of the public/private key pair). Other known encryption technologies may also be utilized for securing the delivery of the license key to the barcode-reading application including the license restrictions (e.g., licensed symbologies, license terms, and licensed quantities) within the license key.

FIG. 20B is a state machine diagram depicting three states of operation in a barcode-reading application 24 in accordance with another embodiment. The first state of operation may be a base state 470. When in the base state, the barcode-reading application 24 may include barcode-reading capabilities which, although functional and capable of generating useful decoded data, are limited by at least one factor or function (which will be referred to as a demonstration factor) which makes output of decoded data useful for demonstration purposes but not practical for ongoing operation.

The operation of the barcode-reading application 24 in the base state may be a base decoding mode of operation or a demonstration mode of operation. In the base decoding mode of operation, the barcode-reading application 24 may drive the camera of the mobile device 18 to capture an image of a barcode, and apply base decoder functions to the image to identify the barcode symbology. If the barcode symbology is a base symbology, the barcode-reading application 24 may decode the barcode and make the decoded data available for further processing. If the symbology is other than a base symbology, the barcode-reading application 24 may enter the demonstration mode of operation.

In the demonstration mode of operation, the barcode-reading application 24 may apply at least one unlicensed enhanced barcode-reading function to decode the barcode, and perform at least one of: i) outputting an indication of successfully decoding the barcode, or ii) implementing a restriction function. The restriction function may be at least one of: i) a function which scrambles decoded data; ii) a function which restricts the decoded data or scrambled decoded data from the barcode from being made available for further processing by at least one application executing on the mobile device; or iii) a function which restricts the decoded data or the scrambled decoded data from the barcode from being displayed on a display screen of the mobile device.

The at least one demonstration factor may include, but is not limited to: i) a scrambling function which, upon generating decoded data, provides the output in a scrambled or truncated format for purposes of demonstrating decoding capabilities (and decoder performance) but preventing use of the decoded data for further data processing, ii) a time delay function which, upon generating and outputting decoded data (or scrambled decoded data), provides for implementing a time delay before a barcode of the same symbology can again be successfully decoded, iii) an output restriction function which restricts decoded data (or scrambled decoded data) from being made available for further processing by at least one application executing on the mobile device 18, and iv) an output restriction function which enables outputting decoded data (or scrambled decoded data) to the display screen and prevents the decoded data from being further processed by the mobile device 18 (other than presentation on the display screen) or transmission to a remote application.

The demonstration mode of operation may include an upgrade function. The upgrade function may enable user selection to obtain the license code and upon user selection to obtain the license code, establish the network connection to the licensing server and obtain the license code from the licensing server 21a, 21b.

The at least one demonstration factor may be applied to selected symbologies or all symbologies. Different demonstration factors may be applied to different symbologies.

The barcode-reading application 24 may transition from the base state 470 to a license key retrieval state 471. Reading a barcode to which a demonstration factor applies may trigger transition of the barcode-reading application 24 to the license key retrieval state 471. Alternatively, the barcode-reading application 24 may transition to the license key retrieval state 471 upon user selection of the license key retrieval state 471.

When in the license key retrieval state 471 the barcode-reading application 24 may connect to a licensing server 21a, 21b to obtain a license key. After obtaining the license key, the barcode-reading application 24 may transition to a licensed operation state 472 (i.e., an enhanced operation state).

The licensed operation state 472 may enable the barcode-reading application 24 to function without limitations of the at least one demonstration factor such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16), in each case without being impeded by the demonstration factor.

As described with respect to the licensed operation state 476 in FIG. 20A, there may be two sub-embodiments of the licensed operation state 472. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 to the licensed operation state 472. The restrictions may be symbology restrictions, time restrictions, and/or quantity restrictions.

Figure 22A:
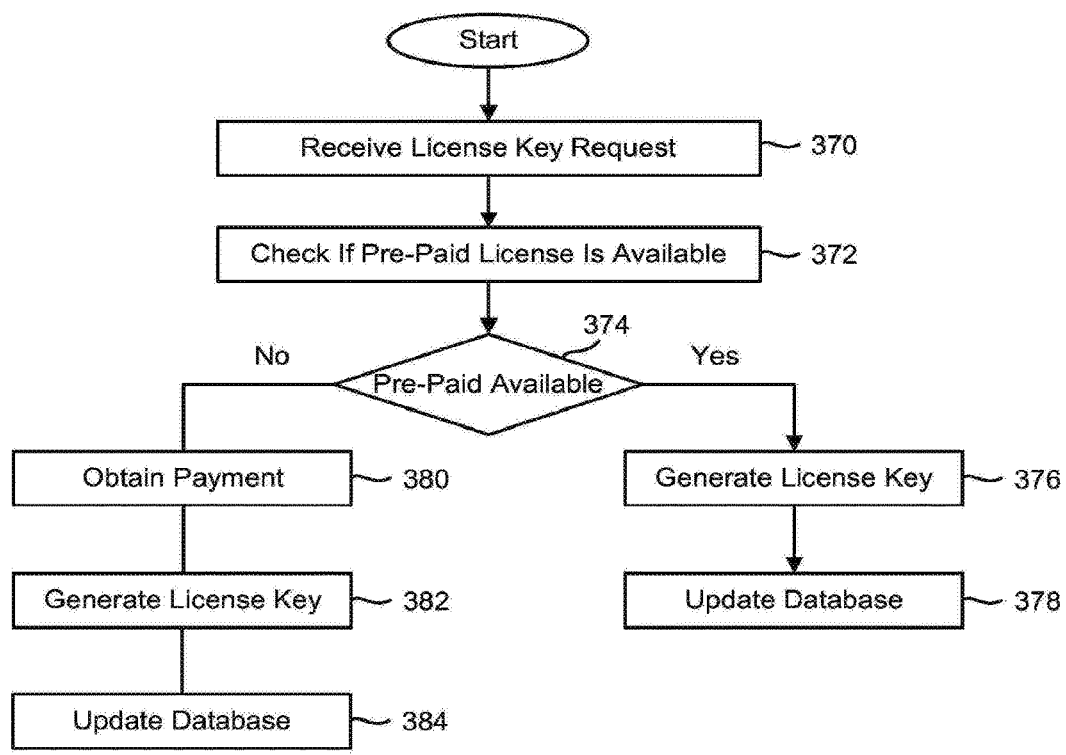
FIG. 22A depicts an exemplary operation of a license server.

FIG. 22A depicts an exemplary operation of a license server 21a, 21b. Step 370 represents receiving a license key request from the barcode-reading application 24 (or other application) of the mobile device 18. Receiving the license key request may include authenticating the user of the mobile device 18. Authenticating the user of the mobile device 18 may include: i) authenticating the individual to which the mobile device is assigned or the individual using the mobile device (or the individual who controls the mobile device), for example utilizing a combination of a user ID and a password or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the organization, company, or group.

Step 372 represents the license server 21a, 21b checking whether a pre-paid license is available for the mobile device 18. More specifically, the identity of the individual, organization, company, or other group of users identified during the authentication may be used to look up (e.g., in a license database) licenses available to that individual, organization, company, or other group of users (if any). For a particular individual, organization, company, or other group of users, a certain quantity of licenses may have been pre-purchased.

FIG. 22C depicts an exemplary database 739 for recording pre-paid licenses that may have been purchased by an individual, organization, company or other group of users. Each such individual, organization, company or other group of users may be identified by a group ID 740, 750. Associated with each group ID is one or more license IDs 742, 752a, 752b, each of which identifies a license type for the barcode-reading application 24 which may have been purchased in quantities of one or more. Each license type may be, as an example, one of the license types identified by the license keys 702, 704, 706 of FIG. 21.

Each license ID 742, 752a, 752b may be associated with identification of: i) the quantity of the license type purchased 744, 754a, 754b, ii) the quantity used 746 or the quantity in use 756a, 756b, and/or iii) the quantity remaining 748, 758a, 758b for issuance to mobile devices 18. It should be appreciated that recording both the quantity used 746 or the quantity in use 756a, 756b as well as the quantity remaining 748, 758a, 758b for issuance to mobile devices is duplicative as either value can be calculated from the quantity purchased 744, 754a, 754b and the other value.

Recording the quantity used 746 is useful when licenses are purchased for a single mobile device, and once a license is issued to a particular mobile device it is permanently associated with that mobile device and may not be reassigned to another mobile device without manual intervention.

Recording the quantity in use 756a, 756b is useful when the licenses are concurrent-use licenses, and when a license assigned to a mobile device expires it is considered no longer in-use and can be reassigned to another mobile device 18.

It should also be appreciated that if the quantity of licenses purchased is unlimited 754a, it is irrelevant to track in-use licenses 756a, 756b and remaining licenses 758a, 758b. When utilizing the concurrent-use licenses, for the in-use licenses 756b, the database may include an in-use table 760 which records, for each license 762, the time 764 at which it expires (e.g., the lease term 710 from FIG. 21) such that upon expiration (if the expiration is not updated by way of renewal), the license will revert to remaining inventory 758b and can be issued to a different mobile device 18.

It should be appreciated that this licensing scheme enables a mobile device 18 to obtain a license for a specific term, and so long as the mobile device 18 obtains a renewal license prior to expiration, the barcode-reading application 24 can operate under the license even if the mobile device is (periodically) uncoupled from any network and unable to contact the license server 21a, 21b.

Returning to FIG. 22A, step 374 represents determining whether a pre-paid license is available. If a prepaid license is available at step 374, a license key for the pre-paid license is generated at step 376 and the database 739 is updated at step 378. Updating the database may include recording the license as used 746 or in use 756b.

If it is determined at step 374 that a pre-paid license is not available, payment is obtained for a license at step 380. Step 380 may involve determining the type of license being requested (e.g., as identified by license keys 702, 704, 706), including the licensed symbology(ies) as well as license term(s) and license quantity(ies) for each symbology(ies). In one embodiment, the barcode-reading application 24 may, under the control of the license server 21a, 21b, generate a menu for user selection of these license parameters (i.e., symbologies, license terms and license quantities) and display on a screen of the mobile device 18 pricing alternatives for desired license parameters.

After payment is obtained, a license key for the license is generated at step 382 and the database 739 is updated at step 384 to reflect a newly purchased license for a user (group ID). If the newly purchased license is a concurrent-use license, updating the database may include recording the license as well as its expiration.

As stated, this licensing scheme enables a mobile device 18 to obtain a license for a specific term, and so long as the mobile device 18 obtains a renewal license prior to expiration, the barcode-reading application 24 can continue operation under the license even if the mobile device 18 is uncoupled from any network and unable to contact the license server 21a, 21b.

Figure 22B:
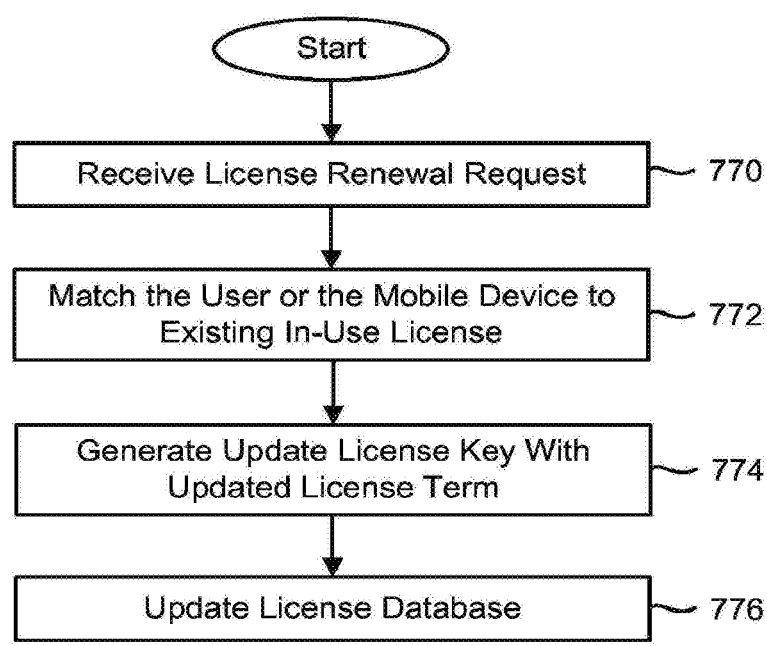
FIG. 22B depicts an exemplary operation of a license server for renewing a license for a mobile device prior to expiration of the license.

FIG. 22B depicts an exemplary operation of a license server 21a, 21b for renewing a license for a mobile device 18 prior to the expiration of the license (e.g., prior to the in-use license 756b reverting to a remaining license 758b).

Step 770 represents receiving a license key renewal request from the barcode-reading application 24 (or other application) of the mobile device 18. Receiving the license key renewal request may include authenticating the user of the mobile device 18. Authenticating the user of the mobile device 18, as discussed, may include: i) authenticating the individual to which the mobile device is assigned, or the individual using the mobile device (or the individual who controls the mobile device), for example utilizing a combination of a user ID and a password, or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the individual, organization, company, or group. The mobile device 18 (e.g., the barcode-reading application) may communicate to the licensing server i) a unique identification code of the mobile device 18 or ii) a user identification code identifying a controller of the mobile device 18.

Step 772 represents the license server 21a, 21b matching the user or the mobile device 18 to the existing in-use license, which may be recorded in an in-use table (for example, the in-use table 760 shown in FIG. 22C).

Step 774 represents generating, and providing to the mobile device 18, an update license key which, as depicted by license key 702 of FIG. 21, may include an updated license term.

Step 776 represents updating the license database such that the expiration date of the license in the in-use table 760 is updated.

Embodiments for a barcode-reading enhancement accessory are disclosed hereafter. As used herein, the terms "attachment" and "accessory" are used synonymously and interchangeably, and may refer to an apparatus attached, coupled, or secured to a mobile device. An attachment for a mobile device may include just a single component that improves the barcode-reading capabilities of the mobile device. Alternatively, an attachment may include multiple components that improve the barcode-reading capabilities of the mobile device. In addition, an attachment for a mobile device may provide additional functionality that is unrelated to improving the barcode-reading capabilities of the mobile device. In some embodiments, the attachment improves the ability of the mobile device to read a barcode utilizing the camera assembly and/or the flash/torch illumination system of the mobile device. In some embodiments, the attachment may include a supplemental camera system and/or one or more supplemental illumination systems which provide barcode-reading capability for the mobile device.

In accordance with some embodiments, a barcode-reading system for a mobile device may include a barcode-reading enhancement accessory secured to the mobile device, which will be explained in detail hereafter, and a barcode-reading application stored in a memory of the mobile device 18, which is disclosed above. The barcode-reading enhancement accessory may include at least one optic system that is positioned either within a field of illumination of a light source of the mobile device for modifying the field of illumination projected by the light source or within a field of view of a camera of the mobile device for modifying illumination reflected from objects within the field of view of the camera.

As disclosed above, the barcode-reading application 24 may be configured to operate in a base mode or an enhanced mode. In the base mode of operation, the barcode-reading application 24 may be configured to control a network interface of the mobile device 18 to establish a network connection to a licensing server 21*a*, 21*b* and obtain a license code from the licensing server 21*a*, 21*b*; subject the license code to a predetermined algorithm and determine at least one operating permission authorized by the license code; and enable an enhanced mode of operation. In the enhanced mode of operation, the barcode-reading application 24 may be configured to implement at least one enhanced barcode-reading function which corresponds to the at least one operating permission authorized by the license code.

The at least one enhanced barcode-reading function may include a function of decoding a barcode symbology that the decoder is restricted from decoding in the base mode of operation. Alternatively or additionally, the at least one enhanced barcode-reading function may include a function of decoding multiple barcodes in sequence at a rate that is faster than a rate at which the barcode-reading application can decode multiple barcodes in sequence in the base mode of operation. Alternatively or additionally, the at least one enhanced barcode-reading function may include a function of decoding a quantity of barcodes of a particular symbology that exceeds a restricted quantity of barcodes of the particular symbology that the barcode-reading application can decode in the base mode of operation.

Alternatively or additionally, the at least one enhanced barcode-reading function may remove a demonstration restriction function under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced barcode-reading function may enable at least one enhanced image processing function that improves an ability to decode an image of a barcode and is not operable when the decoder operates in the base mode of operation.

The base mode of operation may include a base decoding mode of operation and a demonstration mode of operation. In the base decoding mode of operation, the barcode-reading application may be configured to drive the camera assembly to capture an image of a barcode, and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology. In the demonstration mode of operation, the barcode-reading application 24 may be configured to: apply at least one enhanced barcode-reading function to decode the barcode, and perform at least one of outputting an indication of successful decoding of the barcode or implementing a restriction function. The restriction function may be at least one of: i) a function that scrambles decoded data, ii) a function that restricts the decoded data or scrambled decoded data from being made available for further processing by at least one application executing on the mobile device 18, or iii) a function that restricts the decoded data or the scrambled decoded data from being displayed on a display screen of the mobile device 18.

The barcode-reading application 24 may be configured to perform an upgrade function in the demonstration mode of operation. The upgrade function may enable a user selection to obtain the license code, obtain the license code based on the user selection, establish a network connection to the licensing server 21*a*, 21*b*, and obtain the license code from the licensing server 21*a*, 21*b*.

In order to obtain the license code from the licensing server 21*a*, 21*b*, the barcode-reading application 24 may be configured to communicate to the licensing server 21*a*, 21*b* one of: i) a unique identification code of the mobile device 18, or ii) a user identification code identifying a controller of the mobile device 18.

In accordance with another embodiment, a barcode-reading system for a mobile device may include a barcode-reading enhancement accessory secured to the mobile device 18 and a barcode-reading application 24 stored in a memory of the mobile device 18 and executable by a processor 44 of the mobile device 18. The barcode-reading enhancement accessory may include at least one optic system that is positioned either within a field of illumination of a white light source of the mobile device 18 for modifying the field of illumination projected by the white light source, or within a field of view of a camera of the mobile device 18 for modifying illumination reflected from objects within the field of view of the camera.

The barcode-reading application 24 may include: i) an image capture function for controlling the white light source and the camera to capture an image of a barcode wherein the image of the barcode may be affected by the at least one optic system, ii) a base decoder function for decoding a barcode in a base mode of operation if an enhanced decoder mode has not been authorized, and iii) an enhanced decoder function for decoding a barcode in an enhanced mode of operation if the enhanced decoder mode has been authorized.

The enhanced decoder function may include a function of decoding a barcode that the barcode-reading application 24 is restricted from decoding in the base mode of operation. Alternatively or additionally, the enhanced decoder function may include a function of decoding multiple barcodes in sequence at a rate that is faster than a restricted rate at which the barcode-reading application 24 can decode a sequence of multiple barcodes when in the base mode of operation. Alternatively or additionally, the enhanced decoder function may include a function of decoding a quantity of barcodes of a particular symbology that exceeds a restricted quantity of barcodes of the particular symbology which the barcode-reading application 24 can decode when in the base mode of operation.

Alternatively or additionally, the enhanced decoder function may remove a demonstration restriction function under which the barcode-reading application 24 functions when in the base mode of operation, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device, or iii) a function which restricts the decoded data or the scrambled decoded data from a barcode of at least one particular symbology from being displayed on a display screen of the mobile device 18.

Alternatively or additionally, the enhanced decoder function may enable at least one enhanced image processing function which improves an ability to decode an image of a barcode and is not operable when the barcode-reading application 24 operates in the base mode of operation. The enhanced decoder mode is enabled by obtaining a license code from a licensing server 21a, 21b.

The barcode-reading application 24 may be configured to subject the license code to a predetermined algorithm to determine at least one operating permission authorized by the license code. The enhanced decoder function may correspond to the at least one operating permission authorized by the license code.

The barcode-reading application 24 may be configured to obtain the license code from the licensing server 21a, 21b by communicating to the licensing server one of: i) a unique identification code of the mobile device 18, or ii) a user identification code identifying a controller of the mobile device 18.

An attachment for a mobile device 18 may cover a relatively small portion of the mobile device. Alternatively, an attachment for a mobile device may be a protective case that covers a substantial portion of the mobile device. Attachments may be designed for attachment to mobile devices in a wide variety of ways, including but not limited to a corner-positioned attachment, an encapsulating attachment, and a mounting attachment. These attachment modes will be explained in detail below.

FIGS. 4A and 4B depict examples of a corner-positioned attachment that covers a relatively small portion of the mobile device 18. A corner-positioned attachment may cover one or more (but not all) corners of a mobile device.

The corner-positioned attachment 100a shown in FIG. 4A secures to, and covers, a single corner of a mobile device 18. More specifically, the corner-positioned attachment 100a may have an interior back surface 102, an interior front surface 104, an interior top surface 106, and an interior side surface 108. When installed on the corner of the mobile device 18: i) the interior back surface 102 faces, and abuts, the back surface 74 of the mobile device 18; ii) the interior front surface 104 faces, and abuts, the face surface 72 of the mobile device 18; iii) the interior top surface 106 faces, and abuts, the top edge 78 of the mobile device 18; and iv) the interior side surface 108 faces, and abuts, the right edge 80 of the mobile device 18. The distance between the interior back surface 102 and the interior front surface 104 may be sufficiently large to permit the corner-positioned attachment 100a to be inserted onto the corner of the mobile device 18 without excessive difficulty, but also small enough that, once installed, the corner-positioned attachment 100a will not slide free of the mobile device 18 due to friction fit between: i) the interior back surface 102 and the back surface 74; and ii) the interior front surface 104 and the face surface 72. Because the corner-positioned attachment 100a covers a single corner of the mobile device 18, the attachment 100a may be installed on the mobile device 18 by sliding the attachment 100a along the top edge 78 (e.g., the interior top surface 106 in contact with the top edge 78) until the interior side surface 108 abuts the right edge 80 of the mobile device. FIG. 4A shows, as an example, a corner-positioned attachment covering the right top corner of the mobile device 18. However, the corner-positioned attachment may cover the left top corner or any other corner of the mobile device 18.

The corner-positioned attachment 100b secures to, and covers, two top corners of the mobile device 18 as well as the entire top edge 78. More specifically, the corner-positioned attachment 100b may have an interior back surface 102, an interior front surface 104, an interior top surface 106, and two interior side surfaces 108a and 108b. When installed on the corner of the mobile device 18: i) the interior back surface 102 faces, and abuts, the back surface 74 of the mobile device 18; ii) the interior front surface 104 faces, and abuts, the face surface 72 of the mobile device 18; iii) the interior top surface 106 faces, and abuts, the top edge 78 of the mobile device 18; and iv) the interior side surfaces 108a and 108b face, and abut, the right edge 80 and the left edge 82 of the mobile device 18, respectively.

The distance between the interior back surface 102 and the interior front surface 104 may be sufficiently large to permit the corner-positioned attachment 100a to be inserted onto the corner of the mobile device 18 without excessive difficulty, but also small enough that, once installed, the corner-positioned attachment 100b will not slide free of the mobile device 18 due to friction fit between: i) the interior back surface 102 and the back surface 74, and ii) the interior front surface 104 and the face surface 72.

Additionally, or alternatively, the distance between the interior side surface 108a and the interior side surface 108b may be sufficiently large to permit the corner-positioned attachment 100b to be inserted onto the corner of the mobile device 18 without excessive difficulty, but also small enough that, once installed, the corner-positioned attachment 100b will not slide free of the mobile device 18 due to friction fit between: i) the interior side surface 108a and the right edge 80, and ii) the interior side surface 108b and the left edge 82.

Because the corner-positioned attachment 100b covers two corners of the mobile device 18, the attachment 100b may be installed on the mobile device 18 by sliding the attachment 100b along each of the left edge 82 and the right edge 80 (e.g., the interior side surface 108a in contact with the right edge 80, the interior side surface 108b in contact with the left edge 82, the interior back surface 102 in contact with the back surface 74, and the interior front surface 104 in contact with the face surface 72) until the interior top surface 106 abuts the top edge 78 of the mobile device 18.

With respect to either attachment 100a or 100b (or any type of corner-positioned attachment), as an alternative to frictional engagement between the attachment 100a, 100b and the mobile device 18, the attachment 100a, 100b may be secured to the mobile device 18 through the use of various other attachment methods. Such attachment methods include, but are not limited to, mechanical fasteners, adhesives, and the like.

Encapsulating attachments may cover substantially the entirety of the back surface 74 of the mobile device 18 and may further cover substantially the entirety of one or more of the edges 76, 78, 80, and 82 of the mobile device 18. An encapsulating attachment i) may cover a perimeter edge of the face surface 72 (but does not cover the central portion of the face surface 72) or ii) may cover substantially the entire face surface 72 but include a transparent central portion, in each case to enable viewing of, and access to, the display screen 66 and touch panel of the mobile device 18. An encapsulating attachment may further exclude covering interface elements of the mobile device 18, such as buttons, electrical interfaces, infrared interfaces, and the like.

Figure 5A:
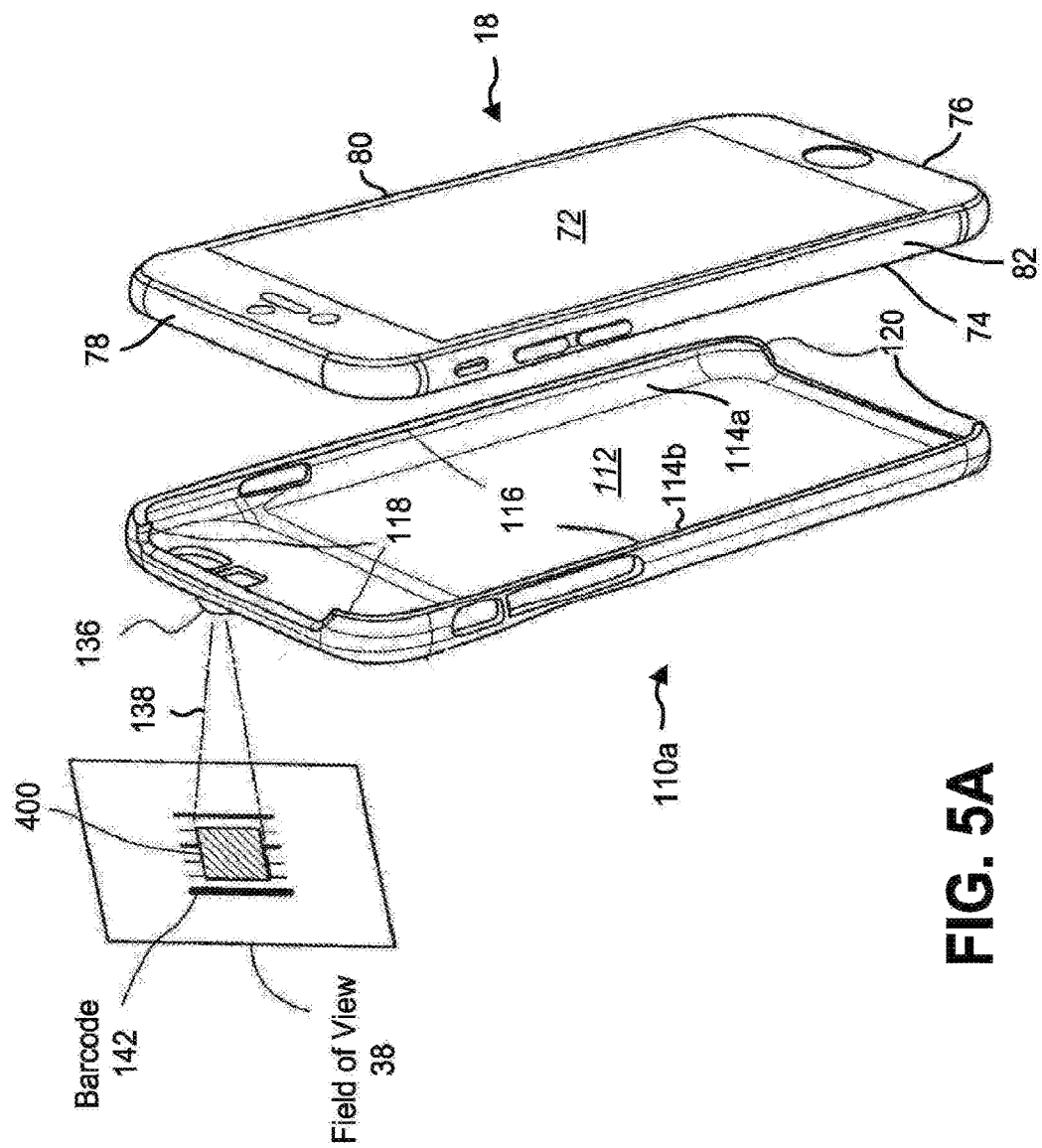
FIGS. 5A and 5B illustrate an exemplary encapsulating attachment useful in a barcode-reading enhancement system.

FIG. 5A depicts an exemplary encapsulating attachment 110a which covers substantially the entire back surface 74 and each of the right edge 80 and the left edge 82 of the mobile device 18 while covering portions of the top edge 78 and the bottom edge 76 near the right edge 80 and left edge 82 (e.g., the corners of the mobile device 18).

In more detail, the encapsulating attachment 110a may include: i) an interior back surface 112 which faces, and abuts, the back surface 74 of the mobile device 18; ii) interior side surfaces 114a and 114b which face, and abut, the right edge 80 and the left edge 82 of the mobile device 18, respectively; iii) an interior top surface 118 which faces, and abuts, the top edge 78 of the mobile device 18 (at the corners); and iv) an interior bottom surface 120 which faces, and abuts, the bottom edge 76 of the mobile device 18 (at the corners). The encapsulating attachment 110a may also include an interior side surface 116 which faces, and abuts, at least a portion of the periphery of the face surface 72 of the mobile device 18.

For installation of the encapsulating attachment 110a onto the mobile device 18, the walls of the encapsulating attachment 110a forming the interior side surfaces 114a and 114b may be sufficiently flexible such that, with pressure, the walls separate as the mobile device 18 is pressed towards the interior back surface 112, and the portions of the walls which form the interior side surface 116 pass along the right edge 80 and the left edge 82 of the mobile device 18, and come to rest abutting the periphery of the face surface 72 when the back surface 74 is in contact with the interior back surface 112.

The encapsulating attachment 110a, or more specifically a back side forming the interior back surface 112, may further include a camera aperture through which the camera assembly (not shown) of the mobile device 18 has the camera field of view 38 to the back surface 74 of the mobile device 18.

Figure 5B:
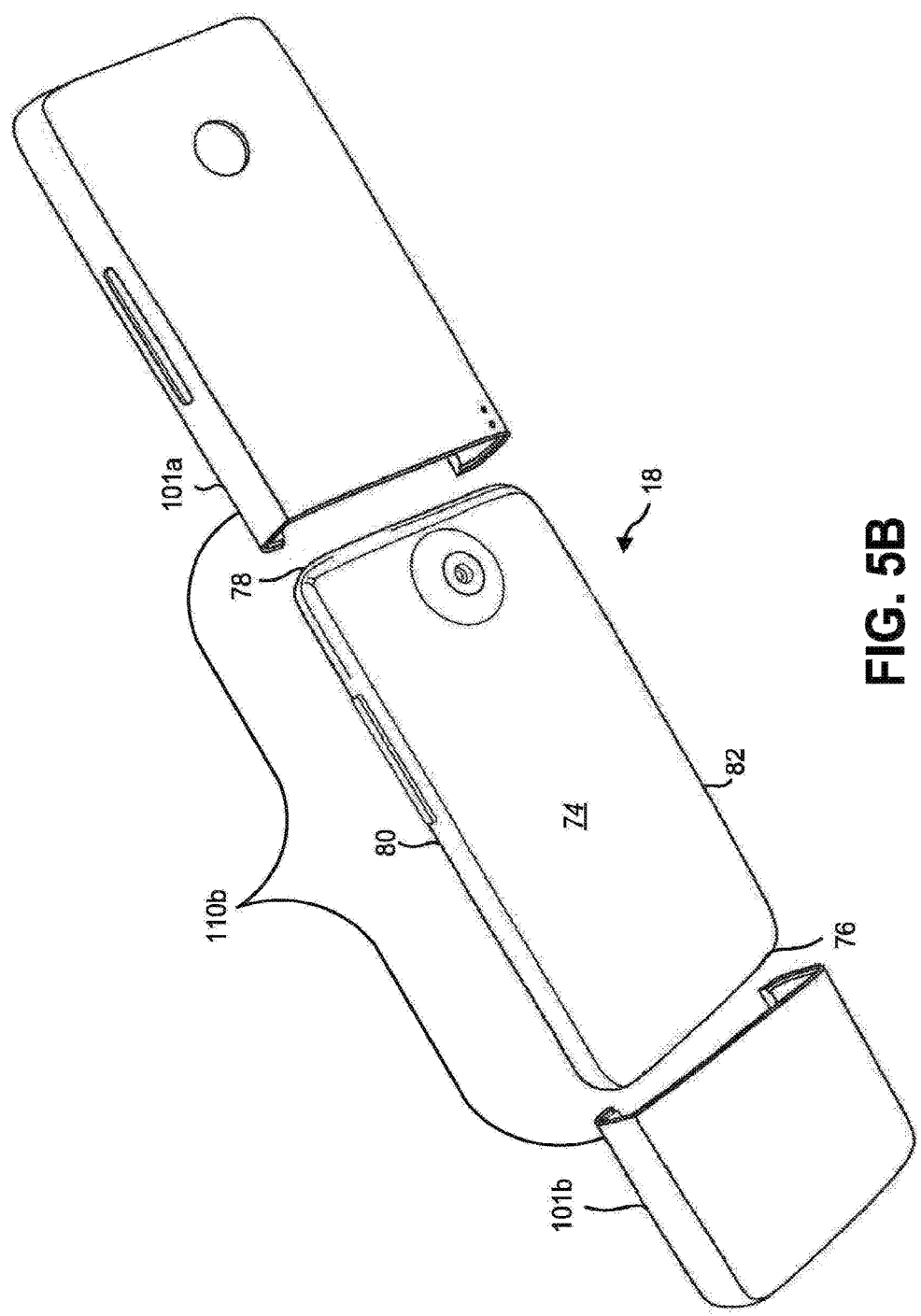

FIG. 5B depicts another example of an encapsulating attachment 100b. The encapsulating attachment 100b comprises a top corner-positioned attachment 101a (similar to 100b) which covers the top two corners of the mobile device 18 and a bottom corner-positioned attachment 101b which covers the bottom two corners of mobile device 18. The two corner-positioned attachments 101a and 101b, when installed, mate to encapsulate the mobile device 18. It should be appreciated that the interior front surface of each of the attachments 110b (e.g., each of the mating top and bottom corner-positioned attachments) covers a small portion of the periphery of the face surface 72 of the mobile device 18 such that an operator may access the display screen 66 and the touch panel when the mobile device 18 is encapsulated within the attachment 110b.

It should be appreciated that the encapsulating attachments 110a and 110b shown in FIGS. 5A and 5B are examples of encapsulating attachments, and the encapsulating attachments may be in any form or type.

Mounted attachments generally are attachments that are secured to one face and/or one edge of a mobile device 18. Mounted attachments may not cover any corner of the mobile device, and may not encapsulate the mobile device 18.

Figures 6A, 6B:
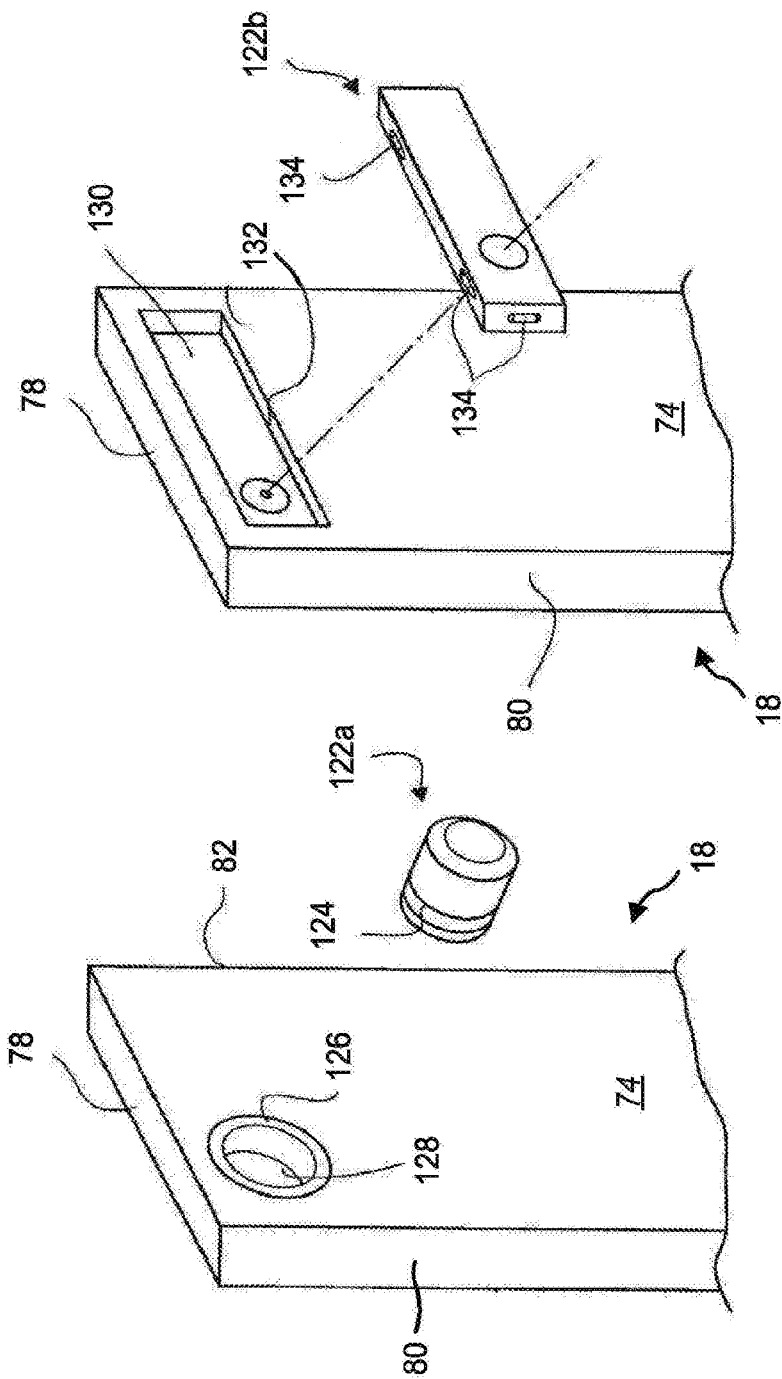
FIGS. 6A and 6B illustrate an exemplary mounted attachment useful in a barcode-reading enhancement system.

FIGS. 6A and 6B depict exemplary mounted attachments 122a, 122b which are secured to the back surface 74 of the mobile device 18. In FIG. 6A, the mounted attachment 122a may be a barrel shape and include a cylindrical male engagement surface 124 which inserts into a cylindrical recess 126 within the back surface 74 of the mobile device 18 and engages a periphery engagement surface 128 of the cylindrical recess 126 for mounting. The engagement between the engagement surface 124 and the engagement surface 128 may be, for example, by threading, bayonet fitting, or any other mounting structure which may utilize rotational movement between the mounted attachment 122a and the mobile device 18 for securing the mounted attachment 122a to, and releasing the mounted attachment 122a from, the mobile device 18.

In FIG. 6B the mounted attachment 122b may be a non-cylindrical shape and may be secured into a recess 130 within the back surface 74 of the mobile device 18. The recess 130 may be of the same shape as the mounted attachment 122b and may include an engagement clip or cavity 132 around at least a portion of the periphery of the recess 130 such that engagement clips 134 around the periphery of the mounted attachment 122b may secure the mounted attachment 122b within the recess 130.

In addition to the foregoing examples of corner-mounted attachments, encapsulating attachments, and mounted attachments, the barcode-reading enhancement systems and other features embodied in, or related to, attachments as described herein may utilize any (or multiple) attachment structure or means for attaching to the corresponding mobile device including, but not limited to: i) for attachments that cover some portion of the mobile device from two or more sides (e.g., corner-positioned attachments and encapsulating attachments), use of a frictional interface such as a modest interference fit between the interior dimension of the attachment and the exterior dimension of the portion of the mobile device that receives the attachment; ii) for encapsulating attachments, a wide variety of attachment features in known examples of cases, covers, and other protectors for mobile devices; and iii) for attachments that are attached to only one side of the mobile device attachment, features such as threaded fasteners, adhesives, snap-in interfaces, and the like.

Figure 7A:
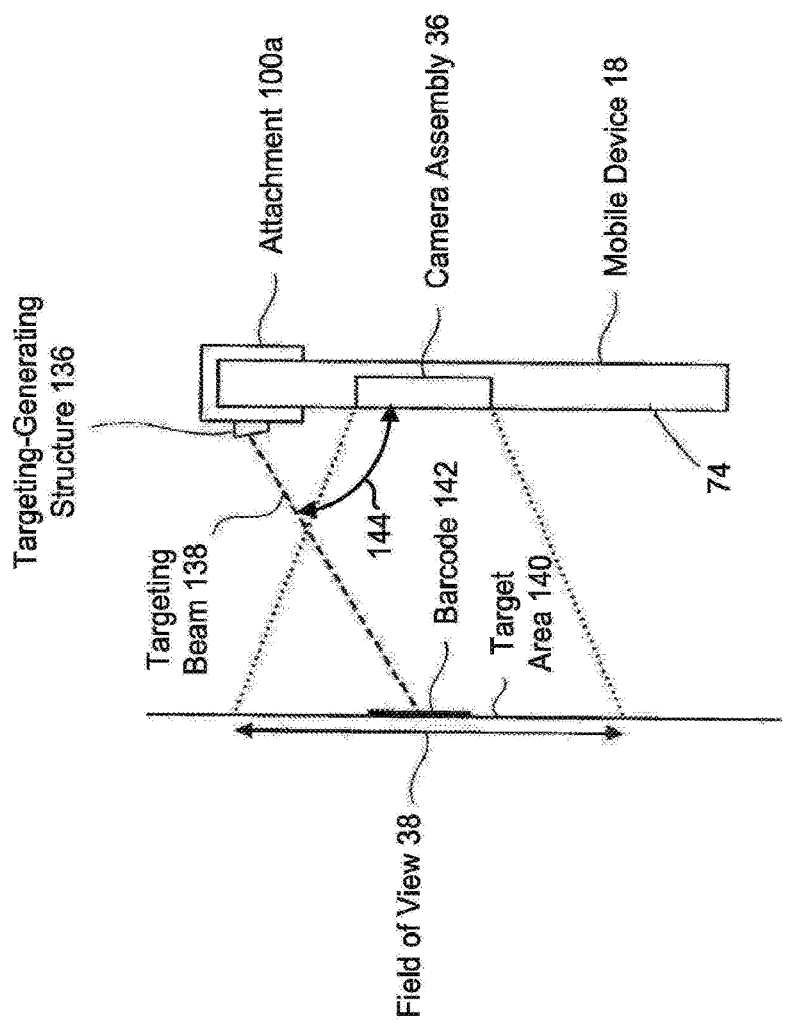
FIGS. 7A and 7B illustrate an exemplary target-generating mechanism useful for implementing in an attachment in a barcode-reading enhancement system.

The attachments described herein may include target-generating mechanisms as a component of the barcode-reading enhancement system for a mobile device. FIG. 7A depicts a side cutaway view of an example corner- or edge-mounted attachment (shown as attachment 100a covering a single edge of the mobile device 18 as an example) that includes a target-generating structure 136 (i.e., a target-generating mechanism). The target-generating structure 136 projects a targeting beam 138 into a target area 140 (corresponding to a central portion of a field of view 38 of the camera assembly 36 of the mobile device 18) and may be utilized to facilitate rapid and optimal positioning of a barcode 142 within the camera field of view 38 of the mobile device 18. The targeting beam 138 is projected at an acute angle 144 with respect to the back surface 74 of the mobile device 18 in a first direction such that the targeting beam 138 intersects the central portion of the camera field of view 38 at a distance from the camera assembly 36 that is useful for barcode reading. The distance useful for barcode reading means that a barcode 142 within the camera field of view 38 would be imaged by the lens assembly 40 with sufficient sharpness (focus) and resolution (size) to enable reading of the barcode 142. This targeting beam 138 is especially useful when the mobile device 18 does not have a display, or the display is dimmed or turned off to conserve battery power.

Figure 7B:
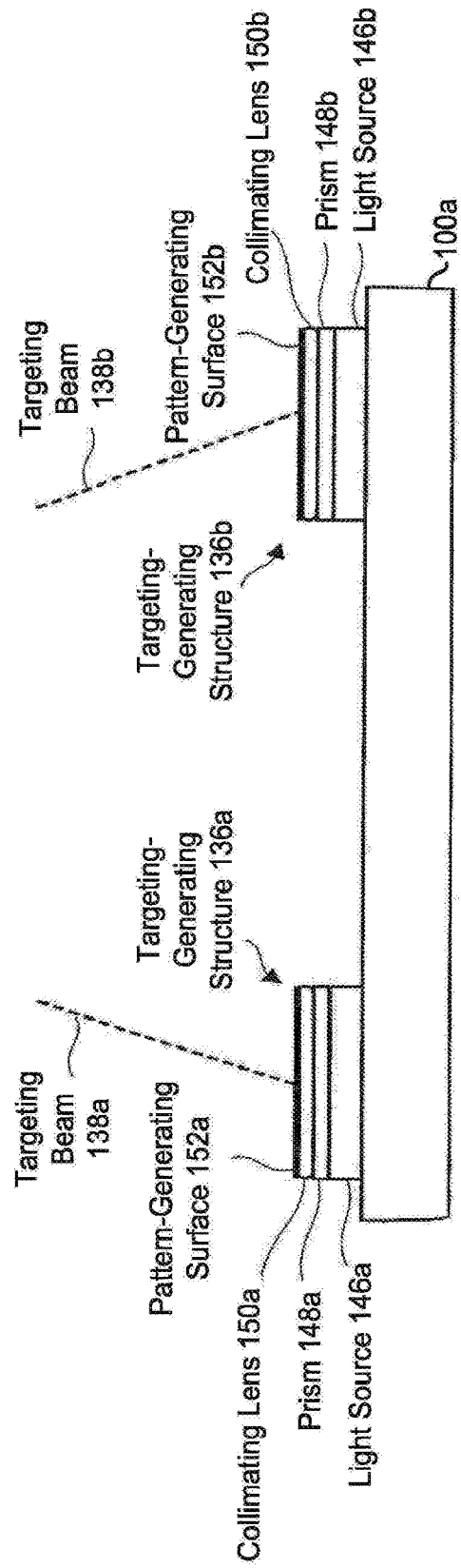

FIG. 7B shows (as a top view, which may be orthogonal to the side view depicted in FIG. 7A) an example of a target-generating mechanism. The target-generating mechanism may include multiple target-generating structures 136a and 136b. The target-generating structures 136a and 136b may project non-parallel targeting beams 138a and 138b of a distinct illumination pattern, each at an acute angle with respect to the back surface 74 of the mobile device 18 in a second direction orthogonal to the first direction and each of which form a point or a pattern within the target area 140. The target-generating structures 136a and 136b may be configured so that (1) at a distance useful for barcode reading (i.e., the optimal distance from the camera assembly 36), the targeting beams 138a and 138b converge so that the projected patterns and/or points meet at the center of the camera field of view 38, and (2) at any distance from the camera assembly 36 other than the optimal distance, the projected patterns and/or points are spaced apart. Thus, when the mobile device 18 is being used to read a barcode 142, the user may move the mobile device 18 until the projected patterns and/or points meet, indicating that the mobile device 18 is at the optimal distance from the barcode 142 and that the barcode 142 is positioned within the center of the camera field of view 38.

The target-generating mechanism depicted in FIG. 7B may include a light source 146a, 146b and permutations of any of a prism 148a, 148b; a collimating lens 150a, 150b; and a pattern-generating surface 152a, 152b such as an interference pattern-generating element; a diffractive pattern-generating element, such as a holographic element that may include one or more diffractive gratings; or a Fresnel-type pattern-generating element that has been fabricated with the desired targeting beam pattern.

The light source 146a, 146b may be laser diodes, light-emitting diodes (LEDs), etc. embodied in the attachment or within the mobile device 18. The targeting beams 138a, 138b may be generated by shaping the illumination from the white light source of the mobile device by the applicable permutations of the prism 148a, 148b, a collimating lens 150a, 150b, and a pattern-generating surface 152a, 152b.

Although FIGS. 7A and 7B depict the target-generating mechanism embodied in a corner- or edge-mounted attachment 100a, the target-generating mechanism may be secured to the mobile device 18 by other means including, but not limited to, embodying the target-generating structure 136 into an encapsulating attachment as depicted in FIG. 5A in alignment with a white light source 84 of the mobile device such that the white light source 84 of the mobile device may be used as the light source 146 of the target-generating structure 136.

In this application, a "distinct illumination pattern" is an illumination pattern produced by light that is focused to provide relatively crisp lines or other shapes. Thus, the illumination produced by a laser is an example of light that would typically produce a distinct illumination pattern. By contrast, a "diffuse illumination pattern" is an illumination pattern produced by light that is not focused at any particular location, but rather emanating into a broad area. Thus, the illumination produced by a typical light bulb is an example of light that would typically produce a diffuse illumination pattern.

Figure 8B:
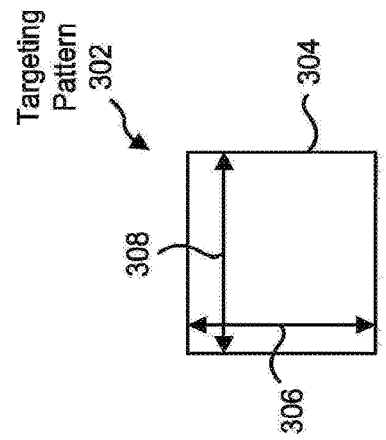
FIGS. 8A-8D illustrate exemplary targeting patterns useful for implementing an attachment of a barcode-reading enhancement system.
Figure 8D:
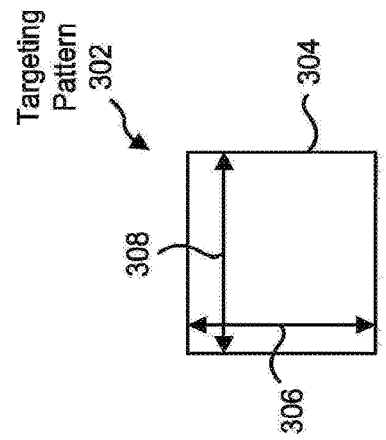
Figure 8A:
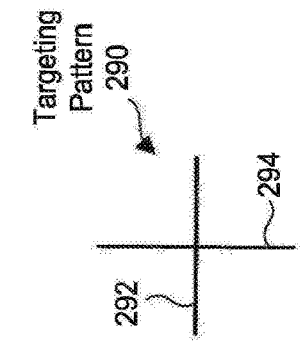

FIGS. 8A-8D illustrate various targeting patterns (distinct illumination patterns) that may be projected by the target-generating structures 136 into the target area 140. FIG. 8A shows an example of a targeting pattern 224 that may be projected by the target-generating structure 136. The targeting pattern 224 includes a circle 226 with a dot 228 in the center. One target-generating structure (136a for example) may generate the circle 226, while the other target-generating structure (136b for example) may generate the dot 228. The target-generating structures 136a, 136b may be configured so that when the mobile device 18 is at an optimal distance from the barcode 142, the dot 228 is substantially in the center of the circle 226 to form the depicted targeting pattern 224.

FIG. 8B shows another example of a targeting pattern 290 that may be projected by the target-generating structures 136. The targeting pattern 290 includes a cross comprising a horizontal bar 292 and a vertical bar 294. One target-generating structure (136a for example) may generate the horizontal bar 292, while the other target-generating structure (136b for example) may generate the vertical bar 294. The target-generating structures 136a, 136b may be configured so that when the mobile device 18 is at an optimal distance from the barcode 142, the horizontal bar 292 and the vertical bar 294 intersect each other within the target area 140 to form the depicted targeting pattern 290.

Figure 8C:
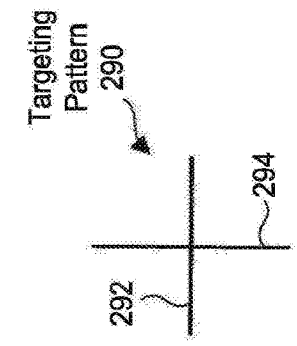

FIG. 8C shows another example of a targeting pattern 296 that may be projected by the target-generating structures 136. The targeting pattern 296 includes a circle 298 comprising an X pattern 300 within the circle 298. One target-generating structure (136a for example) may generate the circle 298, while the other target-generating structure (136b for example) may generate the X pattern 300. The target-generating structures 136a, 136b may be configured so that when the mobile device 18 is at an optimal distance from the barcode 142, the circle 298 and the X pattern 300 may intersect each other to form the depicted targeting pattern 296.

FIG. 8D shows another example of a targeting pattern 302 generated by the target-generating structures 136. The targeting pattern 302 may include an intense illumination in a pattern of one or more quadrilaterals such as a rectangular or square quadrilateral 304 which is/are bounded by a distinct drop in intensity (e.g., a sharp contrast at the edges of the rectangular or square quadrilateral 304). More specifically, the area around the perimeter of the illuminated rectangular or square quadrilateral 304 may be illuminated (if at all) at an intensity much less than the intensity of illumination within the rectangular or square quadrilateral 304.

The illuminated rectangular or square quadrilateral 304 may be, for example, illuminated by LEDs projecting (or appearing) blue or white and in the shape of the rectangular or square quadrilateral 304. The length of the rectangular or square quadrilateral 304 in a first direction (direction 308) may approximately coincide with the width of the field of view of the camera assembly 36 of the mobile device 18 (or the width of the system field of view if the attachment alters the field of view of the camera assembly 36); and the length of the rectangular or square quadrilateral 304 in a second direction (direction 306), orthogonal to the first direction 308, may approximately coincide with the height of the field of view of the camera assembly 36 of the mobile device 18 (or the height of the system field of view if the attachment alters the field of view of the camera assembly 36); and, in each case, may be within a central portion of the field of view of the camera assembly 36 of the mobile device 18 as depicted in FIG. 5A.

Stated another way, the angle at which the illumination diverges from the target-generating structure 136 in the first direction 308 may be approximately the same angle as the field of view of the camera assembly 36 in the first direction 308 (or the same angle as the system field of view if the attachment alters the field of view of the camera assembly 36). Similarly, the angle at which the illumination diverges from the target-generating structure 136 in the second direction 306 may be approximately the same angle as the field of view of the camera assembly 36 in the second direction 306 (or the same angle as the system field of view if the attachment alters the field of view of the camera assembly 36). As such, the targeting pattern 302 not only provides the user with an indication of the field of view of the camera assembly 36 (or the system field of view), in both the first direction 308 and the second direction 306, but the targeting pattern 302 also illuminates substantially all of the field of view in one or both of the first direction and the second direction with an intensity of illumination that does not significantly vary within the targeting pattern 302 but drops significantly at the perimeter of the targeting pattern 302.

As discussed, the target-generating structure 136 may include its own light source 146a, 146b (as shown in FIG. 7B) and collimate illumination therefrom to produce the applicable distinct targeting pattern. The illumination source may be of a particular wavelength (e.g., red or blue light) or may be white illumination (broad spectrum) and may include a filter 214a, 214b (which will be explained in detail with reference to FIG. 9) to pass only the particular wavelength used to generate the distinct targeting pattern by attenuating other wavelengths.

Alternatively, the target-generating structure 136 may culminate and otherwise shape illumination from the white light source 84 of the mobile device 18 utilizing a collimating lens and/or a pattern-generating surface in both the first direction and the second direction to project the applicable targeting pattern into the target area 140. In such a case, as shown in FIG. 9, the target-generating structure 136 may include filters (214a, 214b) which pass a narrow band of the visible illumination spectrum, such as red illumination or blue illumination, such that the white illumination (broad spectrum) from the mobile device 18 is filtered and the targeting pattern generated by the combination of the white illumination source and the filter is a specific color, such as blue or red.

The attachments described herein may include supplementary exposure illumination systems as a component of the barcode-reading enhancement system for a mobile device. More specifically, the supplementary exposure illumination systems may include one or more elements which project (or alter the projection of) diffuse illumination into the target area 140 in such a manner that illumination reflected from a barcode 142 and imaged onto the photo sensor 42 produces image characteristics that improve the decode-ability of the image. Image characteristics which improve the decode-ability of the image include: i) increased contrast between illumination reflected from bars (e.g., first modules in a 2D code) versus illumination reflected from spaces (e.g., second modules in a 2D code), and ii) even contrast (e.g., no hot spots, dead zones, or other significant contrast difference) of illumination reflected from bars (or first modules) across the entire barcode 142 and similarly even contrast of illumination reflected from spaces (or second modules) across the entire barcode 142.

Figure 9:
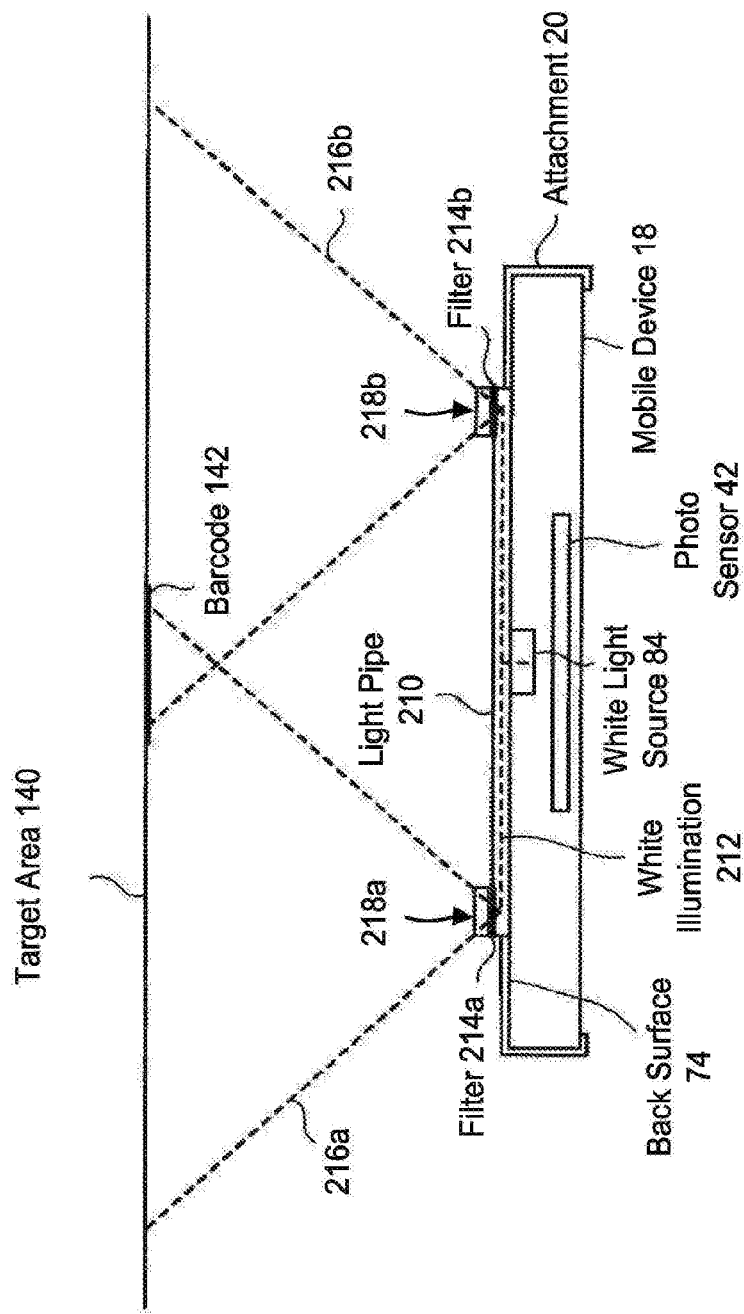
FIG. 9 illustrates an exemplary exposure illumination system useful for implementing in an attachment of a barcode-reading enhancement system.

FIG. 9 depicts an example of a mobile device attachment 110 (shown as a cross section of an encapsulating attachment) that includes illumination elements for optimizing illumination for barcode reading. The mobile device 18 includes a white light source 84. The attachment 110 may include a light pipe 210 that redirects white illumination 212 provided by the white light source 84 of the mobile device 18. More specifically, utilizing total internal reflection, the light pipe 210 propagates the white illumination 212 in a direction parallel to the back surface 74 of the mobile device 18 towards one or more illumination emanating structures 218a, 218b which are displaced from the white light source 84 within the plane defined by the back surface 74 of the mobile device 18.

Each illumination emanating structure 218a, 218b redirects at least a portion of the white illumination 212 propagating through the light pipe 210 towards a barcode 142 present within the target area 140 as exposure illumination 216a, 216b. Each emanating structure 218a, 218b may include any permutation of the prism 148a, 148b (not shown in FIG. 9 but discussed with respect to FIG. 7B), collimating lens 150a, 150b (not shown in FIG. 9 but discussed with respect to FIG. 7B), pattern-generating surface 152a, 152b (not shown in FIG. 9 but discussed with respect to FIG. 7B), and one or more filters 214a, 214b. The one or more filter(s) 214a, 214b may include: i) a narrow band filter (e.g., a single-color filter passing a single color of illumination such as red, blue, or another color); ii) a low pass filter passing all color bands below a predetermined wavelength; and/or iii) a high pass filter passing all color bands above a predetermined wavelength. When the one or more filters 214a, 214b are a narrow band filter (e.g., a single color filter), the exposure illumination 216a, 216b may be a single color (e.g., red, blue, or another single color). The redirection of illumination by the illumination emanating structures 218a, 218b may occur by reflection from a chamfered end of the light pipe 210 positioned directly below the illumination emanating structures 218a, 218b.

In some embodiments, the light pipe 210 and the illumination emanating structures 218a, 218b may be configured (positioned) such that the exposure illumination 216a, 216b is offset from the camera's photo sensor 42 (in the plane defined by the back surface 74 of the mobile device 18) in order to prevent glare. In other words, the exposure illumination 216a, 216b may be directed toward the target area 140 from locations that are not directly in front of the camera's photo sensor 42.

FIG. 9 depicts just one example of a supplementary exposure illumination system as a component of the barcode-reading enhancement system for a mobile device. Other supplementary exposure illumination systems may include any of the optic elements (including illumination-generating LEDs) which form a direct bright field illumination system, a diffuse bright field illumination system, and a dark field illumination system as described in U.S. patent application Ser. No. 14/510,341, entitled "DIFFUSE BRIGHT FIELD ILLUMINATION SYSTEM FOR A BARCODE READER," filed on Oct. 9, 2014, and commonly assigned with the present application. The content of the Ser. No. 14/510,341 application is hereby incorporated by reference in its entirety. It should further be appreciated that the supplementary exposure illumination systems utilizing the optic elements of the direct bright field illumination system, the diffuse bright field illumination system, and the dark field illumination system from the Ser. No. 14/510,341 application may further utilize the corresponding illumination sources in conjunction with such optics.

The attachments described herein may include a supplementary optic system as a component of the barcode-reading enhancement system for a mobile device. An "optic system" may be any set of one or more components positioned in the field of view 38 of a camera assembly 36 to modify one or more parameters regarding the light received by the camera, such as the quantity of the light received, the optical pathway along which the light is received, the angular size of the field of view, the depth of field, the focus distance, the f-number, and/or the wavelength(s) of the light received. Thus, an optic system, in various components, may include any of various components such as lenses, filters, mirrors, apertures, and the like. Stated another way, the one or more optical elements within the field of view 38 of the camera assembly 36, in combination with the lens assembly 40 of the camera, define a barcode-reading optic system (the combination) which provides superior barcode-reading capabilities over the lens assembly 40 alone.

Figure 10B:
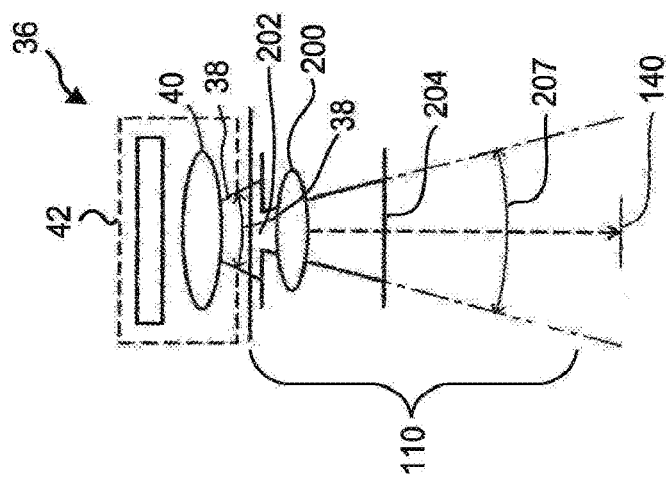
FIGS. 10A-10D illustrate exemplary supplementary optics useful for implementing in an attachment of a barcode-reading enhancement system.
Figure 10A:
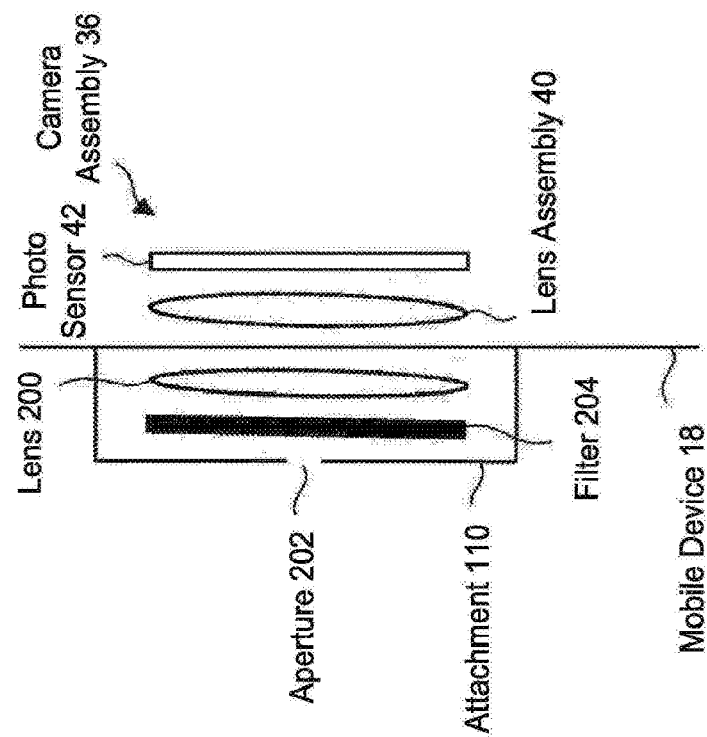

FIGS. 10A and 10B depict examples of a mobile device attachment 110 (shown as a mounted attachment) that includes a supplementary lens system that includes permutations of: i) one or more lens(es) 200; ii) optical filter(s) 204; and iii) an aperture 202.

The aperture 202 limits the amount of light that reaches the camera's photo sensor 42 through the camera's lens assembly 40. More specifically, the aperture 202 may be an aperture within an opaque barrier material which defines the aperture (f-number) of the supplementary lens system and, when part of the barcode-reading optic system, may define the optical aperture (f-number) of the barcode-reading optical system.

The aperture of the barcode-reading optical system, as defined by the aperture 202, may provide for an increased depth of field (e.g., a system depth of field) over the depth of field provided by the lens assembly 40. With increased depth of field, an image on the photo sensor 42 sufficiently sharp (focused) for barcode reading may be achieved without the need for autofocusing and therefore the decode response time may be improved because the barcode-reading process does not require a time-consuming autofocusing step.

The one or more lens(es) 200 may alter the field of view 38 of the camera assembly 36 and/or magnification of the camera assembly 36 (e.g., provide a system field of view 207 that is different from the field of view 38 of the camera assembly 36).

The one or more filter(s) 204 may include: i) a narrow band filter (e.g., a single-color filter passing a single color of illumination such as red, blue, or another color); ii) a low pass filter passing all color bands below a predetermined wavelength; and/or iii) a high pass filter passing all color bands above a predetermined wavelength.

For example, it may be desirable to capture predominantly light of a relatively narrow segment of the visible portion of the electromagnetic spectrum, such as red light with a wavelength of approximately 660 nm. The filter 204 may thus have a colored tint and/or polarization with a narrow wavelength band desired for image capture for effective barcode decoding.

As mentioned previously, the parameters of the camera assembly 36, such as the angular size of the camera field of view 38, the range of focus depths, and the depth of field of the camera assembly 36 may not be ideal for barcode capture and/or decoding. Thus, any or all of these parameters may be modified by the optic system of the attachment. Thus, the system field of view 207 may have an angular size that is significantly smaller than the angular size of the camera field of view 38. This may be because conventional photography often uses a wider lens angle than is needed for capturing barcode images.

The system field of view 207 may provide a system ratio of focal length to entrance pupil diameter that is greater than a camera ratio of focal length to entrance pupil diameter of the unmodified optic system of the camera assembly 36 such that the optic system of the attachment acts to increase the f-stop of the camera lens assembly 40.

Figure 13:
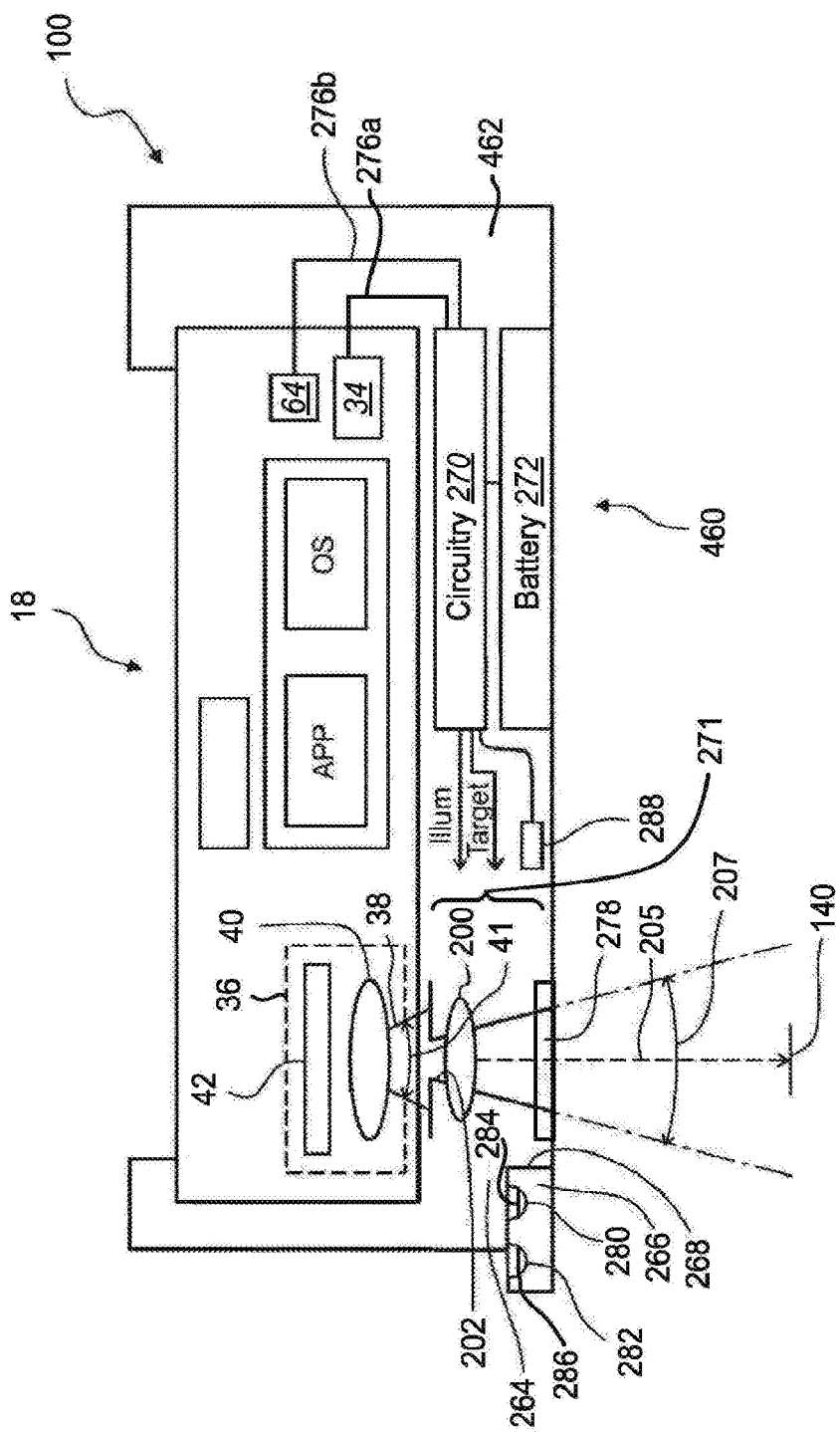
FIG. 13 illustrates an exemplary attachment for a barcode-reading enhancement system with a target-generating mechanism, an exposure illumination system and supplementary optics useful for implementing in an attachment of a barcode-reading enhancement system.

Further, the mobile device 18 and the optic system of the attachment 100, combined, may have a depth of field (not shown), consisting of the depth along the system optical pathway 205 (e.g., as shown in FIG. 13) through which an object may remain in focus (to a degree acceptable for barcode capture and/or decoding) on either side of the system focus depth. A relatively large depth of field may advantageously permit barcode capture and/or decoding at a wider range of distances between the mobile device 18 and the barcode to be captured. Thus, the attachment lens may advantageously provide a relatively larger depth of field, particularly at shorter focus depths, than the camera assembly 36, unaided.

The system field of view 207 may be centered on a system optical pathway, which may be the same as the optical pathway 205 for the camera assembly 36 without the attachment. More specifically, the camera assembly 36 may be designed to capture images centered on an optical pathway 205 perpendicular to the back surface 74 of the mobile device 18. In certain embodiments this optical pathway is not modified by the attachment; thus, the system optical pathway 205 may be the same as the optical pathway for the camera assembly 36. In other embodiments, an attachment may provide a different optical pathway for barcode scanning, as will be shown and described with respect to FIGS. 10C and 10D.

Figure 10C:
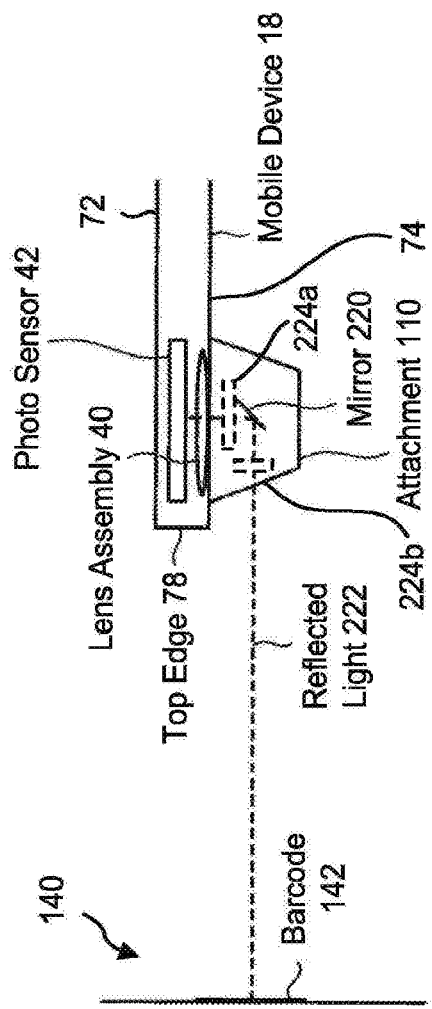

FIG. 10C depicts an example of a mobile device attachment 110 (shown as a mounted attachment) that includes a mirror 220 that changes the optical path of illumination (i.e., reflected light) 222 reflected from the barcode to the mobile device 18 from a direction that is generally parallel to the face surface 72 and the back surface 74 of the mobile device 18 to a direction that is generally orthogonal to the lens assembly 40 and the photo sensor 42 of the camera assembly 36 of the mobile device 18.

The attachment 110 permits a user of the mobile device 18 to attempt to read a barcode 142 positioned within a field of view that is beyond the top edge 78 of the mobile device by aiming the top side (the top edge 78) of the mobile device 18 at the barcode 142. The reflected light 222 reflected from the barcode 142 is redirected by the mirror 220 toward the mobile device's focusing lens assembly 40, which focuses the reflected light 222 onto the photo sensor 42.

Stated another way, the field of view 38 of the camera assembly 36 would have a center line that is generally orthogonal to the planar back surface 74 of the mobile device 18 (and orthogonal to the planar display on the face surface 72 of the mobile device 18) and that extends towards a target area 140 from the back surface 74 of the mobile device 18. The mirror 220 is within such a field of view and folds the field of view such that its center line is parallel to the back surface 74 of the mobile device 18 (and the display on the face surface 72 of the mobile device 18) and extends towards a target area 140 from the top side of the mobile device 18.

In the depicted example, the mirror 220 is positioned so that the reflected light 222 is redirected by 90°. Alternatively, the mirror 220 may be positioned so that the reflected light 222 is redirected by a different angle. For example, FIG. 10D depicts a mirror 220 positioned so that the reflected light is redirected by an angle 221 between 30 and 60 degrees from perpendicular to the back surface 74.

Figure 10D:
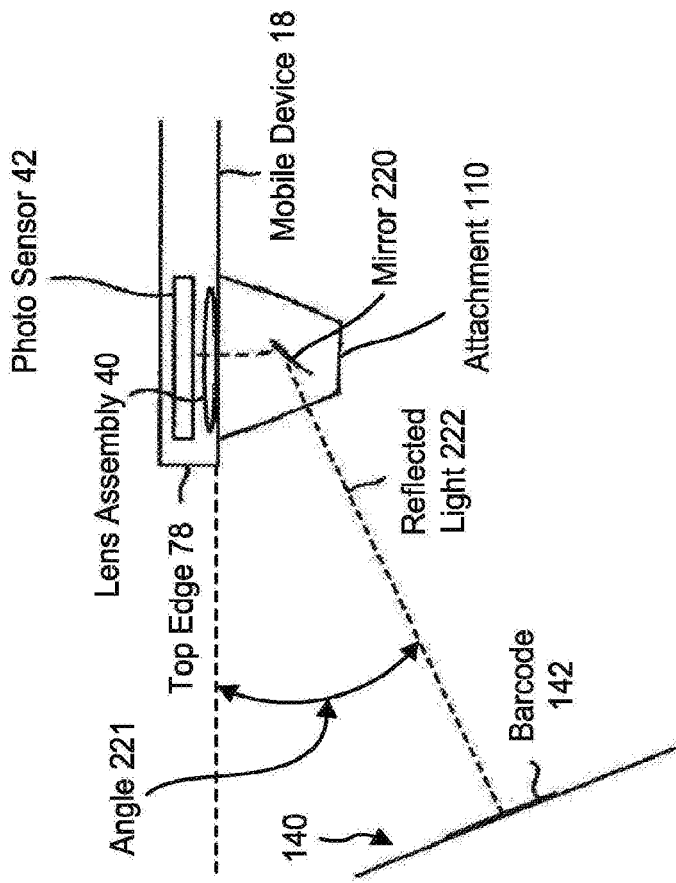

It should be appreciated that, although not depicted in either FIG. 10C or 10D, the attachment 110, in addition to including the mirror 220 to redirect the reflected light 222, may further include any permutation of optic components discussed with respect to FIGS. 10A and 10B for purposes of altering one or more of the depth of field, the f-number, the angle of the field of view, or the focal plane of the lens assembly 40 of the camera assembly 36. Such optic components may be located within the region 224a of the attachment 110 or the region 224b of the attachment 110.

FIGS. 11A, 11B, 12A, 12B, 12C, 12D, 13, 14, and 15 depict additional examples of attachments which may be, or form, a part of the barcode-reading enhancement system for a mobile device. Although each attachment depicted in FIGS. 11A, 11B, 12A, 12B, 12C, 12D, 13, 14, and 15 is depicted in one of the general structures described with respect to FIG. 4A, 4B, 5A, 5B, 6A, or 6B, the arrangement of target-generating mechanisms, supplementary illumination systems, and supplementary optic systems described above with respect to FIGS. 7A, 7B, 8A-8D, 9, and 10A-10D may be utilized in any of the general structures.

Figure 11A:
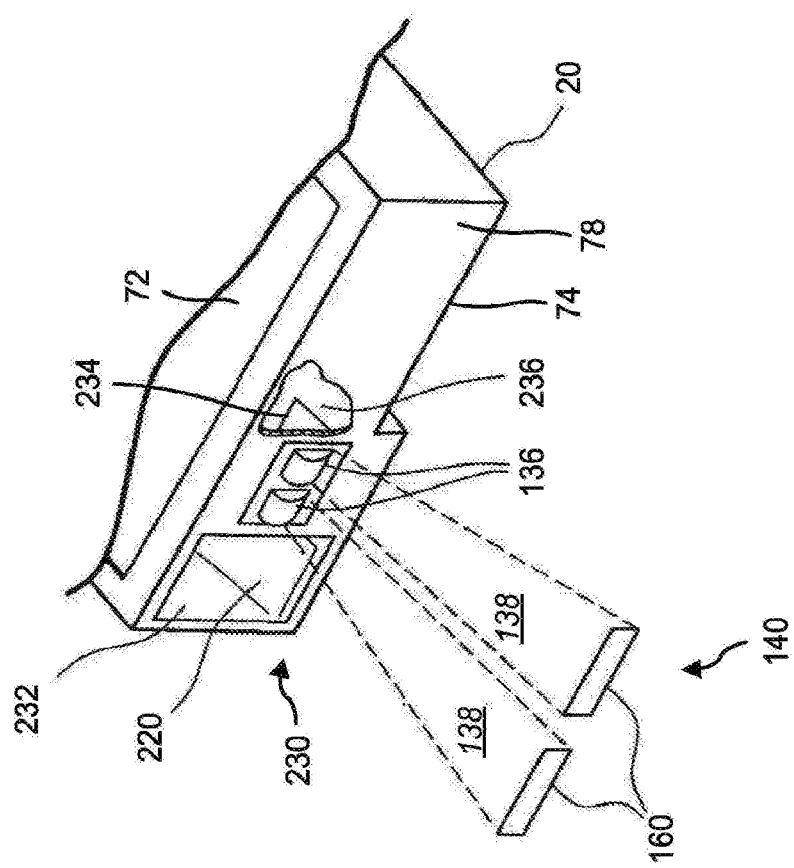
FIGS. 11A and 11B illustrate an exemplary attachment for a barcode-reading enhancement system which includes a target-generating mechanism and supplementary optics.

FIG. 11A depicts an attachment 20 (shown in partial view) with a target-generating structure 136 which projects a targeting beam 138 from the top edge 78 of the mobile device 18 to the top side of the mobile device 18 to form a targeting pattern 160 within a target area 140 whereas the attachments depicted in FIGS. 7A and 7B include a target-generating structure 136 which projects a targeting beam 138 from the back surface 74 of the mobile device 18 and generates the targeting pattern 160 within a target area 140.

The attachment 20 may further include a structure 230 (with a mirror 220) as depicted in, and described with respect to, FIG. 10C or 10D for redirecting illumination reflected from a barcode in the target area extending from the top edge 78 of the mobile device 18 towards the lens assembly 40 of the camera assembly 36 on the back surface 74 of the mobile device 18. More specifically, the mirror 220 may be a first mirror within a first chamber 232 within the field of view 38 of the camera assembly 36 (not shown) on the back surface 74 of the mobile device 18. The first mirror 220 may be positioned at approximately a 45-degree angle to the center line of the field of view 38 of the camera assembly 36 to fold the field of view of the camera by approximately 90 degrees such that the field of view 38 of the camera assembly 36 extends towards the target area 140 extending from the top edge 78 (the top side) of the mobile device 18 instead of from the back surface 74 of the mobile device 18 as described with respect to FIG. 10A. Alternatively, the first mirror 220 may be positioned at an angle between 30 degrees and 60 degrees from the plane of the back surface 74 of the mobile device.

Further as described with respect to FIGS. 10A and 10B (and although not depicted in FIG. 11A), any permutation of the optics described with respect to FIGS. 10A and 10B may be positioned within the first chamber 232 for purposes of altering one or more of the depth of field, the f-number, the angle of the field of view, or the focal plane of the lens assembly 40 of the camera assembly 36.

The target-generating mechanism may include a second mirror 234, within a second chamber 236, generally parallel to the first mirror 220, but aligned with the white light source 84 on the back surface 74 of the mobile device 18, and may fold the illumination from the white light source 84 (by the same angle at which the first mirror 220 folds the field of view of the camera assembly 36) towards the target area 140 extending from the top edge 78 of the mobile device 18. The first chamber 232 may be separated from the second chamber 236 by an opaque wall or baffle to prevent illumination within the second chamber being incident on the first mirror 220 and reflected by the first mirror 220 onto the lens assembly 40 of the camera assembly 36 and thereby degrading the image quality of an image of a barcode 142 within the target area 140.

The target-generating mechanism may further include any of the target-generating structures 136 described with respect to FIGS. 7A and 7B for forming and projecting the targeting beams 138 of a distinct illumination pattern into the target area 140. In FIG. 11A, the target-generating structure 136 is depicted as two culminating lens structures arranged horizontally (within a line generally parallel to the lines formed by the interface of the top edge 78 with each of the face surface 72 and the back surface 74 of the mobile device). Each of the collimating lens structures may project a targeting pattern 160 into the target area 140 which is similar to the targeting pattern 400 depicted in FIG. 7D. Again, the targeting pattern 400 may be projected into the center of the field of view and the angular size of the targeting pattern with respect to distance from the mobile device 18 may be the same as the angle of the field of view and therefore may serve as both the distinct illumination pattern indicating the field of view and the diffuse illumination (within the field of view) for exposure illumination.

Figure 11B:
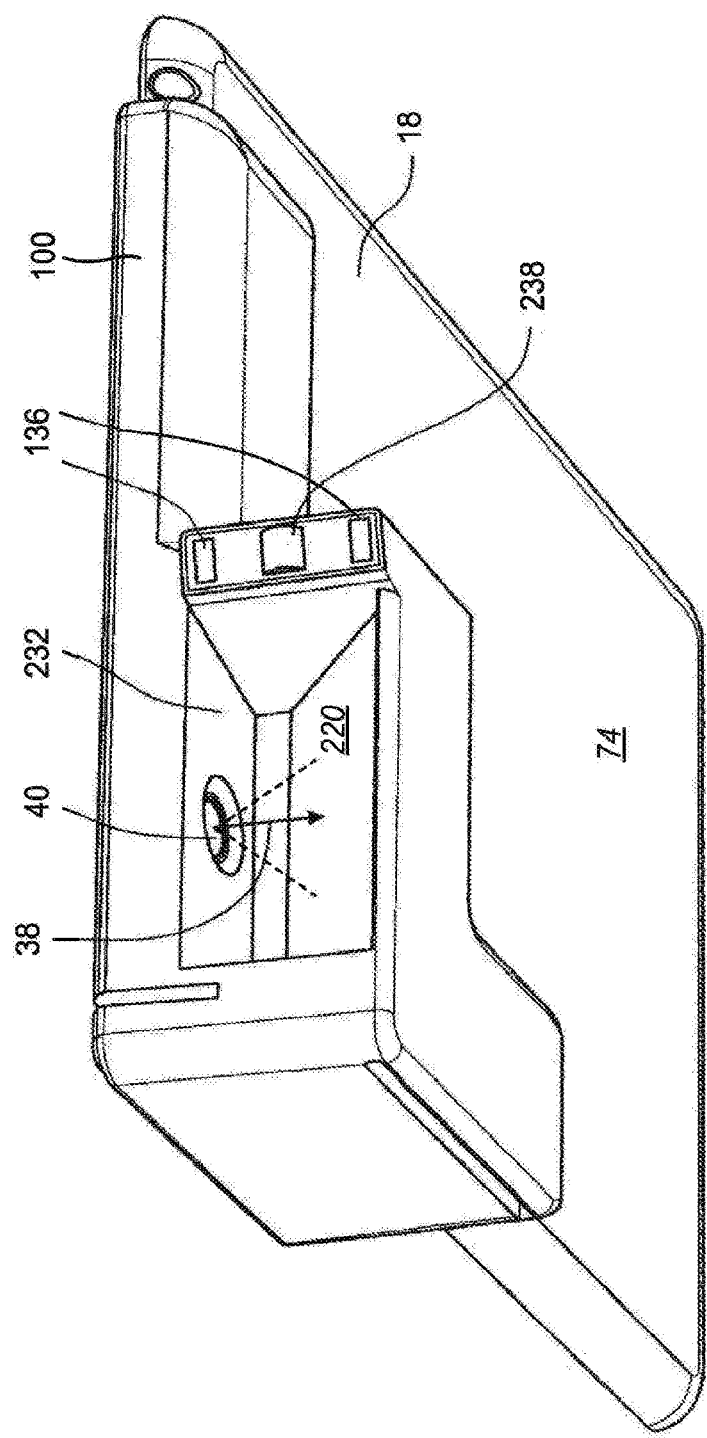

FIG. 11B depicts an attachment (depicted as a corner- or edge-mounted attachment 100) which is similar in structure to the encapsulating attachment 110 of FIG. 11A but with target-generating structures 136 arranged vertically (within a line generally perpendicular to the lines formed by the interface of the top edge 78 with each of the face surface 72 and the back surface 74 of the mobile device). The attachment 100 of FIG. 11B may further include an exposure illumination structure 238 which may utilize any of the elements described with respect to FIG. 9 or any of the supplementary exposure illumination systems which form the direct bright field illumination system, the diffuse bright field illumination system, and/or the dark field illumination system as described in U.S. patent application Ser. No. 14/510,341.

As stated with respect to FIG. 11A, the target-generating structure 136 may utilize the second mirror 234 to redirect illumination generated by the white light source 84 into the target-generating structure 136 to form targeting beams 138 or may utilize illumination sources within the attachment 110. With respect to the embodiment of FIG. 11B, one of the targeting illumination sources or the exposure illumination source may be the white light source 84 of the mobile device 18 (reflecting from a mirror) and the other of these may be an illumination source within the attachment.

FIGS. 12A, 12B, 12C and 12D represent an attachment 110 (shown as an encapsulating attachment) with a target-generating structure 136 that may be repositioned and used for any embodiment described herein where the white light source 84 of the mobile device 18 provides illumination for the target-generating structure 136 (which as discussed with respect to FIG. 7D may also be the exposure illumination system). The repositionable target-generating structure 136 is useful for uses of the mobile device 18 where, in addition to utilizing the white light source 84 and the camera assembly 36 for barcode reading, the white light source 84 and the camera assembly 36 are used for traditional photography.

Figure 12B:
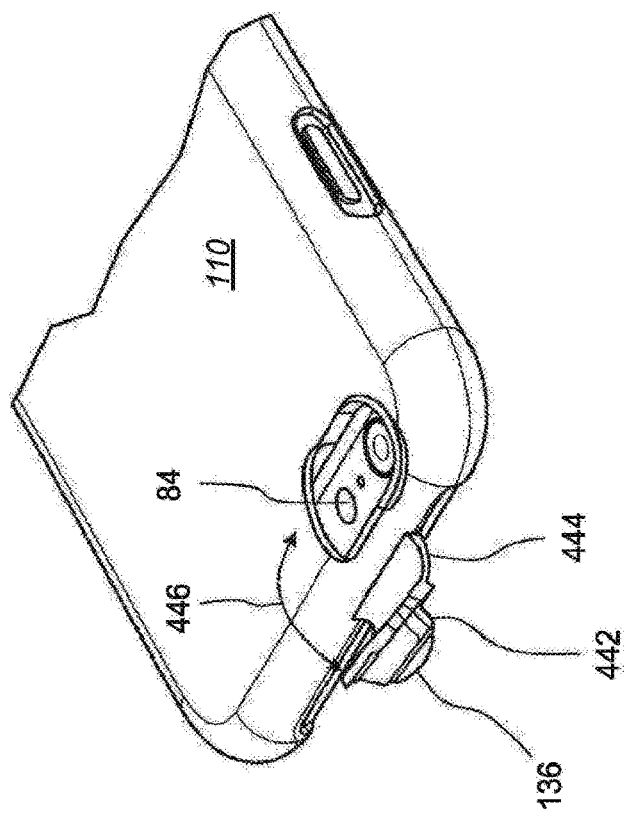
FIGS. 12A-12D illustrate an exemplary attachment for a barcode-reading enhancement system which includes a target-generating mechanism.
Figure 12A:
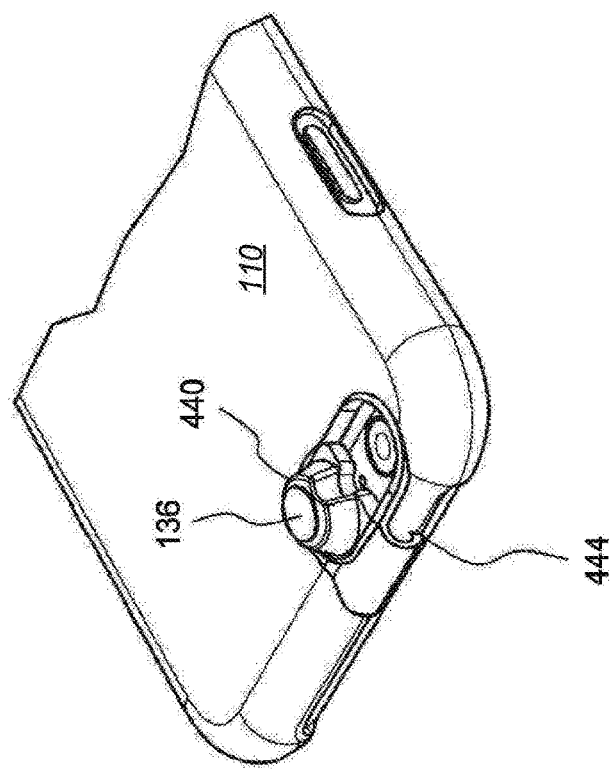

FIGS. 12A and 12B depict the target-generating structure 136 as being pivotally repositionable between: i) a first position 440 as depicted in FIG. 12A wherein the target-generating structure 136 is positioned in front of the white light source 84 (i.e., an illuminating torch) such that illumination from the white light source 84 is shaped by the target-generating structure 136 into a distinct targeting illumination pattern; and ii) a second position 442 as depicted in FIG. 12B wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures.

As depicted in FIGS. 12A and 12B, the target-generating structure 136 may be secured to the attachment 110 by a flexible band 444 such that the target-generating structure 136 may be pivoted in the direction 446 between position 440 and position 442 by flexure of the flexible band. It is also envisioned that a more traditional hinge/hinge pin structure may also provide for pivoting the target-generating structure 136 between position 440 and position 442 in alternative embodiments.

Figure 12D:
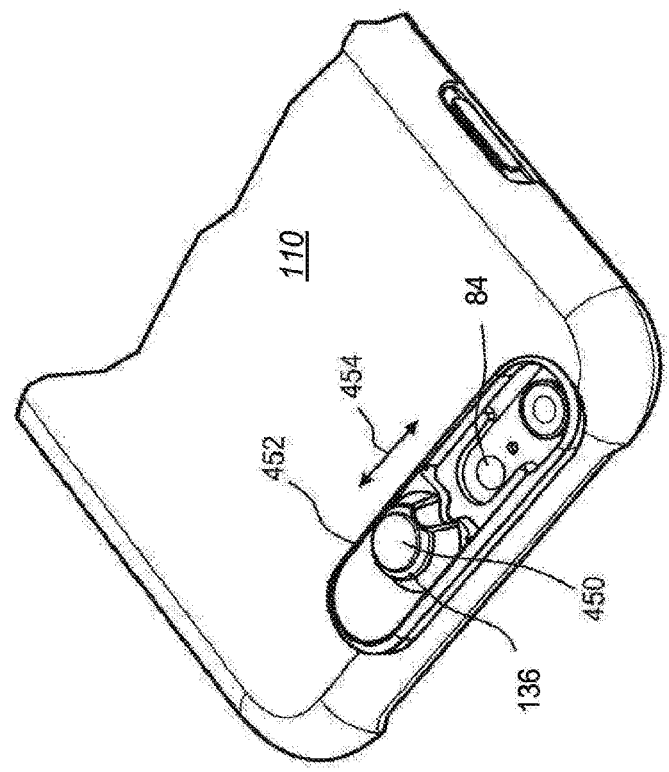
Figure 12C:
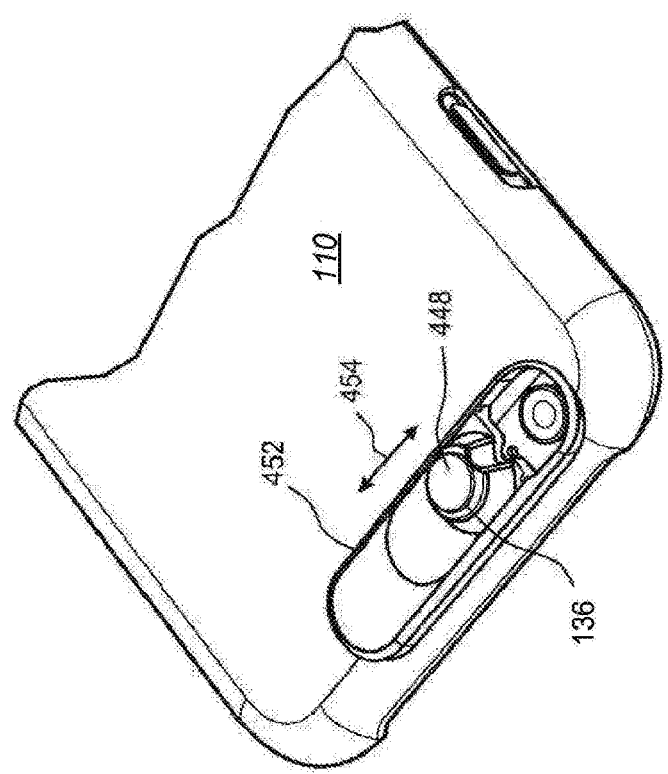

FIGS. 12C and 12D depict the target-generating structure 136 being laterally repositionable between: i) a first position 448 as depicted in FIG. 12C wherein the target-generating structure 136 is positioned in front of the white light source 84 (i.e., an illuminating torch) such that the illumination from the white light source 84 is shaped by the target-generating structure 136 into a targeting pattern; and ii) a second position 450 as depicted in FIG. 12D wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures. As depicted in FIGS. 12C and 12D, the target-generating structure 136 may be secured to the attachment 110 within a channel 452 such that the target-generating structure 136 may be laterally repositioned in the direction 454 between position 448 and position 450.

FIG. 13 depicts another exemplary attachment (shown as an encapsulating attachment 100) for a mobile device 18. The attachment 100 may have a housing 460 defining an interior cavity 462 of the attachment 100 which is separate from a cavity in which the attachment 100 encapsulates the mobile device 18.

The cavity 462 within the housing 460 may be divided into one or more chambers separated by an opaque barrier in order to restrict light passage from components in one chamber to components in another. For example, the cavity 462 may have a first chamber 264 and a second chamber 266. An opaque barrier 268 may separate the first chamber 264 from the second chamber 266 in a manner that prevents light from either of the first chamber 264 and the second chamber 266 from passing directly into the other chamber.

The first chamber 264 may be larger than the second chamber 266, and may contain components such as a supplementary optic system 271, attachment control circuitry 270, and an attachment battery 272.

The supplementary optic system 271 may be any of the embodiments described with respect to FIGS. 10A and 10B. A window 278 within the housing 460 may be in alignment with the supplementary optic system 271 so that illumination reflected from the target area 140 is able to enter the first chamber 264 via the window 278 to reach the supplementary optic system 271 and, after passing through the supplementary optic system 271, be received and captured by the camera assembly 36 of the mobile device 18.

In some embodiments, the window 278 may be transparent and function to enclose the first chamber 264. In other embodiments, the window 278 itself may be a component of the supplementary optic system 271 for modifying one or more of the depth of field, the f-number, the angle of the field of view, or the focal plane of the lens assembly 40 of the camera assembly 36.

For example, the window 278 may filter illumination reflected from the target area 140 (e.g., pass and/or attenuate certain wavelengths of illumination). The filter characteristics may include any of the filter characteristics described with respect to the filter 214a, 214b of FIG. 9.

The second chamber 266 may include one or more of a targeting illumination system 280 and an exposure illumination system 282. The targeting illumination system 280 may utilize an illumination source 284 and any of the targeting structures 136 described with respect to FIG. 7A or 7B to project a targeting beam (not shown) with a distinct illumination pattern (which may be any of the targeting patterns described with respect to FIGS. 8A, 8B, 8C and 8D) towards the target area 140.

The exposure illuminating system 282 may utilize an exposure illumination source 286 and the exposure illumination structure described with respect to FIG. 9 or U.S. patent application Ser. No. 14/510,341. The exposure illumination source 286 may include various light sources, including but not limited to lasers, LED's, incandescent lights, fluorescent lights, and the like.

The attachment control circuitry 270 of this embodiment may control each of the targeting illumination systems 280 and the exposure illumination system 282. The targeting illumination system 280 may be configured to project light into the target area 140 prior to and/or after image capture so as to avoid interfering with the decode-ability of the barcode image. Conversely, the exposure illumination system 282 may project illumination into the target area 140 during image capture.

The targeting illumination system 280 and the exposure illumination system 282 may also be connected to an attachment battery 272, either independently of the attachment control circuitry 270, or via the attachment control circuitry 270. Thus, the targeting illumination system 280 and the exposure illumination system 282 may be controlled by the attachment control circuitry 270 and powered by the attachment battery 272.

The attachment control circuitry 270 may further include, or be electrically connected to, an attachment communications interface, which may be coupled to the mobile device power/data connector 64 via a link 276a and/or the speaker/microphone connector 34 via a link 276b.

The housing 460 may further contain a user control 288, which may be actuated by the user to perform various functions, such as initiating the capture of a barcode. The user control 288 may include any form of user input known in the art, including but not limited to switches, levers, knobs, touch screens, microphones coupled to voice-operation software, and the like. The user control 288 may advantageously take the form of a trigger that can be actuated, for example, with the index finger of the user. In alternative embodiments, the housing 460 may be modified to have a pistol grip or other grip that enhances the ergonomics of the housing 460 and/or facilitates actuation of the user control similar to the housing depicted in FIG. 14.

Figure 14:
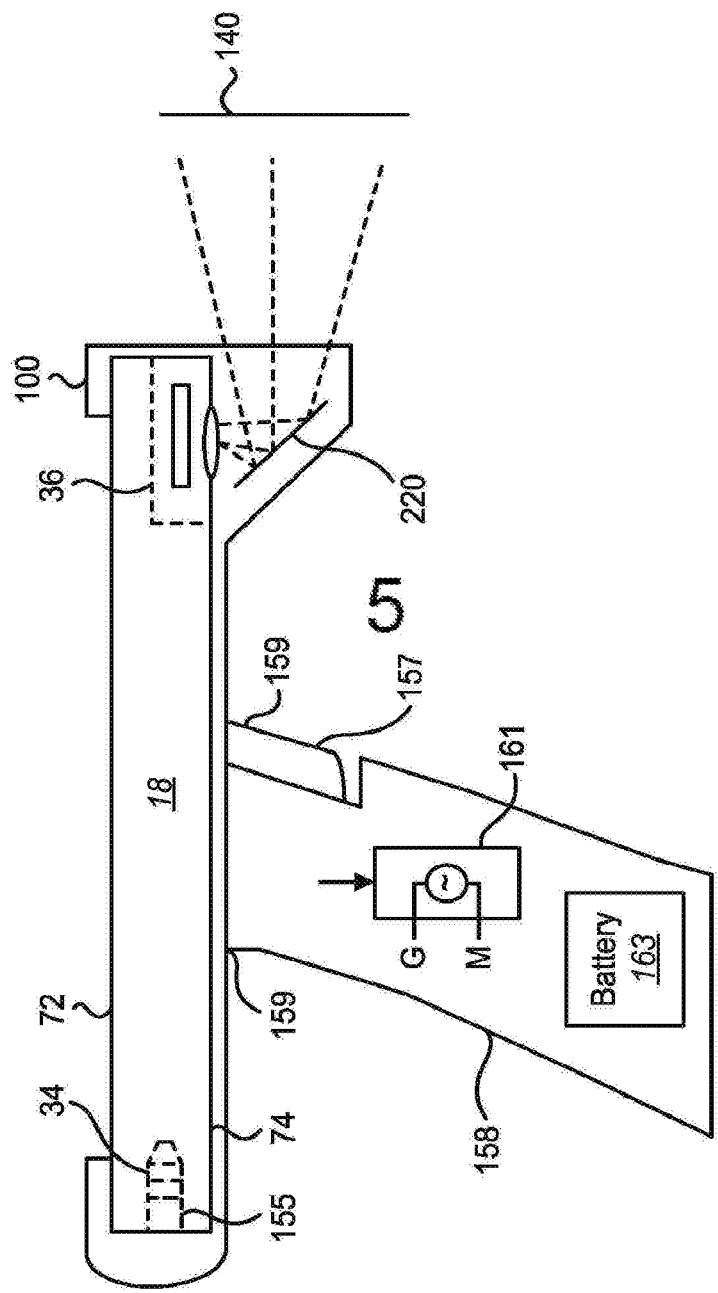
FIG. 14 illustrates an exemplary attachment for a barcode-reading enhancement system.

FIG. 14 depicts another exemplary attachment (shown as an encapsulating attachment 100 as an example) for a mobile device 18. The attachment 100 may have a handle 158 which extends downward away from the back surface 74 of the mobile device 18 and is sized and shaped to be gripped by an operator with the operator's thumb and forefinger being positioned at a shoulder 159 where the handle 158 meets a portion of the attachment 100 which is adjacent to the back surface 74 of the mobile device 18. When held in this manner the face surface 72 of the mobile device is visible to an operator looking downward.

A trigger switch 157 is positioned at the shoulder 159 and is intended to enable the operator to trigger reading of a barcode utilizing the same ergonomics of a typical "gun" type of barcode reader. The trigger switch 157 activates a trigger circuit 161.

The attachment 100 includes a microphone connector 155 (shown as a speaker/microphone male connector coupled within the speaker/microphone connector 34 of the mobile device 18).

The trigger circuit 161 includes an oscillator circuit configured to create a potential difference between the ground contact and the microphone contact of the speaker/microphone connector 155 that is detectable by the mobile device 18. The potential difference may be generated by physical movement of a magnet with respect to a coil with such physical movement being generated by pulling the trigger switch 157. A combination of springs and spring-activated switches may accentuate the movement of the magnet with respect to the coil and/or break the circuit to ensure that activation of the trigger switch 157 is detectable by the mobile device 18.

The attachment 100 may also include a structure described with respect to FIG. 10C or 10D for purposes of folding the optical path for illumination reflected from the target area 140 so that the field of view of the camera assembly 36 (e.g., the system field of view) is folded from the back surface 74 of the mobile device towards the target area 140 positioned at the top side of the mobile device 18. The attachment 100 also includes a battery 163 for supplying power to the components in the attachment 100.

Figure 15:
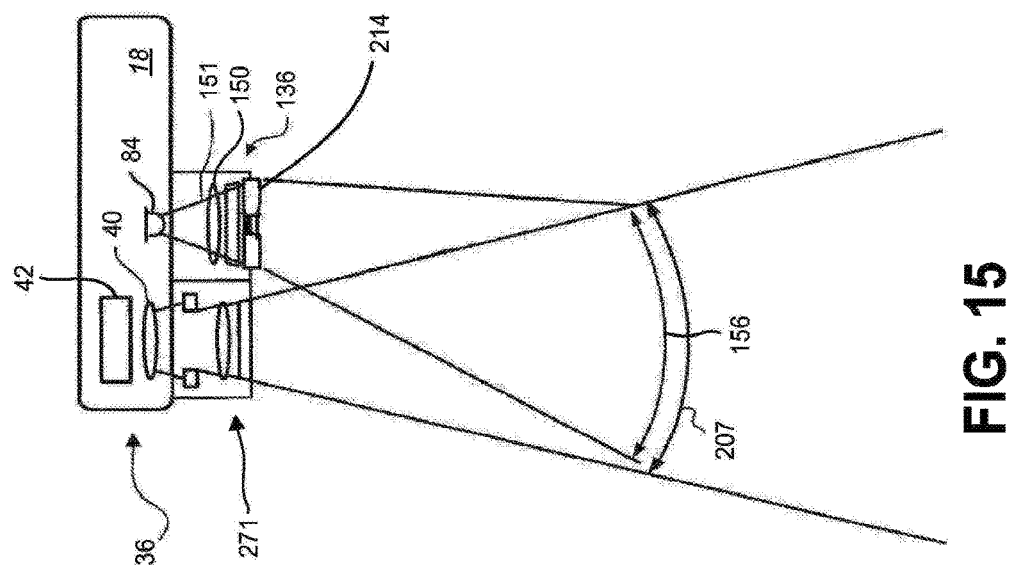
FIG. 15 illustrates an exemplary attachment for a barcode-reading enhancement system which includes a target-generating mechanism and supplementary optics.

FIG. 15 illustrates a mobile device 18 with an attachment 20 which may include supplementary optic system 271 for image capture and a target-generating structure 136 which utilizes the white light source 84 of the mobile device 18 to generate an intense targeting illumination pattern into the target area.

More particularly, the target-generating structure 136 may comprise a collimating lens 150 which is positioned within, and modifies, the field of illumination 151 of the white light source 84 into the shape of an intense targeting illumination pattern, which may be a pattern depicted in any of FIG. 8A, 8B, 8C or 8D. The target-generating structure 136 may include a filter 214 which may be a band pass filter or a low pass filter as described with respect to FIG. 19C for passing a certain color of illumination while attenuating wavelengths other than the certain color.

In a case where the intense targeting illumination pattern is as depicted in FIG. 8D with diffuse illumination across the field of view, the system illumination field 156 (e.g., illumination as modified by the target-generating structure 136) may substantially overlap with the system field of view 207. Thus, with the aid of the target-generating structure 136 the system field of view 207 may be effectively illuminated with diffuse illumination and the borders of the diffuse illumination (as depicted in FIG. 8D) may enable the user to properly position the mobile device 18 with respect to a barcode in the target area 140.

Figure 19A:
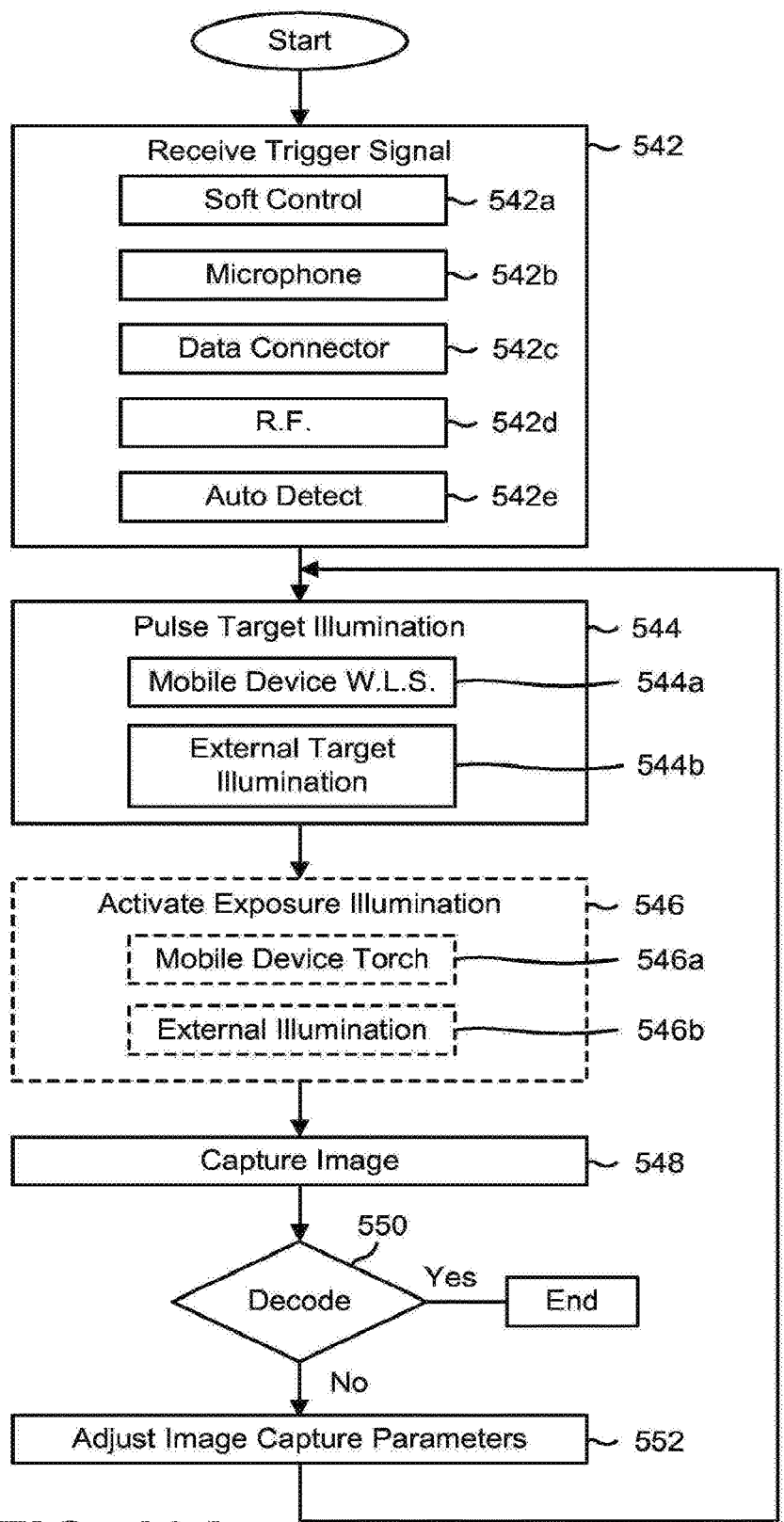
FIG. 19A depicts an exemplary method of target and exposure illumination and shutter control in accordance with one embodiment.
Figure 19B:
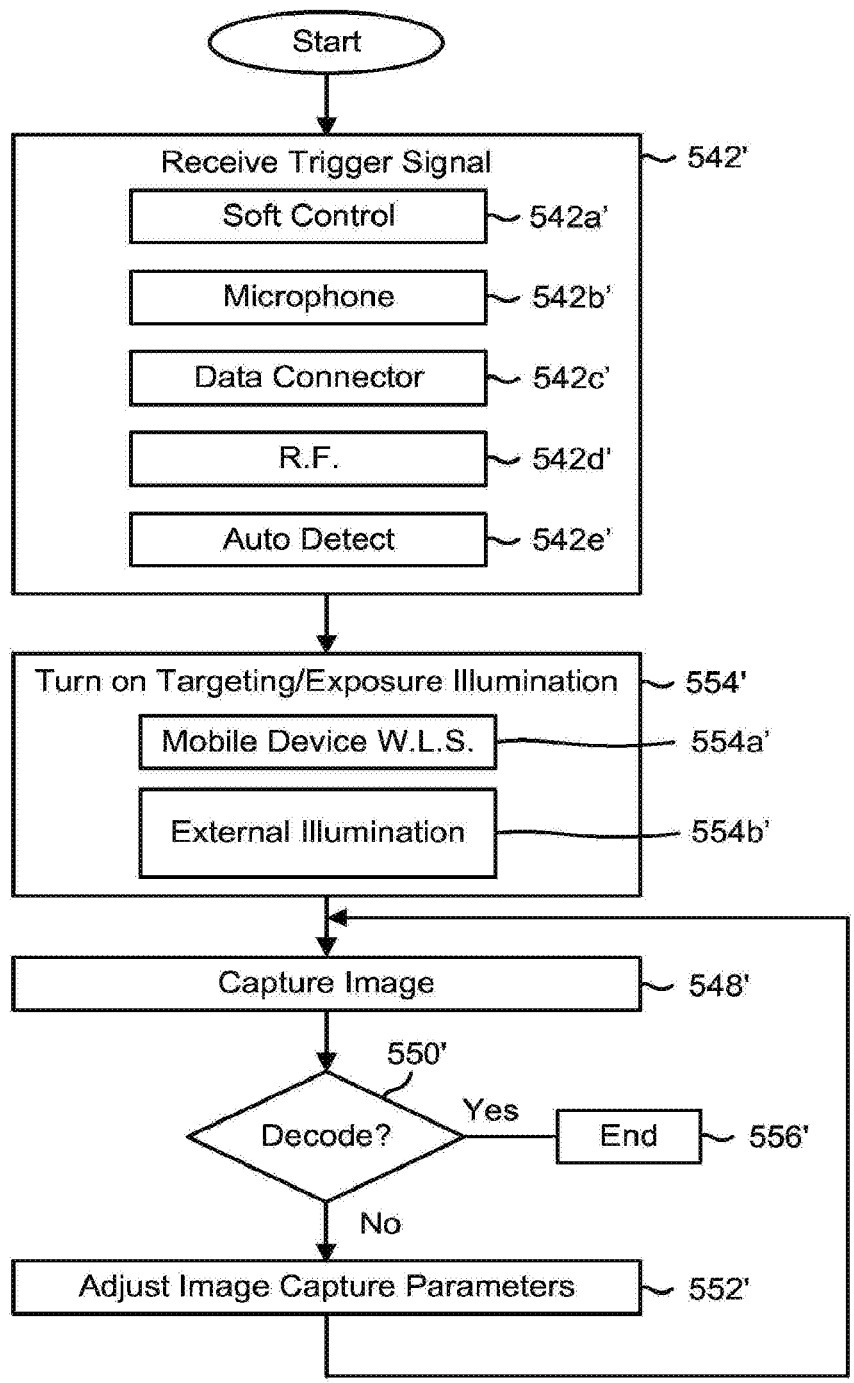
FIG. 19B depicts another exemplary method of target and exposure illumination and shutter control in accordance with another embodiment.
Figure 19C:
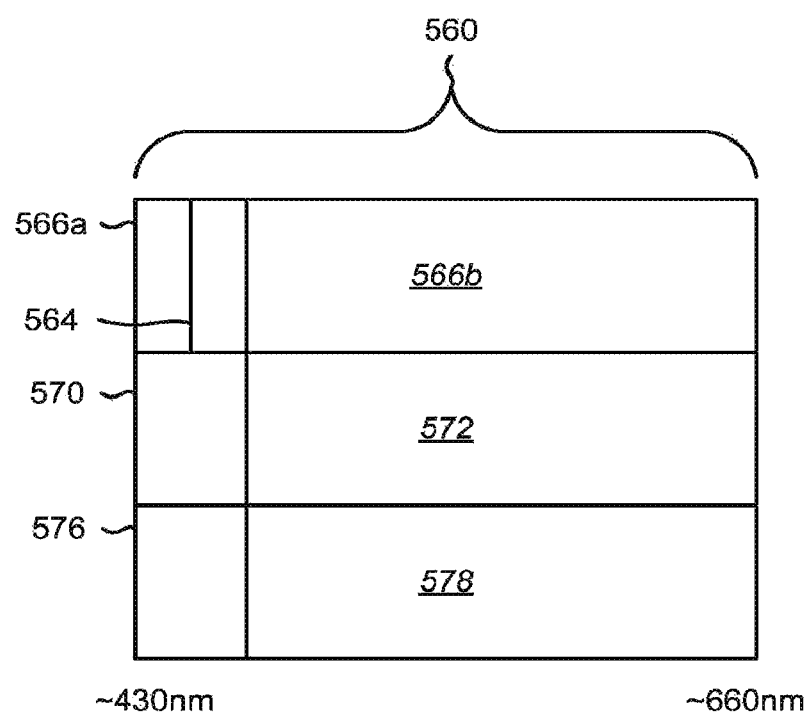
FIG. 19C represents a filtering arrangement for the targeting illumination and the supplemental optics.

In the event the targeting pattern does not provide diffuse illumination across the system field of view 207, the supplementary optic system 271 may include a high pass filter described with respect to FIG. 19C such that the illumination of the targeting pattern (as filtered) is attenuated by the high pass filter and does not affect the intensity of the illumination incident on the photo sensor 42.

Figure 23:
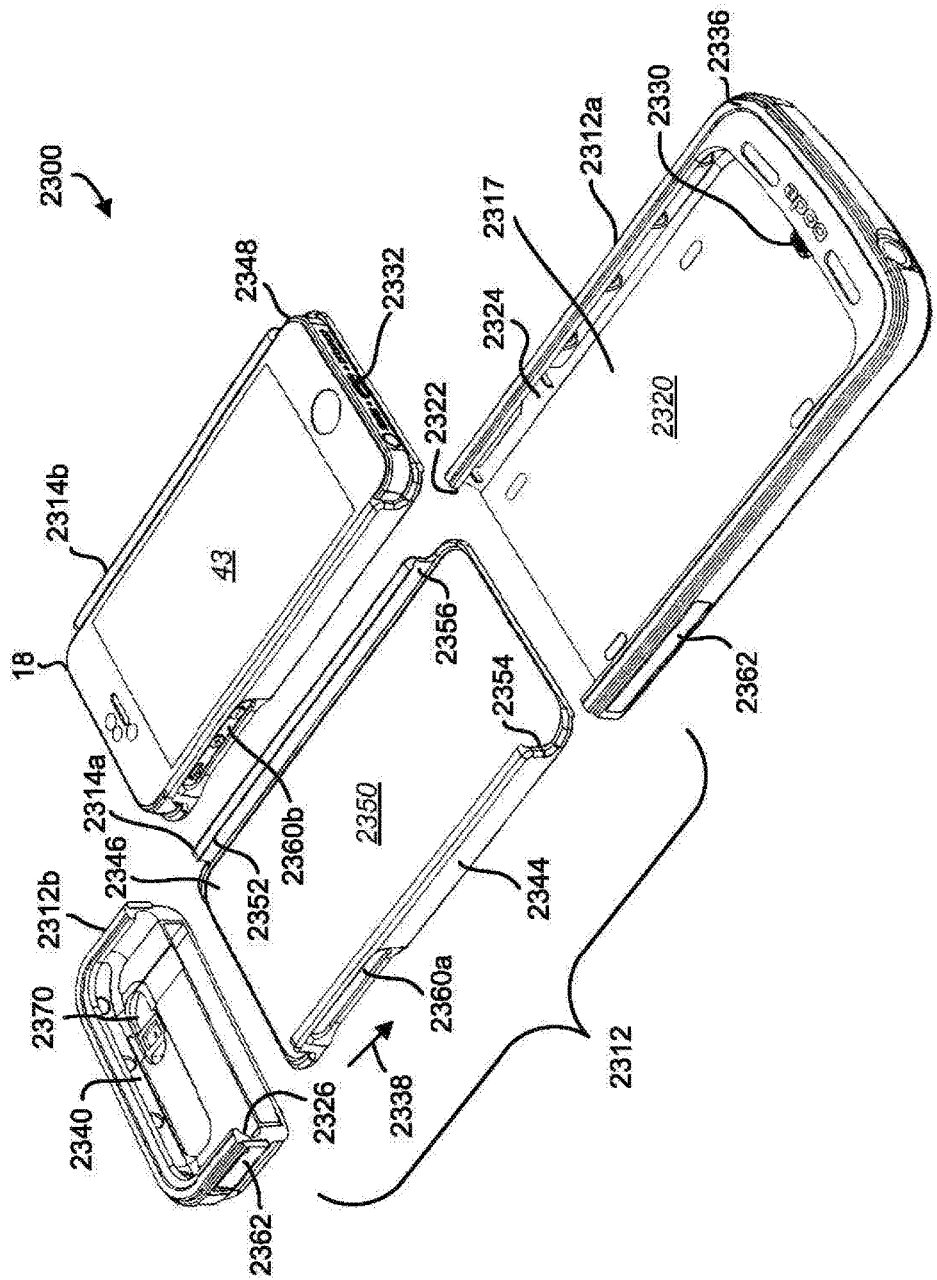
FIG. 23 is an exploded view of an exemplary barcode-reading enhancement accessory configured as an encapsulating attachment.

FIG. 23 is an exploded view of an exemplary barcode-reading enhancement accessory 2300 configured as an encapsulating attachment. The barcode-reading enhancement accessory 2300 may comprise an outer case 2312 and one or more inner carriages 2314a, 2314b. FIG. 23 depicts two inner carriages 2314a, 2314b as an example. However, the accessory 2300 may include just one inner carriage or more than two inner carriages. The accessory 2300 may further include an impact-absorbing cover 2336 positioned over, or molded over, at least a portion of the outer case 2312 to protect a mobile device 18 encased therein.

The outer case 2312 may comprise a cavity 2317 into which each one of the inner carriages 2314a, 2314b may be inserted. One inner carriage 2314a, 2314b may be accommodated in the outer case 2312 at one time. The cavity 2317 may be defined by the interior surfaces of the outer case 2312. More specifically, the cavity 2317 may be defined by a back side interior surface 2320, a face interior surface 2322 which is generally parallel to the back side interior surface 2320, a top edge interior surface 2340, a bottom edge interior surface (not shown in FIG. 23), which is opposite, and parallel, to the top edge interior surface 2340, a left edge interior surface 2326, and a right edge interior surface 2324, which is opposite, and parallel, to the left edge interior surface 2326. Each of the top edge interior surface 2340, the bottom edge interior surface, the left edge interior surface 2326, and the right edge interior surface 2324 may be generally planar and extend between the back side interior surface 2320 and the face interior surface 2322, and define a perimeter of each of the back side interior surface 2320 and the face interior surface 2322. The top edge interior surface 2340 and the bottom edge interior surface may each be orthogonal to each of the left edge interior surface 2326 and the right edge interior surface 2324. The face interior surface 2322 may include an aperture through which a display screen 43 of a mobile device 18 may be viewed and as such the face interior surface 2322 may be a thin band which extends around the periphery defined by the top edge interior surface 2340, the bottom edge interior surface, the left edge interior surface 2326, and the right edge interior surface 2324.

The outer case 2312 may be open to enable the inner carriage 2314a, 2314b to be inserted into, and removed from, the outer case 2312. For example, as shown in FIG. 23, the outer case 2312 may comprise two mating parts 2312a, 2312b, which can be secured to each other to form the outer case 2312. The two mating parts 2312a, 2312b may be secured to each other, for example, by sliding one mating part 2312b in a mating direction 2338 towards the other mating part 2312a until the two mating parts 2312a, 2312b are secured by a latching (fastening or clamping) mechanism. The latching mechanism may be provided on the side walls or a back side surface of the outer case 2312. Any conventional latching, fastening, or clamping mechanism may be employed to secure the two mating parts 2312a, 2312b. Similarly the outer case 2312 may be opened by releasing the latching mechanism and sliding the two mating parts 2312a, 2312b apart.

Figure 30:
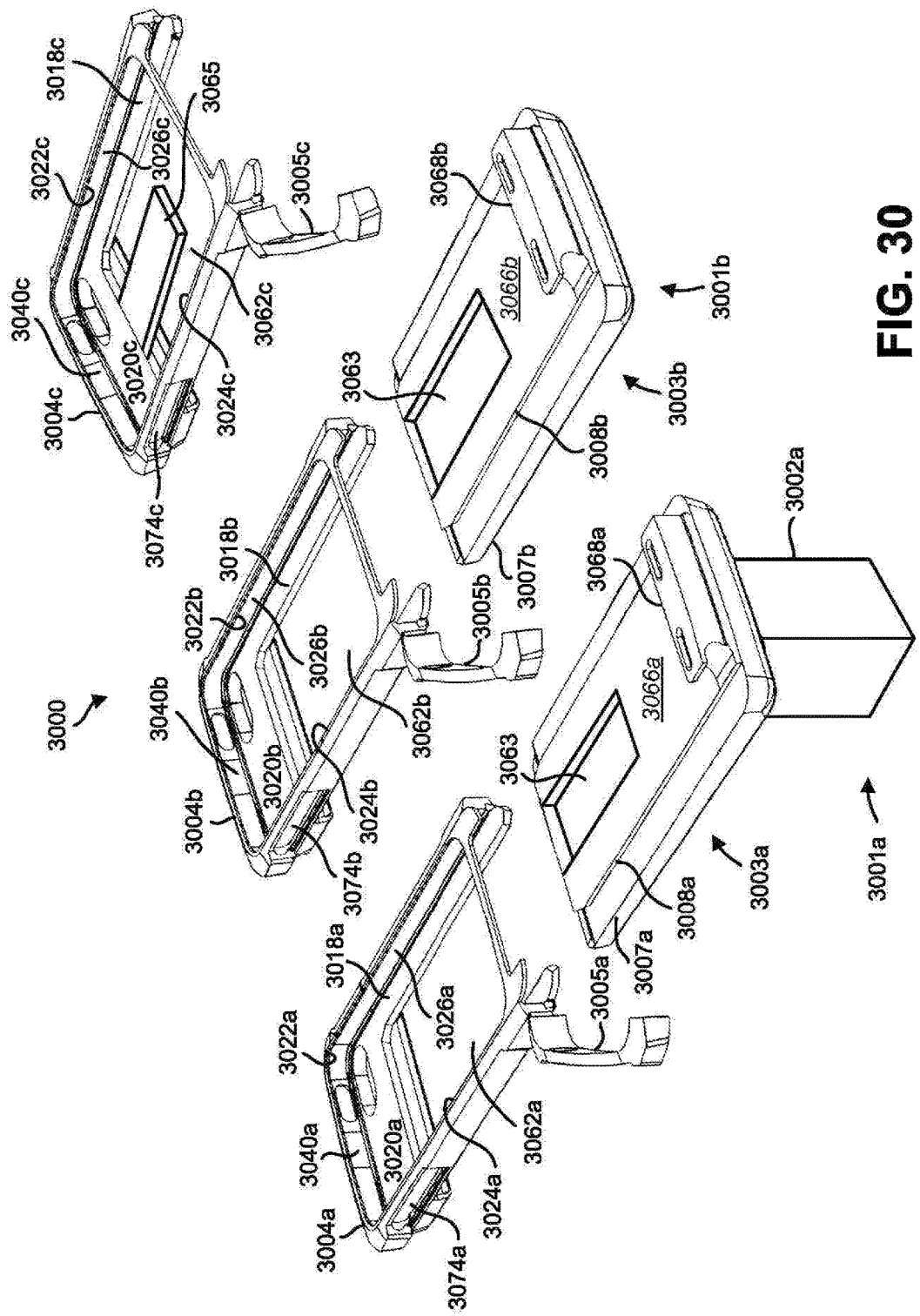
FIG. 30 shows another exemplary barcode-reading enhancement accessory configured as an encapsulating attachment in accordance with another embodiment.
Figure 31:
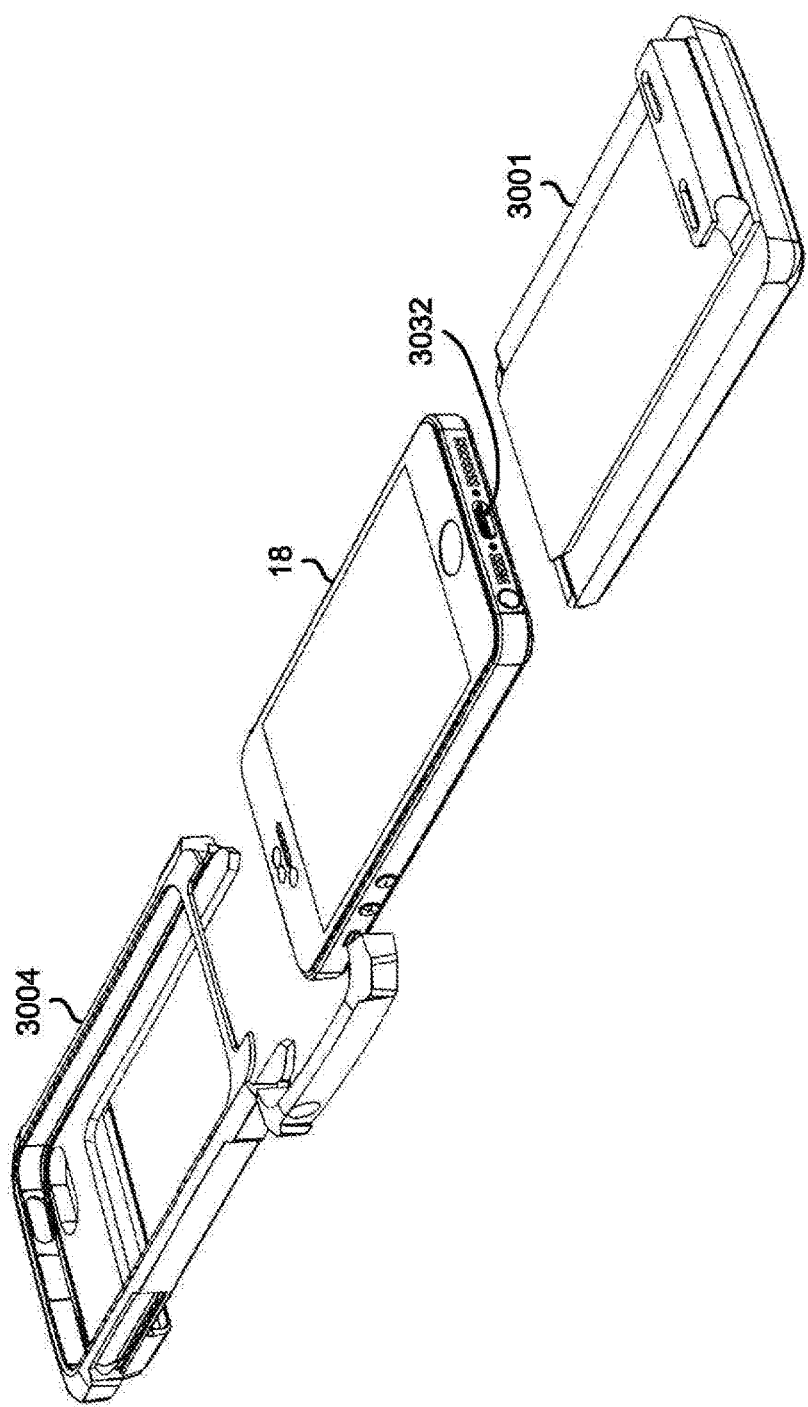
FIG. 31 depicts a case and a platform of another exemplary barcode-reading enhancement accessory along with a mobile device.
Figure 32:
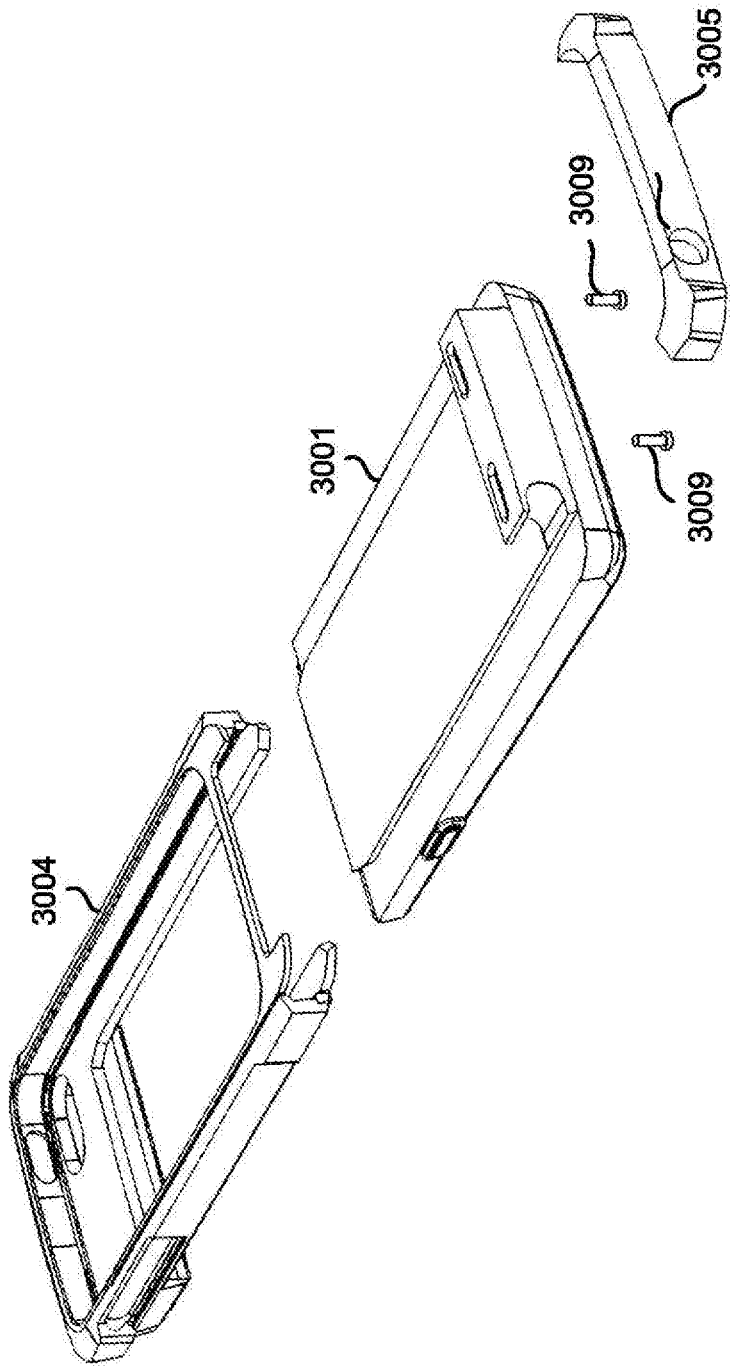
FIG. 32 shows an exemplary barcode-reading enhancement accessory with a different latching mechanism.

Alternatively, the two mating parts may be connected together by a hinge at one corner of the outer case 2312 and may be secured at the other corner by a latching mechanism, similar to the embodiment shown in FIGS. 30 and 31, or may be connected by screws or pins, similar to the embodiment shown in FIG. 32. Alternatively, the outer case 2312 may be a one-piece component and the combination of the inner carriage 2314a, 2314b and the mobile device 18 may be simply pushed into the cavity of the outer case 2312.

Each inner carriage 2314a, 2314b may include a cavity 2346 to accommodate a mobile device 18 therein. FIG. 23 shows the inner carriage 2314b with a mobile device 18 accommodated therein. Each inner carriage 2314a, 2314b may accommodate a particular size or model of a mobile device 18 for which each inner carriage 2314a, 2314b is designed.

The cavity 2346 of the inner carriage 2314a, 2314b may be defined by the interior surfaces of the inner carriage 2314a, 2314b. For example, the cavity 2346 of the inner carriage 2314a, 2314b may be defined by a back side interior surface 2350, a face interior surface 2352 (if present), which is generally parallel to the back side interior surface 2350, and i) a left edge interior surface 2354 and a right edge interior surface 2356, which is opposite, and parallel, to the left edge interior surface 2354, and/or ii) a top edge interior surface (not depicted in FIG. 23) and a bottom edge interior surface (not depicted in FIG. 23). FIG. 23 shows the inner carriage 2314a, 2314b having a left edge interior surface 2354 and a right edge interior surface 2356. However, it should be noted that the inner carriage 2314a, 2314b may have all four edge interior surfaces or may only have a top edge interior surface and a bottom edge interior surface.

Each of the top edge interior surface (if present), the bottom edge interior surface (if present), the left edge interior surface 2354 (if present), and the right edge interior surface 2356 (if present) may be generally planar and extend between the back side interior surface 2350 (and the face interior surface 2352 if present), and define a perimeter of each of the back side interior surface 2350 and the face interior surface 2352. The top edge interior surface (if present) and the bottom edge interior surface (if present) may each be orthogonal to each of the left edge interior surface 2354 and the right edge interior surface 2356. The face interior surface 2352 (if present) may include an aperture (or otherwise be open) through which a display screen 43 of a mobile device 18 may be viewed and as such the face interior surface may be a thin band which extends around along each of the left edge interior surface 2354 and right edge interior surface 2356.

At least a portion of the interior surface of the inner carriage 2314a, 2314b conforms to at least a portion of an exterior surface 2348 of a mobile device 18 for which the inner carriage 2314a, 2314b is designed. Each inner carriage 2314a, 2314b may have dimensions of its interior surface different from other inner carriages 2314a, 2314b. Each inner carriage 2314a, 2314b has its interior dimensions sized to fit the exterior dimensions of a mobile device 18 of a different size or model such that a mobile device 18 of a different size or model may be accommodated in the outer case 2312 using a corresponding inner carriage 2314a, 2314b designed for the mobile device 18.

At least a portion of the exterior surface 2344 of the inner carriage 2314a, 2314b conforms to at least a portion of one or more of the interior surfaces of the outer case 2312. The inner carriage 2314a, 2314b, when inserted into the cavity 2317, may be secured in position without room for movement in at least one of the directions: i) between the top edge interior surface 2340 and the bottom edge interior surface; ii) between the left edge interior surface 2326 and the right edge interior surface 2324; and iii) between the back side interior surface 2320 and the face interior surface 2322. In directions where the fit between portions of the exterior surface 2344 of the inner carriage 2314a, 2314b and the interior surfaces of the outer case 2312 may not fully secure the inner carriage 2314a, 2314b from movement, when a mobile device 18 is inserted into the inner carriage 2314a, 2314b and the combination is inserted into the cavity 2317, the combined exterior dimensions of the inner carriage 2314a, 2314b and the mobile device 18 may secure the inner carriage 2314a, 2314b from movement in at least one of the directions: i) between the top edge interior surface 2340 and the bottom edge interior surface; ii) between the left edge interior surface 2326 and the right edge interior surface 2324; and iii) between the back side interior surface 2320 and the face interior surface 2322.

The mobile device 18 is accommodated within the inner carriage 2314a, 2314b and the combination of the inner carriage 2314a, 2314b and the mobile device 18 is inserted into the cavity 2317 of the outer case 2312. The combined exterior dimensions of the inner carriage 2314a, 2314b and the mobile device 18 may fit the interior dimension of the cavity 2317 so that the combination of the inner carriage 2314a, 2314b and the mobile device 18 is secured from movement in all of directions: i) between the top edge interior surface 2340 and the bottom edge interior surface; ii) between the left edge interior surface 2326 and the right edge interior surface 2324; and iii) between the back side interior surface 2320 and the face interior surface 2322. When so secured, the position at which the mobile device 18 is positioned with respect to the outer case 2312 is referenced to as the "operating position."

The accessory 2300 also includes an optic system 2370. The optic system 2370 is secured to the outer case 2312 and is configured to fold an optical path (extending to the back side of the mobile device 18 to a direction extending into the area beyond the top edge of the mobile device 18) of at least one of a field of illumination of a light source of the mobile device 18 or a field of view of a camera of the mobile device 18 when the mobile device 18 is accommodated in the outer case 2312 using the inner carriage 2314a, 2314b.

When the mobile device 18 is in the operating position, the optic system 2370 of the accessory 2300 may be within at least one of the field of illumination of the white light source of the mobile device 18 and/or the field of view of the camera of the mobile device 18. The dimensions of the inner carriage 2314a, 2314b are selected so that the mobile device 18 is positioned within the cavity 2317 of the outer case 2312 so that the optic system 2370 is within at least one of the field of illumination of the white light source of the mobile device 18 and/or the field of view of the camera of the mobile device 18.

The optic system 2370 may include, or be configured similarly to, any of the other optic systems, or components, thereof, including those described with respect to FIGS. 10A, 10B, 10C, 10D, 11A, 11B, 12A, 12B, 12C, 12D, 13, 14, and 15.

The outer case 2312 may include a connector 2330 on the interior surface (e.g., on the bottom interior surface of the outer case 2312) for connection to the mating connector 2332 of the mobile device 18 when the mobile device is secured in the outer case 2312. The outer case 2312 may include a trigger switch (not shown) for an operator to trigger capturing of a barcode with the mobile device 18. A trigger circuit included in the outer case 2312 may send a trigger signal to the mobile device via the connector 2330 as described herein.

Figure 24:
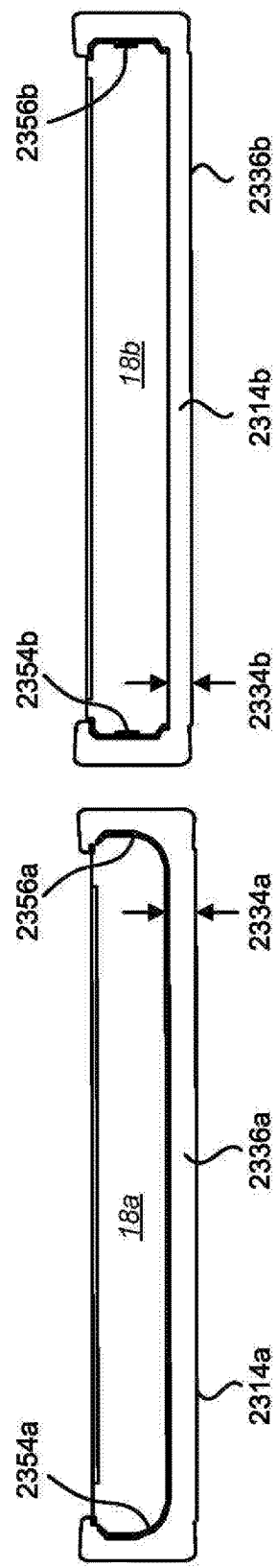
FIGS. 24A and 24B are sectional views of the case encasing a mobile device.

When the mobile device 18 is in the operating position, the connector 2330 within the interior of the outer case 2312 is aligned both vertically and horizontally with the mating connector 2332 on the mobile device 18. The dimensions and shape of the inner carriage 2314a, 2314b are selected so that when the combination of the inner carriage 2314a, 2314b and the mobile device 18 is secured in the outer case 2312, the connector 2330 in the outer case 2312 is aligned both vertically and horizontally with the mating connector 2332 on the mobile device 18. FIGS. 24A and 24B are sectional views of exemplary inner carriages 2314a, 2314b with a mobile device 18 inserted therein. The dimensions including the thickness 2334a, 2334b of the back panel 2336a, 2336b of each inner carriage 2314a, 2314b and the shape of the internal surfaces of each inner carriage 2314a, 2314b are selected for a particular model or size of a mobile device 18a, 18b, respectively, so that when the combination of the mobile device 18a, 18b and the corresponding inner carriage 2314a, 2314b is inserted into the outer case 2312, the connector 2330 in the outer case 2312 and the mating connector 2332 on the mobile device 18 are aligned.

Each inner carriage 2314a, 2314b may include one or more apertures 2360a, 2360b within one or more of its walls to expose control buttons or switches on the mobile device 18 when the mobile device 18 is inserted into the inner carriage 2314a, 2314b. Each inner carriage 2314a, 2314b is designed for a mobile device 18 of a particular model or size so that each aperture 2360a, 2360b is positioned for the control buttons or switches on the mobile device 18 of a particular model or size for which the inner carriage 2314a, 2314b is designed. Alternatively, instead of the aperture(s) 2360a, 2360b, a flexible button or switch may be formed in the corresponding position in the wall(s) of the inner carriage 2314a, 2314b so that the control buttons or switches on the mobile device 18 may be operated through the flexible button or switch formed in the wall(s) of the inner carriage 2314a, 2314b.

The outer case 2312 may include one or more apertures 2362 in one or more of its walls in a location(s) corresponding to the aperture 2360a, 2360b in the inner carriage 2314a, 2314b. The aperture(s) 2362 may include a superset of the apertures 2360a, 2360b of some or all of inner carriages 2314a, 2314b that the outer case 2312 may accommodate. Stated another way, since the outer case 2312 may accommodate a number of different inner carriages 2314a, 2314b designed for different mobile devices, an aperture 2362 may be formed within the wall(s) of the outer case 2312 to cover apertures 2360a, 2360b of some or all of the inner carriages 2314a, 2314b that may be inserted into the outer case 2312. As such, the control buttons or switches of each mobile device 18 may be accessed through the aperture 2360a, 2360b in the inner carriage 2314a, 2314b and the aperture 2362 in the outer case 2312. The aperture 2362 in the outer case 2312 may be larger than the aperture 2360a, 2360b in the inner carriage 2314a, 2314b. Alternatively, instead of aperture(s) 2362, a flexible button(s) or switch(es) may be formed in the wall(s) of the outer case 2312 so that the control buttons or switches on the mobile device may be operated through the flexible buttons or switches.

Figure 25:
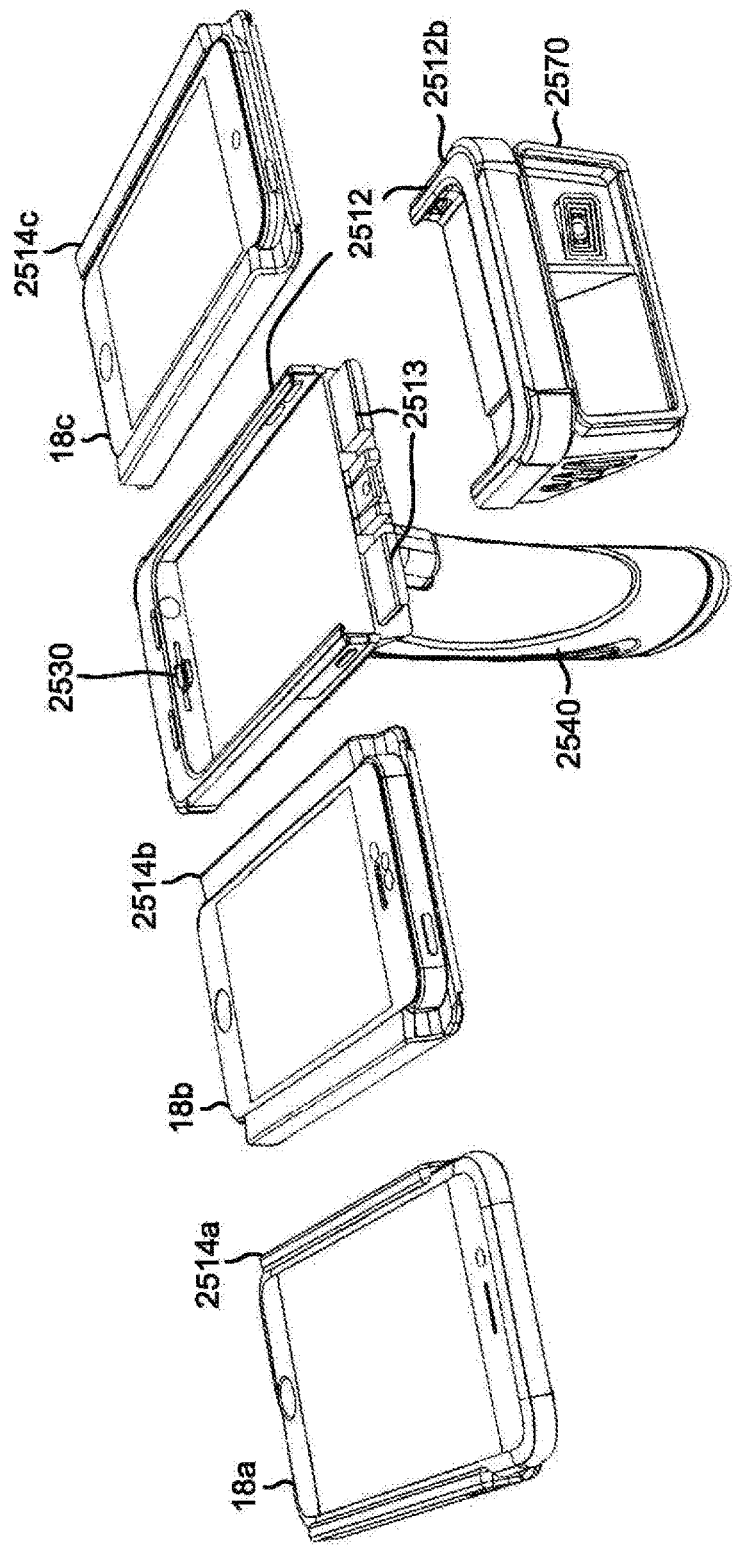
FIG. 25 shows an exemplary outer case and exemplary inner carriages that may be accommodated in the outer case.

FIG. 25 shows an exemplary outer case 2512 and exemplary inner carriages 2514a-2514c with structural components similar to those described with respect to FIG. 23. The outer case 2512 may comprise two mating parts 2512a, 2512b that are combined to form the outer case 2512. For example, one of the mating parts 2512a, 2512b may include a tongue(s) 2513 and the other may include a groove (not shown) for connecting the two mating parts 2512a, 2512b. Alternatively, any other connecting and locking mechanism may be employed to combine the two mating parts 2512a, 2512b.

Each inner carriage 2514a-2514c is designed for accommodating a mobile device 18a-18c of a different model or size. Each combination of an inner carriage 2514a-2514c and a mobile device 18a-18c is inserted into the cavity of the outer case 2512. The outer case 2512 includes a connector 2530 for connecting with a mating connector on the mobile device 18a-18c.

A handle 2540 may be attached to, or be a part of, the outer case 2512, similar to the embodiment shown in FIG. 14. The handle 2540 may be attachable and detachable. The handle 2540 extends downward away from the back exterior surface of the outer case 2512 and is sized and shaped to be gripped by an operator with the operator's hand. When held by the operator, the face surface of the mobile device 18a-18c is visible to the operator looking downward. The handle 2540 may have a trigger switch to enable the operator to initiate reading of a barcode with the mobile device 18a-18c. The trigger switch activates a trigger circuit in the handle 2540 which sends a trigger signal to the mobile device 18 via the connector 2530. The handle 2540 may include a battery for supplying power to the components in the handle 2540 and a charging power to the mobile device 18.

An optic system 2570 may be attached to, or be a part of, the outer case 2512. When the mobile device 18 is inserted into the outer case 2512, the optic system 2570, similar to the attachment 110 disclosed with respect to FIGS. 10C and 10D, may fold the optical path of the field of illumination of the light source of the mobile device 18 and/or the field of view of the camera of the mobile device 18 such that the field of illumination of the light source or the field of view of the camera is folded from the back side of the mobile device 18 towards the target area positioned at the top side of the mobile device 18.

The optic system 2570 may include, or be configured similarly to, any of the other optic systems, or components, thereof, including those described with respect to FIGS. 10A, 10B, 10C, 10D, 11A, 11B, 12A, 12B, 12C, 12D, 13, 14, and 15.

Figure 26:
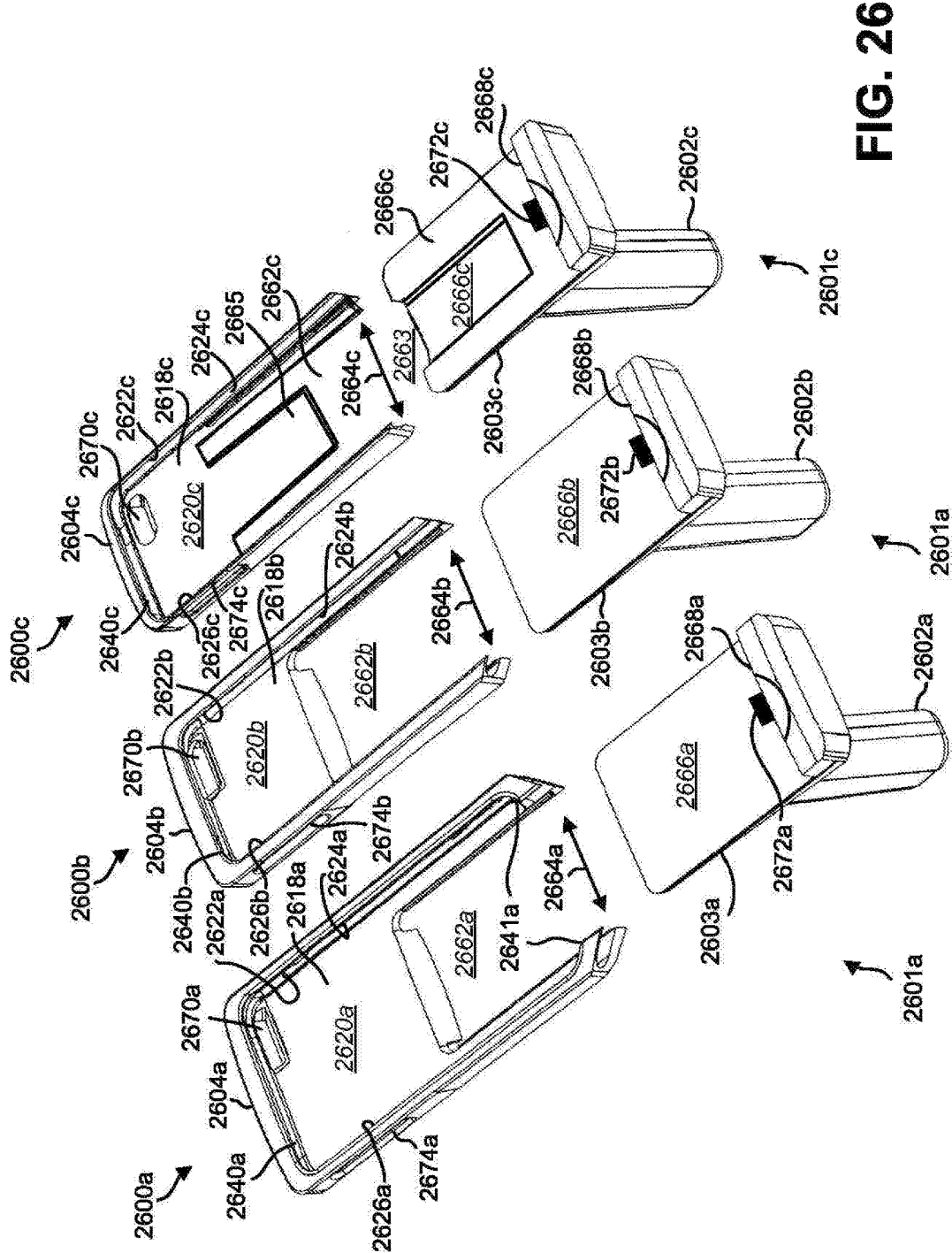
FIG. 26 shows an exemplary barcode-reading enhancement accessory configured as an encapsulating attachment in accordance with another embodiment.
Figure 27:
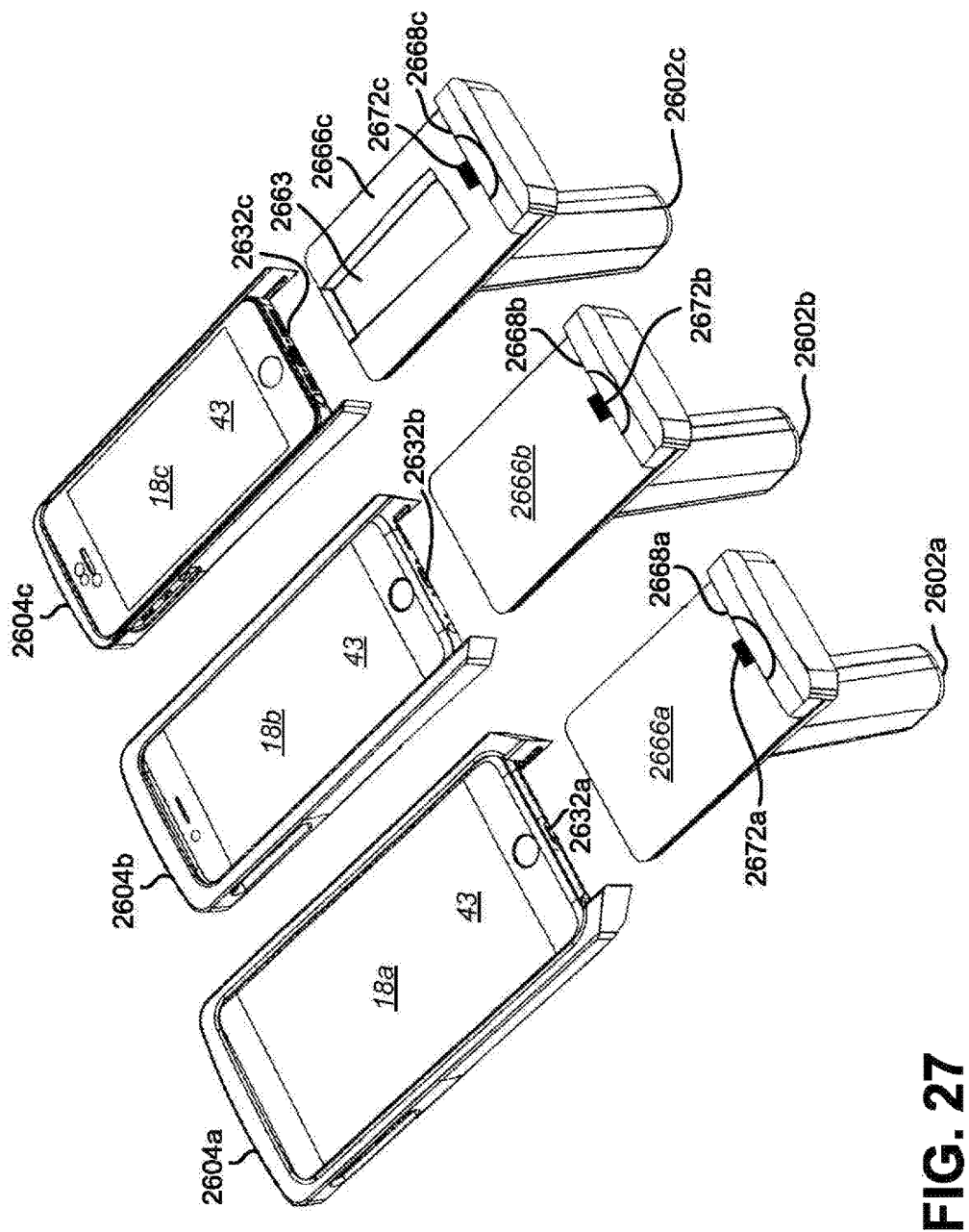
FIG. 27 shows the barcode-reading enhancement accessory of FIG. 26 with a mobile device encased into the cavity of the case.
Figure 28:
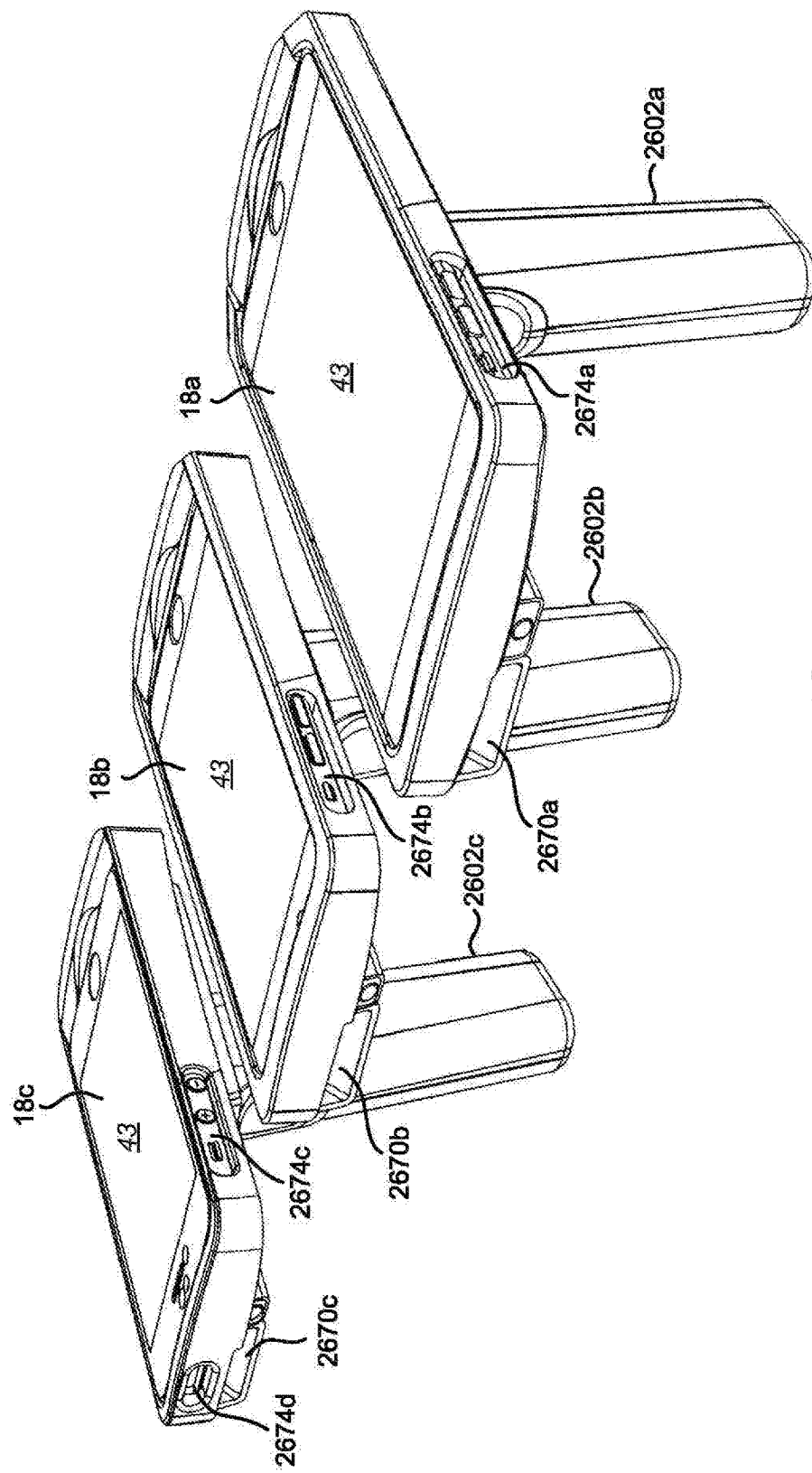
FIG. 28 shows the combined state of the case and the handle assembly of the barcode-reading enhancement accessory of FIG. 26.

FIG. 26 shows an exemplary barcode-reading enhancement accessory 2600a, 2600b, 2600c configured as an encapsulating attachment in accordance with another embodiment. FIG. 27 shows the barcode-reading enhancement accessory of FIG. 26 with a mobile device encased into the cavity of the case. FIG. 28 shows the combined state of the case and the handle assembly of the barcode-reading enhancement accessory of FIG. 26.

A barcode-reading enhancement accessory 2600a, 2600b, 2600c may comprise a handle assembly 2601a, 2601b, 2601c and a case 2604a, 2604b, 2604c. Each case 2604a, 2604b, 2604c is configured for encasing a mobile device 18a, 18b, 18c of a different model or size. The interior and/or exterior dimensions of each case 2604a, 2604b, 2604c is designed differently for accommodating a particular model or size of a mobile device 18a, 18b, 18c. The handle assembly may be generic to all or some of the cases 2604a, 2604b, 2604c so that the same handle assembly may be used with multiple cases 2604a, 2604b, 2604c. Alternatively, each handle assembly 2601a, 2601b, 2601c may be designed for a particular mobile device and may be used with a corresponding case designed for the particular mobile device.

The case 2604a, 2604b, 2604c may comprise a cavity 2618a, 2618b, 2618c into which a mobile device 18a, 18b, 18c is inserted. The cavity 2618a, 2618b, 2618c may be defined by interior surfaces comprising a back side interior surface 2620a, 2620b, 2620c, a face interior surface 2622a, 2622b, 2622c, which is generally parallel to the back side interior surface 2620a, 2620b, 2620c, a top edge interior surface 2640a, 2640b, 2640c, a left edge interior surface 2626a, 2626b, 2626c, and a right edge interior surface 2624a, 2624b, 2624c, which is opposite, and parallel, to the left edge interior surface 2626a, 2626b, 2626c.

The case (e.g., case 2604a) may also include a bottom edge interior surface 2641a, which is opposite, and parallel, to the top edge interior surface 2640a. The case (e.g., case 2604b, 2604c) may not have the bottom edge interior surface. In this case, a docking surface 2668b, 2668c of the handle assembly 2601b, 2601c closes the cavity 2618b, 2618c.

Each of the top edge interior surface 2640a, 2640b, 2640c, the bottom edge interior surface 2641a (or the docking surface 2668a, 2668b, 2668c), the left edge interior surface 2626a, 2626b, 2626c, and the right edge interior surface 2624a, 2624b, 2624c may be generally planar and extend between the back side interior surface 2620a, 2620b, 2620c and the face interior surface 2622a, 2622b, 2622c, and define a perimeter (perimeter edges) of each of the back side interior surface 2620a, 2620b, 2620c and the face interior surface 2622a, 2622b, 2622c. The top edge interior surface 2640a, 2640b, 2640c and the bottom edge interior surface 2641a (or the docking surface 2668a, 2668b, 2668c) may each be orthogonal to each of the left edge interior surface 2626a, 2626b, 2626c and the right edge interior surface 2624a, 2624b, 2624c.

The back side interior surface 2620a, 2620b, 2620c and the bottom edge interior surface 2641a may each include apertures 2662a, 2662b, 2662c and 2664a, respectively. The lack of the bottom edge interior surface in cases 2604b and 2604c forms apertures 2664b and 2664c.

The handle assembly 2601a, 2601b, 2601c may include a handle 2602a, 2602b, 2602c and a platform 2603a, 2603b, 2603c. The platform 2603a, 2603b, 2603c includes a platform surface 2666a, 2666b, 2666c and a docking surface 2668a, 2668b, 2668c. When the case 2604a, 2604b, 2604c is coupled to the handle assembly 2601a, 2601b, 2601c, the platform surface 2666a, 2666b, 2666c may: i) be flush (alternatively may not be flush) with the back side interior surface 2620a, 2620b, and 2620c, and ii) fill (or substantially fill) the aperture 2662a, 2662b, 2662c. Similarly the docking surface 2668a, 2668b, 2668c may: i) be flush (alternatively may not be flush) with the bottom edge interior surface 2641a, and fill (or substantially fill) the aperture 2664a, 2664b, 2664c thereby completing the partial bottom edge interior surface 2641a of the case 2604a or becoming the entire bottom edge interior surface of the case 2604b, 2604c.

As shown in FIG. 28, the case 2604a, 2604b, 2604c (with the mobile device 18a, 18b, 18c encased in it) is coupled to the handle assembly 2601a, 2601b, 2601c before using as a barcode-reading device. For coupling the case 2604a, 2604b, 2604c to the handle assembly 2601a, 2601b, 2601c, a coupling structure may be provided in the case 2604a, 2604b, 2604c and the handle assembly 2601a, 2601b, 2601c. For example, a tongue (or a groove) may be formed along the left and right edges of the platform surface 2666a, 2666b, 2666c and a groove (or a tongue) may be formed along the left and right edges of the aperture 2662a, 2662b, 2662c of the back side interior surface of the case 2604a, 2604b, 2604c so that the case 2604a, 2604b, 2604c may be coupled to the handle assembly 2601a, 2601b, 2601c by sliding the tongue along the groove. Alternatively or additionally, a ridge and a rail may be formed along the left and right edges of the platform surface 2666a, 2666b, 2666c and the left and right edges of the aperture 2662a, 2662b, 2662c. The ridge/rail combination may provide additional strength for securing the case 2604a, 2604b, 2604c to the handle assembly 2601a, 2601b, 2601c and provide greater strength against torsional forces in the direction 2692 shown in FIG. 29 than if the case 2604a, 2604b, 2604c is simply mounted to the handle assembly 2601a, 2601b, 2601c by a mechanical structure on its bottom edge.

The face interior surface 2622a, 2622b, 2622c may also include an aperture through which a display screen 43 of a mobile device 18a, 18b, 18c (as shown in FIG. 27) may be viewed and as such the face interior surface 2622a, 2622b, 2622c may be a thin band which extends around the periphery defined by the top edge interior surface 2640a, 2640b, 2640c, the bottom edge interior surface 2641a (or the docking surface 2668a, 2668b, 2668c), the left edge interior surface 2626a, 2626b, 2626c, and the right edge interior surface 2624a, 2624b, 2624c.

The handle assembly 2601a, 2601b, 2601c and the case 2604a, 2604b, 2604c are separable as depicted in both FIGS. 26 and 27 to enable the mobile device 18a, 18b, 18c to be inserted into, and removed from, the case 2604a, 2604b, 2604c. The handle assembly 2601a, 2601b, 2601c and the case 2604a, 2604b, 2604c may be coupled to each other by sliding the case 2604a, 2604b, 2604c towards the docking surface 2668a, 2668b, 2668c of the handle assembly 2601a, 2601b, 2601c (while the bottom edge interior surface 2620a, 2620b, 2620c is flush with the platform surface 2666a, 2666b, 2666c) and engaging a latching mechanism (not shown). Any conventional latching, fastening, or clamping mechanism may be used to secure the case 2604a, 2604b, 2604c to the handle assembly 2601a, 2601b, 2601c.

At least a portion of the interior surfaces (shown in FIG. 26) of the case 2604a, 2604b, 2604c (including the docking surface 2668a, 2668b, 2668c of the handle assembly 2601a, 2601b, 2601c) conform to at least a portion of an exterior surface of the mobile device 18a, 18b, 18b for which the case 2604a, 2604b, 2604c is configured. Each case 2604a, 2604b, 2604c may have different dimensions of its interior surfaces to fit a mobile device 18a, 18b, 18c of a different model or size. More specifically, each case 2604a, 2604b, 2604c may comprise interior surfaces into which a particular model or size of a mobile device 18a, 18b, 18c will securely fit. For example, case 2604a may be configured to fit the Apple iPhone 6 Plus®, case 2604b may be configured to fit the Apple iPhone 6®, and case 2604c may be configured to fit the Apple iPhone 5/5s®.

When the case 2604a, 2604b, 2604c carrying a mobile device 18a, 18b, 18c is coupled to the handle assembly 2601a, 2601b, 2601c, the position of the mobile device 18a, 18b, 18c with respect to the accessory 2600a, 2600b, 2600c is referred to as the "operating position," which is depicted in FIG. 28.

The accessory 2600a, 2600b, 2600c may include an optic system 2670a, 2670b, 2670c. The optic system 2670a, 2670b, 2670c is secured to the case 2604a, 2604b, 2604c and is configured to fold an optical path of at least one of a field of illumination of a light source of the mobile device 18a, 18b, 18c or a field of view of a camera of the mobile device 18a, 18b, 18c when the mobile device 18a, 18b, 18c is accommodated in the case 2604a, 2604b, 2604c.

When the mobile device 18a, 18b, 18c is in the operating position, the optic system 2670a, 2670b, 2670c of the accessory 2600a, 2600b, 2600c may be within at least one of the field of illumination of the white light source of the mobile device 18a, 18b, 18c and/or the field of view of the camera of the mobile device 18a, 18b, 18c. The dimensions of the case 2604a, 2604b, 2604c are selected so that the mobile device 18a, 18b, 18c is positioned within the cavity 2618a, 2618b, 2618c of the case 2604a, 2604b, 2604c so that the optic system 2670a, 2670b, 2670c is within at least one of the field of illumination of the white light source of the mobile device 18a, 18b, 18c and/or the field of view of the camera of the mobile device 18a, 18b, 18c.

In all embodiments, the operating system 48 or barcode-reading application may process and decode an image captured by the camera of the mobile device as such image is modified by the optic system, including optic systems 2370, 2570 and 2670.

A connector 2672a, 2672b, 2672c (e.g., Apple Lightning Connector®) may be provided on the docking surface 2668a, 2668b, 2668c of the handle assembly for connection to the mating connector 2632a, 2632b, 2632c of the mobile device 18a, 18b, 18c when the combined mobile device and case is coupled to the handle assembly 2601a, 2601b, 2601c. When the mobile device 18a, 18b, 18c is in the operating position, the connector 2672a, 2672b, 2672c on the handle assembly is aligned both vertically and horizontally with the mating connector 2632a, 2632b, 2632c on the mobile device 18a, 18b, 18c. The dimensions and shape of the case 2604a, 2604b, 2604c are selected so that when the combination of the case and the mobile device is coupled to the handle assembly 2601a, 2601b, 2601c, the connector 2672a, 2672b, 2672c on the handle assembly is aligned both vertically and horizontally with the mating connector 2632a, 2632b, 2632c on the mobile device 18a, 18b, 18c.

Typically the mating connector 2632a, 2632b, 2632c on the mobile device 18a, 18b, 18c will be in the center (between the left and right sides when the mobile device 18a, 18b, 18c is viewed in a portrait mode) of the mobile device 18a, 18b, 18c on its bottom surface. There are certain scenarios where all of the mobile devices 18a, 18b, 18c for which the cases 2604a, 2604b, 2604c are designed may have the mating connector 2632a, 2632b, 2632c positioned at the same distance from the back side exterior surface of the mobile device 18a, 18b, 18c. In these scenarios, that distance can be used for the distance between the platform surface 2666a, 2666b, 2666c and the connector 2672a, 2672b, 2672c of the handle assembly 2601a, 2601b, 2601c and the back side interior surface 2620a, 2620b, 2620c of each case 2604a, 2604b, 2604c may be flush with the platform surface 2666a, 2666b, 2666c.

However, there may be other cases where the distance between the mating connector 2632a, 2632b, 2632c on a mobile device 18a, 18b, 18c and the mobile device's back side exterior surface varies among the mobile devices 18a, 18b, 18c for which cases are designed. In these cases, the back side interior surface 2620a, 2620b, 2620c of the case 2604a, 2604b, 2604c may not be flush with the platform surface 2666a, 2666b, 2666c and the mobile device 18a, 18b, 18c should be raised above the platform surface 2666a, 2666b, 2666c to align the mating connector 2632a, 2632b, 2632c of the mobile device 18a, 18b, 18c to the connector 2672a, 2672b, 2672c on the docking surface 2668a, 2668b, 2668c. For example, as shown in the third example (case 2604c and handle assembly 2601c) in FIG. 26, a tongue 2665 may be provided in the back side interior surface 2620c of the case and a matching slot 2663 may be formed in the platform surface 2666c of the handle assembly 2601c. The thickness of the tongue 2665 can vary to raise the mobile device 18c above the platform surface 2666c to ensure alignment of the connector 2672c on the docking surface 2668c with the mating connector 2632c on the mobile device 18c.

Each case 2604a, 2604b, 2604c may include one or more apertures 2674a, 2674b, 2674c, 2674d within one or more of its walls to expose control buttons or switches on the mobile device 18a, 18b, 18c when the mobile device 18a, 18b, 18c is inserted into the case 2604a, 2604b, 2604c. Each case 2604a, 2604b, 2604c is designed for a mobile device 18a, 18b, 18c of a particular model or size so that each aperture 2674a, 2674b, 2674c, 2674d is positioned for the control buttons or switches on the corresponding mobile device 18a, 18b, 18c. Alternatively, instead of the aperture(s), a flexible button or switch may be formed in the corresponding position in the wall(s) of the case 2604a, 2604b, 2604c so that the control buttons or switches on the mobile device 18a, 18b, 18c may be operated through the flexible button or switch formed in the wall(s) of the case 2604a, 2604b, 2604c.

Figure 29:
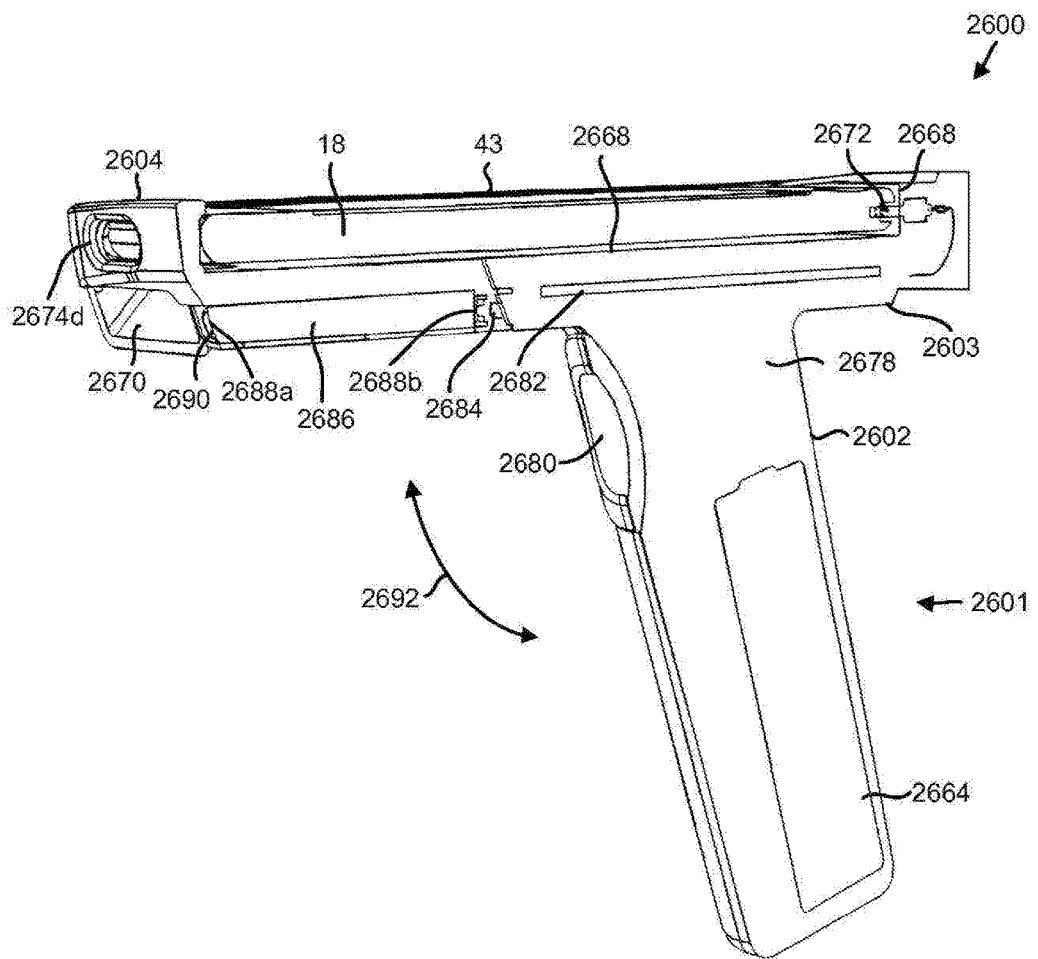
FIG. 29 is a cutaway view of an accessory with the handle assembly assembled with a case to encase a mobile device.

FIG. 29 is a cutaway view of an accessory 2600 with the handle assembly 2601 assembled with a case 2604 to encase a mobile device 18. The handle assembly 2601 includes a handle 2602 extending downward away from the platform 2603. The handle 2602 is sized and shaped to be gripped by an operator with the operator's thumb and forefinger being positioned at a shoulder 2678 where the handle 2602 meets the platform 2603. When held in this manner the display screen 43 of the mobile device 18 is visible to an operator looking downward.

A trigger switch 2680 is positioned at the shoulder 2678 and is intended to enable the operator to trigger reading of a barcode utilizing the same ergonomics of a typical "gun" type of barcode reader. The trigger switch 2680 activates a trigger or barcode rendering circuit 2682 in the handle assembly 2601.

The handle assembly 2601 may include a battery 2664 for supplying power to the components in the handle assembly 2601 as well as providing operating power and/or charging power to the mobile device 18 through the connector 2672 on the docking surface 2668.

The optic system 2670 secured to the case 2604 may include a structure described with respect to FIG. 10C or 10D for purposes of folding the optical path of at least one of a field of illumination of a light source of the mobile device 18 or a field of view of a camera of the mobile device 18 when the mobile device 18 is accommodated in the case 2604. The field of illumination of a light source of the mobile device 18 or the field of view of a camera of the mobile device 18 is folded from the back surface of the mobile device 18 towards the target area positioned at the top side of the mobile device 18.

The optic system 2670 may include, or be configured similarly to, any of the other optic systems, or components, thereof, including those described with respect to FIGS. 10A, 10B, 10C, 10D, 11A, 11B, 12A, 12B, 12C, 12D, 13, 14, and 15.

The handle assembly 2601 may further include a supplemental illumination system 2684. The supplemental illumination system 2684 may include one or more LED illuminators for emitting illumination towards the front of the handle assembly 2601 (e.g., towards the top of the mobile device 18 when the mobile device 18 is encased within the case 2604). The supplemental illumination system 2684 may emit targeting illumination (illumination for generating a targeting pattern) and/or exposure illumination (illumination for capturing a barcode).

The supplemental illumination system 2684 may be positioned at the front edge of, or below, the platform 2603 and around a central point of the mobile device 18 when the mobile device 18 is encased within the case 2604. The distance from the supplemental illumination system 2684 to the top side of the case 2604 may be different from case to case. As such, as shown in FIG. 29, the case 2604 may include a light pipe 2686 which extends between an illumination receiving end 2688b and an illumination emitting end 2688*a*. The illumination receiving end 2688*b* is positioned within the field of illumination of the supplemental illumination system 2684 (e.g., one or more LEDs) and input illumination generated by the supplemental illumination system 2684 into the light pipe 2686. The illumination emitting end 2688*a* is positioned adjacent to the optic system 2670 and emits illumination into the system field of view to illuminate a barcode therein. Light received at the illumination receiving end 2688*b* generally propagates through the light pipe 2686 to the illumination emitting end 2688*a* based on the principle of total internal reflection. The illumination emitting end 2688*a* may include an optic system 2690 of: i) the curvature of the illumination emitting end 2688*a*, ii) one or more lenses, and/or iii) one or more apertures to modify the intensity distribution of the emitted illumination which is projected into the target area as one of exposure illumination and/or targeting illumination.

If emitted as exposure illumination, the optic system 2690 may function to reduce variation of the intensity of the illumination over the field of view (e.g., even illumination across the field of view). If emitted as targeting illumination the optic system 2690 may function to increase variation of the intensity of the illumination within portions of the field of view to form a visible target pattern. In another embodiment, if emitted as a combination of both targeting illumination and exposure illumination, the optic system 2690 may function to decrease variation in the intensity of the illumination across the field of view (e.g., even illumination across the field of view) with a very sharp and noticeable decrease in the intensity of illumination at approximately the edges of the field of view such that the illumination pattern appears to be a particular shape (e.g., square or rectangular) with even intensity within the field of view and noticeably less illumination, if any, being emitted outside the field of view.

The one or more LEDs of the supplemental illumination system 2684 may comprise one or more LEDs of the same color (such as white LEDs, red LEDs, or blue LEDs) or may comprise LEDs of multiple colors such as white LEDs combined with amber LEDs. The LEDs may be the same color as, or different than, the one or more LEDs of the one or more illumination systems of the mobile device 18.

In one embodiment, the operating system or other software executing on the mobile device 18 may hinder the use of the light source (e.g., an LED) of the mobile device 18 as targeting illumination if it does not support a sequence of turning the light source on for targeting, off for image capture, and on for targeting at a rate rapid enough for a good user experience. In one embodiment, i) the light source (i.e., a torch) of the mobile device 18 may be used for exposure illumination and the optic system 2670 may function to reduce variation of the intensity of illumination emitted by the light source of the mobile device 18; and ii) the supplemental illumination system 2684 may be used for targeting illumination.

Alternatively, the light source of the mobile device 18 may be used for targeting and exposure illumination and the optic system 2670 may function to reduce variation of the intensity of illumination emitted by the light source of the mobile device 18 across the field of view with a distinct drop in intensity at approximately the edges of the field of view to yield a particular illumination pattern (e.g., square or rectangular) suitable for targeting a barcode and exposing the barcode during image capture.

Alternatively, the light source of the mobile device 18 may be used for exposure illumination and targeting illumination (e.g., a square or rectangular pattern) and the supplemental illumination system 2684 may be used as additional diffuse bright field illumination or really bright far field illumination. Alternatively, the light source of the mobile device 18 may be used for targeting (e.g., bright field illumination in a square or rectangular pattern) but may be turned off if there is too much glare for exposure. The supplemental illumination system 2684 may be used as diffuse bright field illumination and/or dark field illumination.

Figure 33:
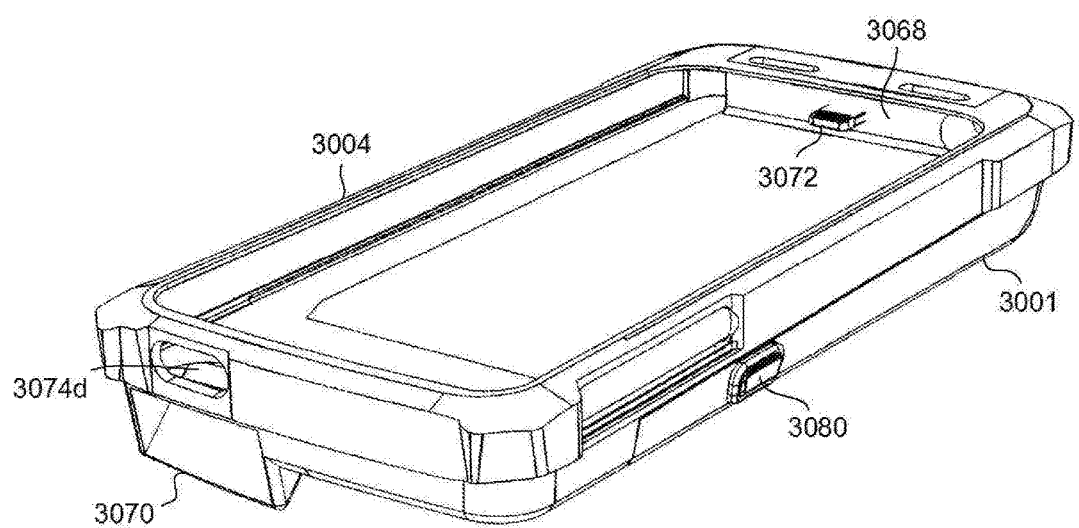
FIG. 33 shows an exemplary case coupled to a platform, which is configured as an encapsulating attachment.

FIG. 30 shows another exemplary barcode-reading enhancement accessory 3000 configured as an encapsulating attachment in accordance with another embodiment. FIG. 31 depicts a case and a platform of the exemplary barcode-reading enhancement accessory along with a mobile device. FIG. 32 shows an exemplary barcode-reading enhancement accessory with a different latching mechanism. FIG. 33 shows an exemplary case coupled to a platform, which is configured as an encapsulating attachment.

The barcode-reading enhancement accessory 3000 may comprise a handle assembly 3001*a*, 3001*b* and a case 3004*a*, 3004*b*, 3004*c*. Each case 3004*a*, 3004*b*, 3004*c* is configured for encasing a mobile device (not shown) of a different model or size. The interior and/or exterior dimensions of each case 3004*a*, 3004*b*, 3004*c* may be designed differently for accommodating a particular model or size of a mobile device. The handle assembly 3001*a*, 3001*b* may be generic to all or some of the cases 3004*a*, 3004*b*, 3004*c* so that the same handle assembly may be used with multiple cases 3004*a*, 3004*b*, 3004*c*. Alternatively, each handle assembly 3001*a*, 3001*b* may be designed for a particular mobile device and may be used with a corresponding case designed for the particular mobile device. It should be noted that FIG. 30 depicts three cases 3004*a*, 3004*b*, 3004*c* and two handle assemblies 3001*a*, 3001*b* as an example, and the accessory 3000 may comprise one or more than one cases and one or more than one handle assembly.

The case 3004*a*, 3004*b*, 3004*c* may comprise a cavity 3018*a*, 3018*b*, 3018*c* into which a mobile device 18 is inserted. The cavity 3018*a*, 3018*b*, 3018*c* may be defined by interior surfaces comprising a back side interior surface 3020*a*, 3020*b*, 3020*c*, a face interior surface 3022*a*, 3022*b*, 3022*c*, which is generally parallel to the back side interior surface 3020*a*, 3020*b*, 3020*c*, a top edge interior surface 3040*a*, 3040*b*, 3040*c*, a left edge interior surface 3026*a*, 3026*b*, 3026*c*, and a right edge interior surface 3024*a*, 3024*b*, 3024*c*, which is opposite, and parallel, to the left edge interior surface 3026*a*, 3026*b*, 3026*c*.

The case may have a bottom wall 3005*a*, 3005*b*, 3005*c* as a separate piece. The bottom wall 3005*a*, 3005*b*, 3005*c* is secured to the remaining piece of the case 3004*a*, 3004*b*, 3004*c* with a connecting mechanism to complete the case 3004*a*, 3004*b*, 3004*c*. The case 3004*a*, 3004*b*, 3004*c* is combined with the handle assembly 3001*a*, 3001*b*, more particularly, with the platform 3003*a*, 3003*b* of the handle assembly 3001*a*, 3001*b*. After the case 3004*a*, 3004*b*, 3004*c* is coupled to the handle assembly 3001*a*, 3001*b*, the docking surface 3068*a*, 3068*b* of the handle assembly 3001*a*, 3001*b* may close the cavity 3018*a*, 3018*b*, 3018*c*.

The case 3004*a*, 3004*b*, 3004*c* and the platform 3003*a*, 3003*b* may be combined by sliding the case 3004*a*, 3004*b*, 3004*c* towards the docking surface 3068*a*, 3068*b* of the platform 3003*a*, 3003*b*. The bottom wall 3005*a*, 3005*b*, 3005*c* of the case 3004*a*, 3004*b*, 3004*c* is then closed and locked after the case 3004*a*, 3004*b*, 3004*c* and the platform 3003*a*, 3003*b* are combined. FIG. 33 shows the complete case combined with the platform.

As shown in FIG. 30, one end of the bottom wall 3005a, 3005b, 3005c and one corner of the case 3004a, 3004b, 3004c may be coupled with a pin so that the bottom wall 3005a, 3005b, 3005c may freely rotate and a latching (fastening or clamping) mechanism may be provided at the other corner of the case 3004a, 3004b, 3004c so that the other end of the bottom wall 3005a, 3005b, 3005c may be secured by the latching mechanism. Alternatively, as shown in FIG. 32, the bottom wall 3005a, 3005b, 3005c may be coupled to the case 3004a, 3004b, 3004c with screws or pins 3009. Any other conventional means may be used to secure the bottom wall 3005a, 3005b, 3005c to the case 3004a, 3004b, 3004c.

Each of the top edge interior surface 3040a, 3040b, 3040c, the docking surface 3068a, 3068b of the handle assembly 3001a, 3001b, the left edge interior surface 3026a, 3026b, 3026c, and the right edge interior surface 3024a, 3024b, 3024c may be generally planar and extend between the back side interior surface 3020a, 3020b, 3020c and the face interior surface 3022a, 3022b, 3022c, and define a perimeter (perimeter edges) of each of the back side interior surface 3020a, 3020b, 3020c and the face interior surface 3022a, 3022b, 3022c. The top edge interior surface 3040a, 3040b, 3040c and the docking surface 3068a, 3068b of the handle assembly 3001a, 3001b may each be orthogonal to each of the left edge interior surface 3026a, 3026b, 3026c and the right edge interior surface 3024a, 3024b, 3024c.

The back side interior surface 3020a, 3020b, 3020c may include an aperture 3062a, 3062b, 3062c. The aperture 3062a, 3062b, 3062c may be formed in the center portion of the back side interior surface 3020a, 3020b, 3020c leaving a band in the top, left, and right sides of the back side interior surface 3020a, 3020b, 3020c.

In one embodiment, the handle assembly 3001a may include a handle 3002a and a platform 3003a. In another embodiment, the handle assembly 3001b may include a platform 3003b and may not have a handle. The handle 3001a may be attachable and detachable to the platform 3003a.

The platform 3003a, 3003b includes a platform surface 3066a, 3066b and a docking surface 3068a, 3068b. The platform 3003a, 3003b may have two decks. When the case 3004a, 3004b, 3004c is coupled to the handle assembly 3001a, 3001b, the case 3004a, 3004b, 3004c is placed on top of the lower deck 3007a, 3007b and the top surface (the platform surface 3066a, 3066b) of the upper deck 3008a, 3008b may: i) be flush (or alternatively may not be flush) with the back side interior surface 3020a, 3020b, and 3020c, and ii) fill (or substantially fill) the aperture 3062a, 3062b, 3062c. After the case 3004a, 3004b, 3004c is coupled to the platform 3003a, 3003b, the docking surface 3068a, 3068b becomes a partial bottom edge interior surface of the case 3004a, 3004b, 3004c.

As shown in FIG. 31, the case 3004a, 3004b, 3004c (with the mobile device 18 encased in it) is coupled to the handle assembly 3001a, 3001b before using as a barcode-reading device. For coupling the case 3004a, 3004b, 3004c to the handle assembly 3001a, 3001b, a coupling structure may be provided in the case 3004a, 3004b, 3004c and the handle assembly 3001a, 3001b. For example, a tongue (or a groove) may be formed along the left and right edges of the platform surface 3066a, 3066b and a groove (or a tongue) may be formed along the left and right edges of the aperture 3062a, 3062b, 3062c of the back side interior surface of the case 3004a, 3004b, 3004c so that the case 3004a, 3004b, 3004c may be coupled to the handle assembly 3001a, 3001b by sliding the tongue along the groove. Alternatively, the left and right edges of the platform surface 3066a, 3066b and the aperture 3062a, 3062b, 3062c may have the matching cross-section (e.g., a slanted edge) so that the platform 3003a, 3003b and the case 3004a, 3004b, 3004c may be secured by simply sliding the case 3004a, 3004b, 3004c towards the docking surface 3068a, 3068b along the matched edges of the platform surface 3066a, 3066b and the aperture 3062a, 3062b, 3062c. Alternatively or additionally, a ridge and a rail may be formed along the left and right edges of the platform surface 3066a, 3066b, and the left and right edges of the aperture 3062a, 3062b, 3062c. The ridge/rail combination may provide additional strength for securing the case 3004a, 3004b, 3004c to the handle assembly 3001a, 3001b and provide greater strength against torsional forces (in the direction 2692 as shown in FIG. 29) than if the case 3004a, 3004b, 3004c is simply mounted to the handle assembly 3001a, 3001b.

The face interior surface 3022a, 3022b, 3022c may also include an aperture through which a display screen 43 of a mobile device 18 may be viewed and as such the face interior surface 3022a, 3022b, 3022c may be a thin band which extends around the periphery defined by the top edge interior surface 3040a, 3040b, 3040c, the docking surface 3068a, 3068b, the left edge interior surface 3026a, 3026b, 3026c, and the right edge interior surface 3024a, 3024b, 3024c.

At least a portion of the interior surfaces (shown in FIG. 30) of the case 3004a, 3004b, 3004c (including the docking surface 3068a, 3068b of the handle assembly 3001a, 3001b) conform to at least a portion of an exterior surface of the mobile device 18 for which the case 3004a, 3004b, 3004c is configured. Each case 3004a, 3004b, 3004c may have different dimensions of its interior surfaces to fit a mobile device 18 of a different model or size. More specifically, each case 3004a, 3004b, 3004c may comprise interior surfaces into which a particular model or size of a mobile device 18 will securely fit. For example, case 3004a may be configured to fit the Apple iPhone 6 Plus®, case 3004b may be configured to fit the Apple iPhone 6®, and case 3004c may be configured to fit the Apple iPhone 5/5s®.

When the case 3004a, 3004b, 3004c carrying a mobile device 18 is coupled to the handle assembly 3001a, 3001b, the position of the mobile device 18 with respect to the accessory is referred to as the "operating position."

An optic system 3070 (as shown in FIG. 33) may be secured to the case 3004a, 3004b, 3004c. The optic system 3070 is configured to fold an optical path of at least one of a field of illumination of a light source of the mobile device 18 or a field of view of a camera of the mobile device 18 when the mobile device 18 is accommodated in the case 3004a, 3004b, 3004c.

When the mobile device 18 is in the operating position, the optic system 3070 may be within at least one of the field of illumination of the white light source of the mobile device 18 and/or the field of view of the camera of the mobile device 18. The dimensions of the case 3004a, 3004b, 3004c are selected so that the mobile device 18 is positioned within the cavity 3018a, 3018b, 3018c of the case 3004a, 3004b, 3004c so that the optic system 3070 is within at least one of the field of illumination of the white light source of the mobile device 18 and/or the field of view of the camera of the mobile device 18.

The optic system 2070 may include, or be configured similarly to, any of the other optic systems, or components, thereof, including those described with respect to FIGS. 10A, 10B, 10C, 10D, 11A, 11B, 12A, 12B, 12C, 12D, 13, 14, and 15.

A connector 3072 (e.g., the Apple Lightning Connector®), as shown in FIG. 33, may be provided on the docking surface 3068a, 3068b of the handle assembly 3001a, 3001b for connection to the mating connector 3032 (shown in FIG. 31) of the mobile device 18 when the combined mobile device and case is coupled to the handle assembly 3001a, 3001b. When the mobile device 18 is in the operating position, the connector 3072 on the handle assembly is aligned both vertically and horizontally with the mating connector 3032 on the mobile device 18. The dimensions and shape of the case 3004a, 3004b, 3004c are selected so that when the combination of the case and the mobile device is coupled to the handle assembly 3001a, 3001b, the connector 3072 on the handle assembly is aligned both vertically and horizontally with the mating connector 3032 on the mobile device 18.

Typically the mating connector 3032 on the mobile device 18 will be in the center (between the left and right sides when the mobile device 18 is viewed in a portrait mode) of the mobile device 18 on its bottom surface. There are certain scenarios where all of the mobile devices 18 for which the cases 3004a, 3004b, 3004c are designed may have the mating connector 3032 positioned at the same distance from the back side exterior surface of the mobile device 18. In these scenarios, that distance can be used for the distance between the platform surface 3066a, 3066b and the connector 3072 of the handle assembly 3001a, 3001b, and the back side interior surface 3020a, 3020b, 3020c of each case 3004a, 3004b, 3004c may be flush with the platform surface 3066a, 3066b.

However, there may be other cases where the distance between the mating connector 3032 on a mobile device 18 and the mobile device's back side exterior surface varies among the mobile devices for which cases are designed. In these cases, the back side interior surface 3020a, 3020b, 3020c of each case 3004a, 3004b, 3004c may not be flush with the platform surface 3066a, 3066b and the mobile device 18 should be raised above the platform surface 3066a, 3066b to align the mating connector 3032 of the mobile device 18 to the connector 3072 on the docking surface 3068a, 3068b. For example, a tongue 3065 may be provided in the back side interior surface 3020c of the case and a matching slot 3063 may be formed in the upper deck 3008a, 3008b of the platform 3003a, 3003b. The thickness of the tongue 3065 can vary to raise the mobile device 18 above the platform surface 3066a, 3066b to ensure alignment of the connector 3072 on the docking surface 3068a, 3068b with the mating connector 3032 on the mobile device 18.

Each case 3004a, 3004b, 3004c may include one or more apertures 3074a, 3074b, 3074c, 3074d within one or more of its walls to expose control buttons or switches on the mobile device 18 when the mobile device 18 is inserted into the case 3004a, 3004b, 3004c. Each case 3004a, 3004b, 3004c is designed for a mobile device 18 of a particular model or size so that each aperture 3074a, 3074b, 3074c, 3074d is positioned for the control buttons or switches on the corresponding mobile device 18. Alternatively, instead of the aperture(s), a flexible button or switch may be formed in the corresponding position in the wall(s) of the case 3004a, 3004b, 3004c so that the control buttons or switches on the mobile device 18 may be operated through the flexible button or switch formed in the wall(s) of the case 3004a, 3004b, 3004c.

The handle 3002a extends downward away from the platform 3003a. The handle 3002a is sized and shaped to be gripped by an operator. When held by the operator, the display screen 43 of the mobile device 18 is visible to an operator looking downward. A trigger switch (not shown in FIG. 30 but similar to the trigger switch 2680 shown in FIG. 29) may be provided on the handle 3002a to enable the operator to trigger reading of a barcode. In case where the handle assembly 3001b does not include a handle, a trigger switch 3080 may be provided, for example, on the side of the case, as shown in FIG. 33. The trigger switch activates a trigger or barcode rendering circuit in the handle assembly 3001a, 3001b. The handle assembly 3001a, 3001b may include a battery for supplying power to the components in the handle assembly 3001a, 3001b as well as providing operating power and/or charging power to the mobile device 18 through the connector 3072.

Referring to FIG. 33, the optic system 3070 secured to the case 3004 may include a structure described with respect to FIG. 10C or 10D for purposes of folding the optical path of at least one of a field of illumination of a light source of the mobile device 18 or a field of view of a camera of the mobile device 18 when the mobile device 18 is accommodated in the case 3004. The field of illumination of a light source of the mobile device 18 or the field of view of a camera of the mobile device 18 is folded from the back surface of the mobile device 18 towards the target area positioned at the top side of the mobile device 18.

Referring to FIG. 30, the handle assembly 3001a, 3001b may further include a supplemental illumination system that is similar to the supplemental illumination system 2684 in FIG. 29. The optic system including the light pipe 2686, the illumination emitting and receiving ends 2688a, 2688b, and the optic system 2690 may also be provided to the case. Details of the supplemental illumination system and the optic systems will not be provided here for simplicity. The supplemental illumination system may include one or more LED illuminators for emitting illumination towards the front of the handle assembly 3001a, 3001b (e.g., towards the top of the mobile device 18 when the mobile device 18 is encased within the case 3004a, 3004b, 3004c). The supplemental illumination system may be targeting illumination (illumination for generating a targeting pattern) and/or exposure illumination (illumination for capturing a barcode).

The barcode-reading enhancement system of the present invention may include a barcode-reading application 500 that may be obtained from the application server 22a, 22b (shown in FIG. 1) and installed on the mobile device 18 as described with respect to FIG. 3A.

Figure 16:
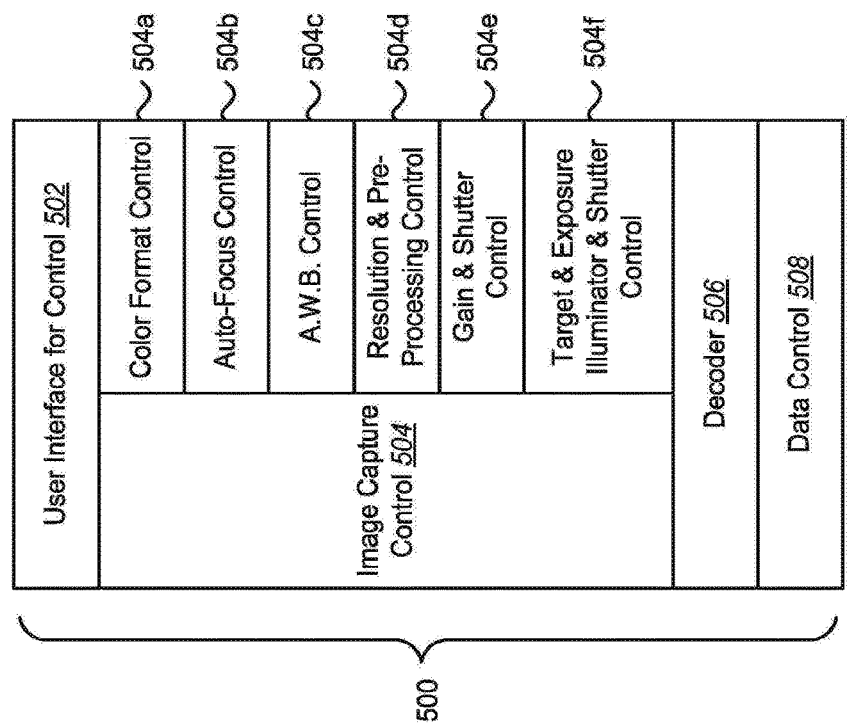
FIG. 16 illustrates exemplary methods useful for an application for a barcode-reading enhancement system.

FIG. 16 shows a block diagram of an exemplary barcode application 500. The exemplary barcode application 500 may include permutations of a user interface control method 502, image capture control methods 504, a decoder 506, and a data control method 508.

Figure 17:
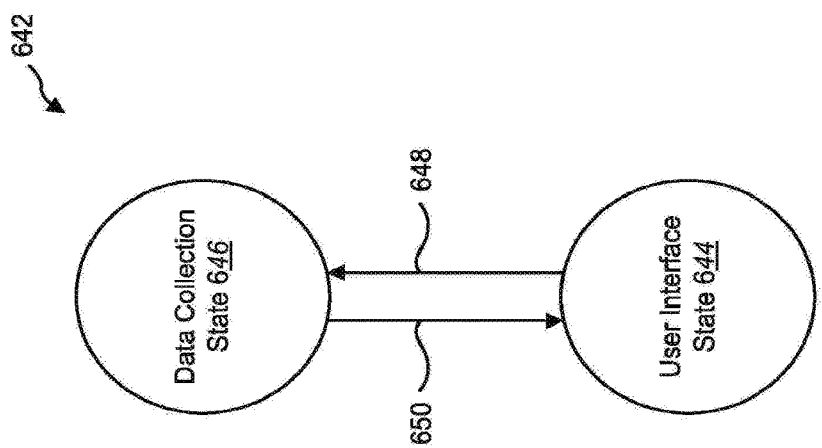
FIG. 17 illustrates an exemplary state machine useful for an application for a barcode-reading enhancement system.

FIG. 17 depicts a state machine 642 useful for user interface control methods 502 of the barcode application 500. The state machine 642 may operate either in a user interface state 644 or in a data collection state 646.

When in the user interface state 644, the (capacitive touch) display screen 66 and the backlight for the display screen are active and the contents of the display screen 66 may be controlled by the barcode application 500. When in the data collection state 646, the (capacitive touch) display screen 66 may be turned off; the (capacitive touch) display screen 66 may be turned on, but the backlight may be turned off; or both the (capacitive touch) display screen 66 and the backlight may be turned on, but the backlight intensity may be set to a minimum. The data collection state 646 is intended for conserving power (i.e., for extending battery life) when the operator is using the mobile device 18 to read barcodes and does not need to simultaneously use the (capacitive touch) display screen 66 for manual data entry.

To transition 648 from the user interface state 644 to the data collection state 646, the barcode application 500 utilizing the data control methods 508 may make a processing call to the operating system of the mobile device 18 requesting to i) turn off the display and backlight; ii) turn off the backlight (in the event the operating system does not make the function of turning off the display available to the application); or iii) turn the backlight power to a minimum (in the event the operating system does not make the function of turning off the display or turning off the backlight available to the application). If none of the foregoing options are available, the barcode application may simply write a black image to the display and enter a state where all input through the touch panel is ignored, thereby giving the appearance that the display has been turned off.

When in the data collection state 646, multiple barcodes can be read in sequence (utilizing the camera and targeting structure described herein but not requiring use of the display for targeting) and processed, stored, and/or transmitted by the application without requiring any user interaction with the user interface. Examples of the functions that may be performed by the application when in the data collection state without requiring user input include the functions of the relay application described in co-pending U.S. patent application Ser. No. 14/319,193.

When a transition 650 to the user interface state 644 is required, the barcode application 500 may make a processing call to the operating system of the mobile device 18 requesting to i) turn on the display (i.e., the touch panel or backlight) in the event that these are turned off during the data collection state 646; ii) turn on the backlight (in the event the operating system does not make the function of turning off the display available to the application and therefore the display remains "on" while the backlight remains "off" during the data collection state 646); or iii) turn the backlight power up to a present level (in the event the operating system does not make the function of turning off the display or turning off the backlight available to the application, both remain "on" during the data collection state 646 while the backlight power has been turned down).

Events that may trigger transition 648 from the user interface state 644 to the data collection state 646 include user activation of a hardware control on the mobile device 18 or activation of a software control present on the display screen when in the user interface state 644. Events that may trigger transition 650 from the data collection state 646 to the user interface state 644 include user activation of a hardware control on the mobile device 18 or a signal from a remote software application which may include the application to which the mobile device 18 is sending decoded barcode data.

Returning to FIG. 16, the image capture control methods 504 may comprise permutations of color format control methods 504*a*, autofocus control methods 504*b*, auto-white balance control methods 504*c*, resolution and pre-processing control methods 504*d*, gain and shutter control methods 504*e*, and target and exposure illumination and shutter control methods 504*f*.

Permutations of these methods may be performed when the barcode application 500 enters the data collection state 646 such that the mobile device 18 is configured for barcode reading prior to the operator triggering or otherwise initiating a barcode read. Permutation of these methods may be performed immediately following an unsuccessful decode with adjustments made to certain image capture settings based on analysis of the image that yielded the unsuccessful decode so that the mobile device 18 is re-configured for barcode reading prior to the next image capture. Permutations of these methods may be performed after the user has triggered or otherwise initiated a barcode read but prior to actual image capture to configure the mobile device 18 for the image capture.

As stated with respect to FIGS. 2A and 2E, the camera assembly 36 may be capable of generating both Y.U.V and R.G.B. color formatted outputs. The color format control methods 504*a* may query whether the image sensor and/or associated circuitry has been set to provide an output in the Y.U.V. color space. If not, the color format control method 504*a* may issue a command to the operating system 48, the processor 44, or the system-on-chip circuits 92 to set the image sensor output to the Y.U.V. color space.

The R.G.B. format may commonly be used for general-purpose photography. However, for barcode reading and/or decoding, it may be advantageous to use the Y.U.V. format instead. This is because decoding a barcode image may be mostly reliant upon the pattern defined by the luminous intensity 168 (shown in FIG. 2E) of each pixel in the barcode image. Optionally, the first chromatic 170 and the second chromatic 172 may even be ignored by the application that decodes the barcode image.

Thus, the output module 91 of the system-on-chip circuits 92 may be set to provide the digital image output 162 in the form of the Y.U.V. data format 166 (or use Y.U.V data for the input to image processing circuits within the system-on-chip circuits 92). Accordingly, the application 50 may instruct the output module 91, directly, through the operating system 48, or through other control circuitry, to cause the output module 91 to provide the digital image output 162, to use, for image processing circuits, data in the Y.U.V format when the photo sensor 42 is to be used for capturing a barcode image and to return in the R.G.B. format for general photography when barcode capturing operations are complete.

In one embodiment, for barcode images, the output module 91 may be set to provide the digital image output 162, or use for image processing data in the form of the luminous intensity 168 for each pixel, and the first chromatic 170 and the second chromatic 172 may not even be provided or used. This may reduce the traffic on the data bus, reduce image processing time for image processing circuits, reduce the processing load of the processor 44, and/or save space in the image data buffer 89 of the memory 46.

As discussed with respect to FIG. 2A, the mobile device 18 may include an autofocus module 98. The autofocus module 98 may be optimized for photography. The image capture control methods 504 of the barcode application 500 may include autofocus control methods 504*b* for adjusting the autofocus settings of the autofocus module 98 for barcode image capture. More specifically, the distance between the mobile device 18 and a barcode 142 within a target area 140 may be within a relatively predictable range of distances which is a much smaller range of distances between the mobile device and the subject of a general-purpose photograph. Thus, using customized autofocus settings for barcode image capture may facilitate obtaining proper focus and/or expedite the image capture process.

Figure 18A:
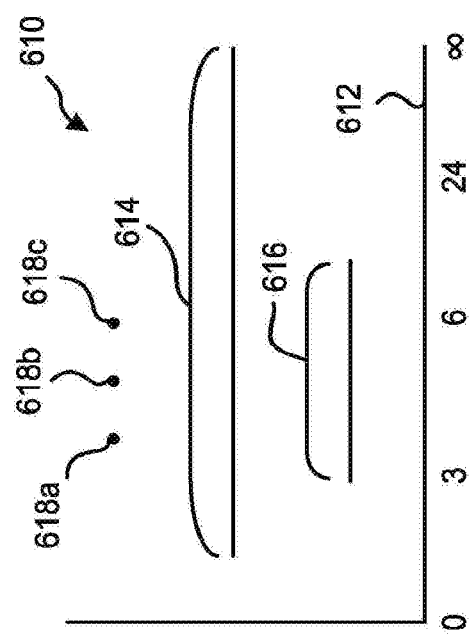
FIG. 18A illustrates exemplary autofocus options.

FIG. 18A illustrates exemplary autofocus options in the form of a graph 610. As shown, a horizontal axis 612 represents a nonlinear continuum of focus positions (e.g., object distance that is best focused onto the photo sensor). The camera assembly 36 of the mobile device 18 may have a full range 614 of focus positions. However, those on the upper and lower ends of the full range 614 may not be needed for barcode image capture because they represent object distances which are less than, or greater than, the typical distance between a barcode reader and a barcode. Accordingly, the autofocus settings of the camera assembly 36 may be configured specifically for barcode image capture, for example, via commands to the autofocus module 98 (or the operating system 48 controlling the autofocus module 98).

By way of example, the commands to the autofocus module 98 (or the operating system 48) may allow the camera assembly 36 to focus at object distances within a limited range 616. The limited range 616 may represent the useful range of object distances for barcode image capture, and exclude object distances too close to the mobile device 18 and object distances too far from the mobile device 18 for barcode reading.

As another example, the commands to the autofocus module 98 (or the operating system 48) may limit focus positions to discrete positions such as a first position 618a, a second position 618b, and a third position 618c. The first position 618a, the second position 618b, and the third position 618c may represent useful object distances for barcode image capture. The optic system may have sufficient depth of field at each of the discrete positions to accommodate image capture of a barcode within the target area 140 with sufficient sharpness for decoding.

Setting autofocus to one of a plurality of discrete focus settings may utilize a feedback-loop algorithm that is faster than the feedback-loop algorithms for autofocus when performing photography wherein the image is analyzed for sharpness and the best focus position is determined within the entire range.

As discussed with respect to FIG. 2A, the system-on-chip circuits 92 may include an auto-white balance module 93. As such the auto-white balance control methods 504c of the barcode application 500 (shown in FIG. 16) may issue a command to the operating system 48, the processor 44, or the auto-white balance module 93 to disable the auto-white balance function of the image sensor and/or associated circuitry. This may be done, as indicated previously, to avoid degrading contrast when a narrow band of illumination frequency is focused onto the image sensor for barcode reading.

As such, for barcode images, the output module 91 may be set to provide the digital image output 162, or use for image processing data that has not been subjected to modification by the disabled auto-white balance module 93.

The resolution and pre-processing control methods 504d may control the resolution for the output image as well as other image processing which may be performed on the output image prior to storing in the image data buffer 89 for decoding. Speed enhancements for image processing and decoding may be obtained by altering the resolution of the captured image. While high resolution images (e.g., 8 megapixels or more) may be desirable for conventional photography, this resolution may not be needed for barcode imaging and decoding. As long as the resolution is sufficient for successful decoding of a barcode, there is typically no need for an image of greater resolution.

Selection of the resolution may be done, for example, based on the type of barcode to be scanned, the size of the barcode within the output image, and other factors, which may be determined from previous images captured of the barcode. The resolution selected may be full resolution (i.e., one output pixel for each pixel captured by the image sensor) or binned (i.e., one output pixel for each group of x pixels captured by the image sensor).

Figure 18B:
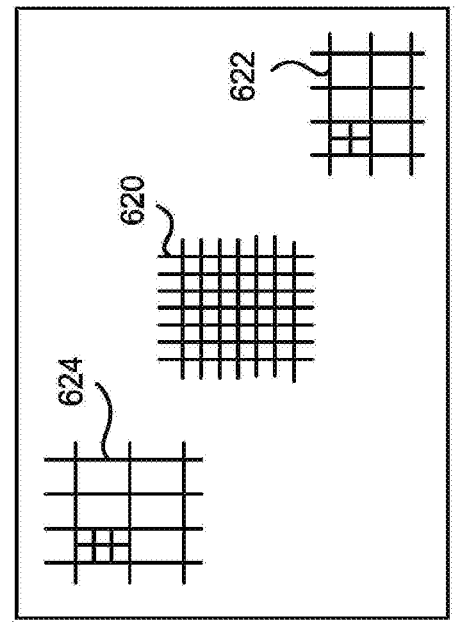
FIG. 18B illustrates exemplary resolution binning methods that can be used to reduce the resolution of a barcode image.

FIG. 18B illustrates exemplary resolution binning methods that can be used to reduce the resolution of a barcode image. An exemplary image may be captured, by way of example, in three different ways. In a first scheme 620, no binning may be applied, and the image output may be the native resolution (full resolution) of the photo sensor 42 (i.e., one digital pixel value for each pixel captured by the photo sensor 42). In a second scheme 622, moderate binning may be applied so that the output has one digital pixel value, for example, for every four pixels captured by the photo sensor 42. The resulting output image data may thus be one-quarter of the resolution of the captured image data. In a third scheme 624, more aggressive binning may be applied so that the output has one digital pixel value, for example, for every six pixels captured by the photo sensor 42. The resulting output image data may thus be vertical binning (non-square) and one-sixth of the resolution of the captured image data.

When binning is applied, various mathematical algorithms may be used to obtain the value of an output pixel, based on its constituent pixels of the captured image. According to some examples, the intensity values of the constituent pixels may be averaged to provide the value of the resulting output pixel.

The foregoing description is illustrative of certain types of image processing that may be performed on image data while the image data is being transferred through the hardware circuits 90 and DMA 86 to the image data buffer 89. A more complete description of image processing algorithms that may be implemented in the hardware circuits 90 (or the system-on-chip circuits 92) is included in U.S. patent application Ser. No. 14/717,112. In the exemplary embodiment, the image resolution and pre-processing control methods 504d of the barcode application 500 may provide instructions to the hardware circuits 90, the system-on-chip circuits 92, and/or the operating system to set any of the foregoing image pre-processing options as well as image pre-processing options described in U.S. patent application Ser. No. 14/171,112.

In all cases, setting the resolution and image pre-processing selections may entail the resolution and pre-processing control methods 504d issuing a command to the operating system 48, the processor 44, the applicable image processing circuits within the hardware circuits 90, or the applicable image processing circuits within the system-on-chip circuits 92.

Gain and shutter control methods 504e may comprise setting image capture parameter values for one or more image frames to be sequentially captured, including a gain setting and an exposure setting for each frame as described in more detail in U.S. patent application Ser. No. 14/171,112.

FIG. 19A depicts an exemplary embodiment of target and exposure illumination and shutter control methods 504f in accordance with one embodiment. Step 542 represents receiving a trigger signal indicating that a barcode is to be read. The trigger signal may be received in several alternative ways as represented by steps 542a-542e. As discussed, the barcode application 500 may have a user interface (not shown) with one or more graphical elements displayed on the display screen 66. The user may use such graphical elements to initiate the barcode scanning process (for example, by tapping a "scan" soft button on the display screen 66) (542a).

Alternatively, the application may monitor the microphone connector 34b and the trigger signal may be a microphone input signal generated by the attachment as described with respect to FIG. 14 (542b).

Alternatively, the application may monitor the data connector 64b and the trigger signal may be a data input signal generated by the attachment as described with respect to FIG. 13 (542c).

Alternatively, the application may monitor the wireless communication system 52 and the trigger signal may be a wireless radio frequency (RF) trigger signal generated by the attachment (542d).

Alternatively, the application may monitor the target area 140 utilizing a sensor and the trigger signal may be automatically generated by the application detecting the presence of a barcode within the target area 140 (542e).

Step 544 represents pulsing the target illumination to generate a distinct illumination pattern within the target area 140 to assist the operator in aiming the mobile device 18 with respect to the barcode for image capture. The pulse may be generated for a duration sufficient for the operator to aim the mobile device 18 or may be generated for a shorter period of time (on the order of 10 ms). As discussed, the target illumination may be generated by the white light source 84 of the mobile device 18 (step 544a) or may be an external target illumination source (step 544b) within the attachment.

Step 546 represents a step of activating the exposure illumination. In certain embodiments ambient illumination is used for providing diffuse illumination for image capture of a barcode. In these embodiments step 546 may not be performed. In other embodiments the exposure illumination may be activated for image capture (step 546). As discussed, the exposure illumination may be generated by the white light source 84 of the mobile device 18 (e.g., a mobile device torch) (step 546a) or may be an external exposure illumination source (step 546b) within the attachment. The barcode image is then captured (step 548).

Step 550 represents determining whether there has been a successful decode of the barcode represented in the captured image. If it has been successful, then the method may end. If there has not been a successful decode, the image capture parameters may be adjusted at step 552 and the target illumination system may again be pulsed to further assist the user in aiming the mobile device 18 with respect to the barcode at step 544. It is recognized that several repeats of this process may be required for: i) the operator to properly aim the mobile device 18 with respect to the barcode (if the target illumination pulse is short), and ii) the operator to have a correct combination of image capture parameters such that the resulting image is decodable.

FIG. 19B depicts another exemplary embodiment of target and exposure illumination and shutter control methods 504f in accordance with another embodiment. Some of the steps in FIGS. 19A and 19B are the same and such steps will not be explained in detail for simplicity.

Step 542' (i.e., any one of 542a' to 542e') represents receiving a trigger signal indicating that a barcode is to be read.

Step 554' represents turning on a combination of targeting and exposure illumination. As discussed with respect to FIG. 8D, the intense targeting pattern 400 may include diffuse illumination across a region that coincides with the system field of view 207 such that the targeting illumination is also the exposure illumination. As discussed, the targeting and exposure illumination may be generated by the white light source 84 of the mobile device 18 (step 554a') or may be an external illumination source within the attachment (step 554b').

Step 548' represents image capture of a barcode, step 550' represents determining whether there was a successful decode, and step 552' represents adjusting image capture parameters based on the previous image captured, all as discussed with respect to FIG. 19A. If there is a successful decoding the targeting exposure illumination may be turned off at step 556'. If the decoding is not successful another image of the barcode may be captured (step 548') following adjustment of image capture parameters (step 552') if any.

FIG. 19C represents a filtering arrangement for the targeting illumination and the supplemental optics which enable use of the methods of FIG. 19B even if the intense targeting illumination pattern is not also a diffuse illumination pattern across the entire barcode within the field of view.

The visible spectrum 560 generally ranges from about 430 nm to approximately 660 nm. In a first embodiment the targeting illumination structure may include a first narrow band pass filter which passes a narrow band of illumination (e.g., the band 564) within the visible spectrum 560 while attenuating illumination (e.g., the band 566a) below the band 564 and illumination (e.g., the band 566b) above the band 564. In an exemplary embodiment, the first narrow band pass filter may have its narrow pass band centered at a wavelength between 430 nm and 470 nm which are the wavelengths corresponding to blue illumination. When such a filter is used to filter white illumination, the color of the intense targeting illumination passed by the band pass filter would appear blue.

In another embodiment, the targeting illumination structure may include a low pass filter. The low pass filter passes wavelengths of illumination (e.g., the band 570) which are within the visible spectrum 560 below a predetermined threshold while attenuating wavelengths of illumination (e.g., the band 572) above the threshold. In an exemplary embodiment, the predetermined threshold may be between 470 nm and 500 nm such that the pass band (i.e., the passed illumination spectrum) is substantially blue. When such a filter is used to filter white illumination, the color of the illumination passed by the filter appears blue.

Although the first narrow band pass filter is depicted as having very distinct edges (e.g., wavelengths within the pass band 564 are passed with no attenuation and wavelengths outside the pass band 564 are completely attenuated) it is recognized in the art that the edges are not as distinct as depicted, and some illumination within the pass band 564 will also be attenuated and some illumination outside of the pass band (i.e., the bands 566a and 566b) will also be passed. A most efficient filter will minimize the amount of illumination within the pass band 564 that is attenuated and further minimize the amount of illumination that is outside of the pass band (i.e., the bands 566a and 566b) to be passed.

Similarly, although the low pass filter is depicted as having a very distinct edge at the threshold (e.g., wavelengths below the threshold are passed with no attenuation and wavelengths above the threshold are completely attenuated) it is recognized in the art that the edge is not as distinct as depicted, and some illumination within the band 570 will be attenuated and some illumination within the band 572 will be passed. A most efficient filter will minimize the amount of illumination within the band 570 that is attenuated and further minimize the amount of illumination in the band 572 that is outside of the band 570 to be passed.

In other embodiments, the targeting illumination structure may include a high pass filter. The high pass filter passes wavelengths of illumination (e.g., the band 578) which are within the visible spectrum 560 above a predetermined threshold while attenuating wavelengths of illumination (e.g., the band 576) below the threshold. In an exemplary embodiment, the predetermined threshold may be 500 nm such that the pass band 578 includes the entire visible spectrum excluding illumination which is substantially blue.

As with the low pass filter, the high pass filter is depicted as having a very distinct edge at the threshold (e.g., wavelengths above the threshold are passed with no attenuation and wavelengths below the threshold are completely attenuated) it is recognized in the art that the edge is not as distinct as depicted, and some illumination above the threshold will be attenuated and some illumination below the threshold will be passed. A most efficient filter will minimize the amount of illumination above the threshold that is attenuated and further minimize the amount of illumination below the threshold that is passed.

It should be appreciated that when illumination from a white light source 84 of a mobile device 18 is filtered utilizing a narrow band pass filter (e.g., a pass band 564) or a low pass filter (e.g., a pass band 570) and the illumination incident on the camera lens is filtered by a high pass filter (e.g., passing the band 578), the illumination generated by the white light source 84, as filtered, may not be visible to the camera because the portion of the illumination passed by the band pass filter (e.g., passing the band 564) or the low pass filter (e.g., passing the band 570) is attenuated by the high pass filter. As such, if the white light source 84 is used for generating an intense targeting illumination pattern within the field of view 207, the targeting pattern may not be visible to the camera (e.g., attenuated by the high pass filter) and ambient illumination passed by the high pass filter (e.g., passing the band 578) is visible to the camera and is typically sufficient for imaging and decoding a barcode.

This structure enables the accessory to further utilize optics to generate a targeting pattern utilizing the white light source 84 (filtered before or after being shaped by the optic) and enables the intense targeting illumination pattern to continue to illuminate the barcode during image capture (enabling the operator to aim the mobile device 18 with respect to the barcode) without the targeting pattern being visible to the camera and producing hot regions (intense illumination) corresponding to the targeting pattern within the image.

Returning to FIG. 16, the decoder 506 of the barcode application 500 may comprise known methods for image processing and decoding, including methods described in U.S. patent application Ser. No. 14/717,112. As discussed with respect to FIGS. 19A and 19B, if decoding is unsuccessful, then a new barcode image may need to be captured. This may be done by returning to the image capture control methods 504 and selecting new image capture parameters. This process may be repeated until the barcode image has been successfully decoded, or until the user cancels further image capture and/or decoding attempts.

In general the data control methods 508 of the barcode application 500 control what processes are performed on data decoded from the barcode 142 (decoded data) within the target area 140. In more detail, and with reference to FIG. 1, in a first aspect the data control methods 508 may function as a mobile client to a remote non-legacy system which supports maintaining a Transmission Control Protocol/Internet Protocol (TCP/IP) connection with mobile devices (such as mobile device 18) via the LAN 12 for exchanging data with the mobile device 18 (including receiving decoded data from the mobile device 18) and controlling operation of certain aspects of the barcode application 500.

In a second aspect, the data control methods 508 may function as a mobile client to an intermediary device. The intermediary device supports maintaining a TCP/IP connection with mobile devices (such as mobile device 18) via the LAN 12 for receiving decoded data from the mobile device 18. In turn the intermediary device may further support providing decoded data received from the mobile device 18 to a legacy system. This is useful when the legacy system is incapable of receiving decoded data directly from the mobile device 18 via a TCP/IP connection and therefore the barcode application 500 may function independently of, and requires no compatibility with, the communication protocols and functions of the legacy system, including those used for communication between the legacy system and the intermediary device. The intermediary device may communicate with the legacy system, which may be a TCP/IP connection separate from the TCP/IP connection through which the mobile device 18 communicates with the intermediary device.

In accordance with an embodiment, a non-transitory computer-readable medium is provided for storing instructions for a barcode-reading application for a mobile device. The mobile device includes a camera assembly, a network interface, a memory, and a processor for executing the barcode-reading application including a decoder. The non-transitory computer-readable medium may include a code for controlling the camera assembly to capture an image of a barcode, decoding the image of the barcode to generate decoded data, and processing the decoded data; a code for controlling the network interface to establish a network connection to a licensing server and obtaining a license code from the licensing server when in a base mode of operation; a code for subjecting the license code to a predetermined algorithm and determining at least one operating permission authorized by the license code; a code for enabling an enhanced mode of operation; and a code for implementing at least one enhanced barcode-reading function which corresponds to the at least one operating permission authorized by the license code when in the enhanced mode of operation.

The at least one enhanced barcode-reading function may include a function of decoding a barcode symbology that the decoder is restricted from decoding in the base mode of operation. Alternatively or additionally, the at least one enhanced barcode-reading function may include a function of decoding multiple barcodes in sequence at a rate that is faster than a rate at which the barcode-reading application can decode multiple barcodes in sequence in the base mode of operation. Alternatively or additionally, the at least one enhanced barcode-reading function may include a function of decoding a quantity of barcodes of a particular symbology that exceeds a restricted quantity of barcodes of the particular symbology that the barcode-reading application can decode in the base mode of operation.

Alternatively or additionally, the at least one enhanced barcode-reading function may remove a demonstration restriction function under which the barcode-reading application functions in the base mode of operation. The demonstration restriction function may be at least one of: i) a function that scrambles decoded data from a barcode of at least one symbology; ii) a function that restricts the decoded data or scrambled decoded data from a barcode of at least one symbology from being made available for further processing; or iii) a function that restricts the decoded data or the scrambled decoded data from a barcode of at least one symbology from being displayed on a display screen of the mobile device.

Alternatively or additionally, the at least one enhanced barcode-reading function may enable at least one enhanced image processing function that improves an ability to decode an image of a barcode and is not operable when the decoder operates in the base mode of operation.

The base mode of operation may include a base decoding mode of operation and a demonstration mode of operation. The computer-readable storage medium may further include, for the base decoding mode of operation, a code for driving the camera assembly to capture an image of a barcode, a code for applying base decoder functions to the image to identify a barcode symbology, a code for decoding the barcode and making decoded data available for further processing if the barcode symbology is a base symbology, and a code for entering the demonstration mode of operation if the barcode symbology is not the base symbology. The computer-readable storage medium may further include, for the demonstration mode of operation, a code for applying at least one enhanced barcode-reading function to decode the barcode, and a code for performing at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device.

The non-transitory computer-readable medium may further include a code for performing an upgrade function in the demonstration mode of operation. The upgrade function may enable a user selection to obtain the license code, obtain the license code based on the user selection, establish a network connection to the licensing server, and obtain the license code from the licensing server.

The non-transitory computer-readable medium may further include a code, in order to obtain the license code from the licensing server, for communicating to the licensing server one of: i) a unique identification code of the mobile device; or ii) a user identification code identifying a controller of the mobile device.

Figure 34A:
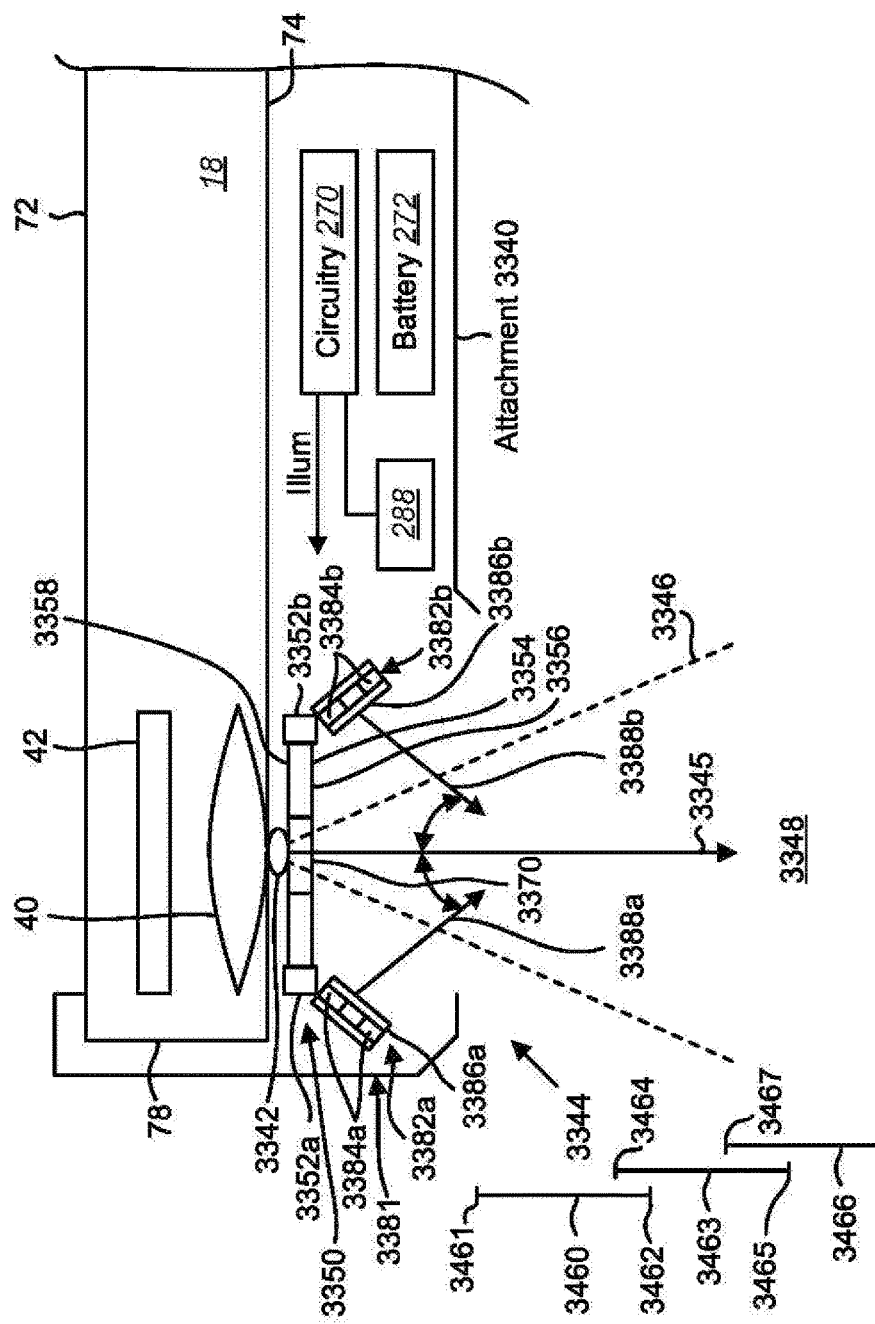
FIGS. 34A and 34B depict exemplary mobile device attachments that include at least one of a supplementary lens system and a supplementary illumination system.

FIG. 34A depicts an example of a mobile device attachment 3340 (i.e., a barcode-reading enhancement accessory shown as an encapsulating attachment in partial view) that includes at least one of a supplementary lens system 3342 and a supplementary illumination system 3344. Although depicted as an encapsulating attachment, the supplementary lens system 3342 and the supplementary illumination system 3344 may be implemented in any of the mounted attachments, corner-positioned attachments, and encapsulating attachments described herein.

The supplementary lens system 3342 is depicted as a single lens for illustration purposes only and the supplementary lens system 3342 may be any of the supplementary lens systems described herein including those described with respect to FIGS. 6A, 6B, 10A, 10B, 10C, 13, 14, and 15.

The mobile device 18 is depicted in cross section from its left edge 82 (see FIGS. 2A-2C for reference) with its lens assembly 40 and photo sensor 42 of its camera. The mobile device 18 may include other mobile device components (including hardware, operating systems, software, etc.) as described herein. In cross section from its left edge 82, the face surface 72, the back surface 74, and the top edge 78 are depicted. The field of view 3346 of the camera of the mobile device 18 (as modified by the supplementary lens system 3342) extends along an optical axis 3345 from the back surface 74 into a target area 3348 extending beyond the back surface 74.

The supplementary illumination system 3344 of the attachment 3340 may include at least one exposure illumination system such as a midfield illumination system (which may be referred to as a diffuse bright field illumination system) 3350 and/or a near-field illumination system (which may be referred to as a dark field illumination system) 3381, as such terms are used in U.S. patent application Ser. No. 14/510,341, which is incorporated, in its entirety, herein by reference. Further, the white light source 84 of the mobile device 18, as shown in FIG. 2B, either modified by an optic system of the attachment 3340 or unmodified, may be a far field illumination system.

The diffuse bright field illumination system 3350 is configured to illuminate a barcode within the field of view 3346 while the camera of the mobile device 18 captures an image of the barcode. The diffuse bright field illumination system 3350 includes at least one light source 3352a, 3352b and an optical substrate 3354 including one or more extraction features. The optical substrate 3354 has a front major surface 3356 and a back major surface 3358 arranged generally perpendicular to the optical axis 3345. Light is introduced from the at least one light source 3352a, 3352b between the front major surface 3356 and the back major surface 3358, as shown in FIGS. 38A-38F. The introduced light is transferred by total internal reflection through the optical substrate 3354 between the front major surface 3356 and the back major surface 3358 in a direction transverse to the optical axis 3345.

Figure 38A:
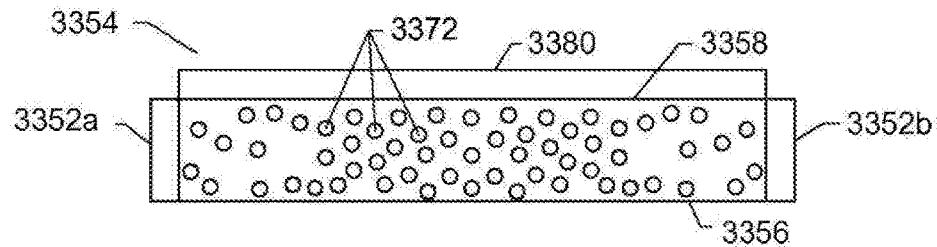
FIGS. 38A-38F illustrate cross-sectional views of different embodiments of an optical substrate, taken along line A-A in FIGS. 39A-39C.
Figure 38B:
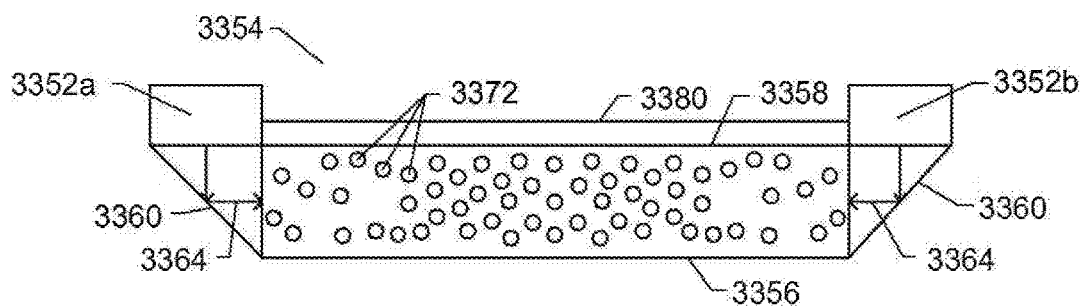
Figure 38C:
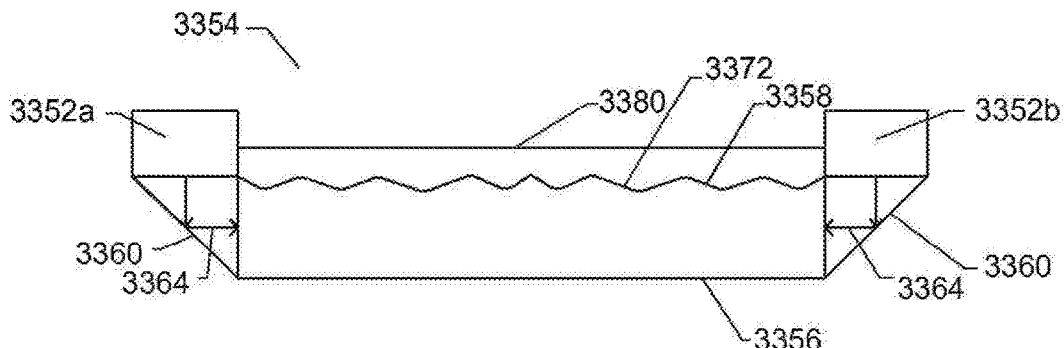

In an alternative embodiment depicted in the cross-sectional views of the optical substrate 3354 of FIGS. 38B and 38C, the at least one light source 3352 may introduce light into the optical substrate 3354 through the back major surface 3358. In this example, the optical substrate 3354 has a chamfered edge 3360 that reflects light 3364 through total internal reflection towards the optical axis 3345.

Figure 38D:
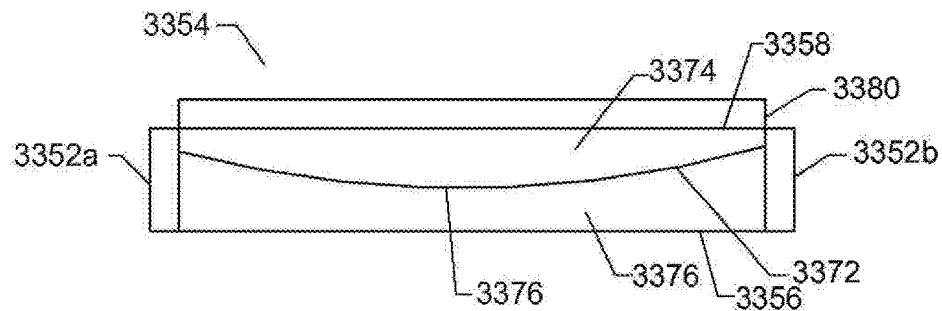
Figure 38E:
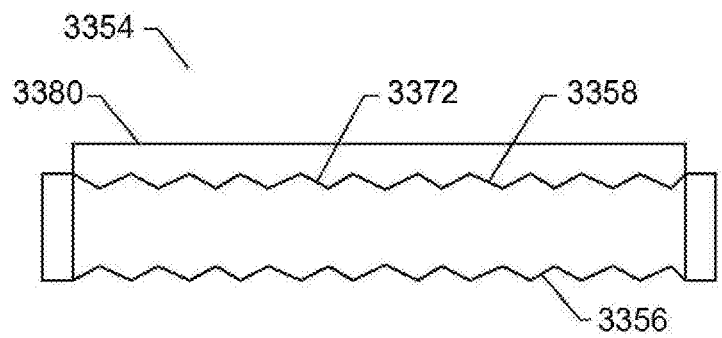
Figure 38F:
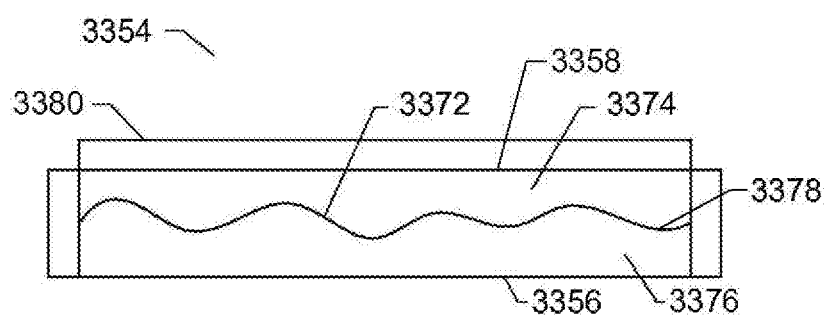
Figure 39A:
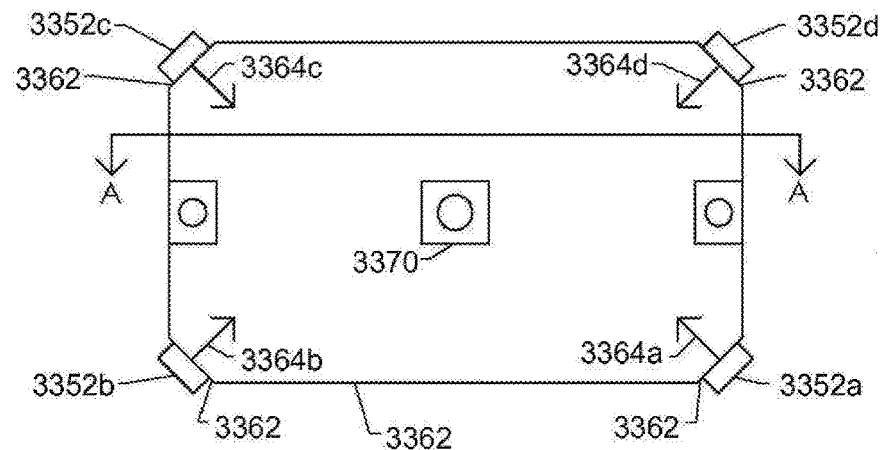
FIGS. 39A-39C are cross-sectional views of alternative embodiments of the optical substrate.
Figure 39B:
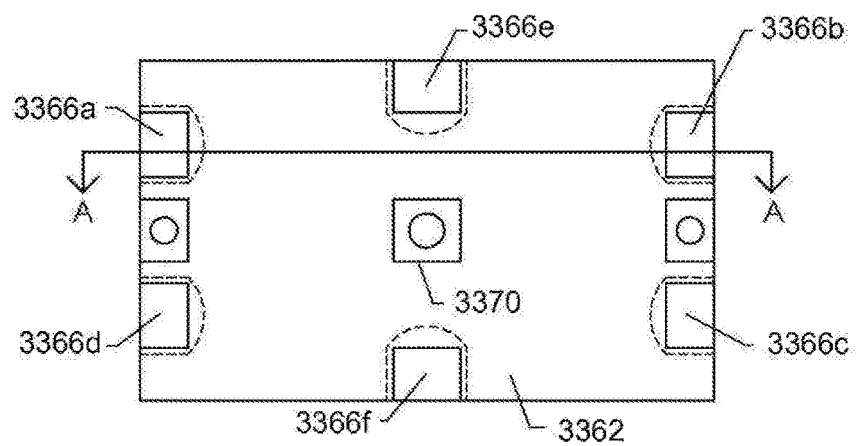
Figure 39C:
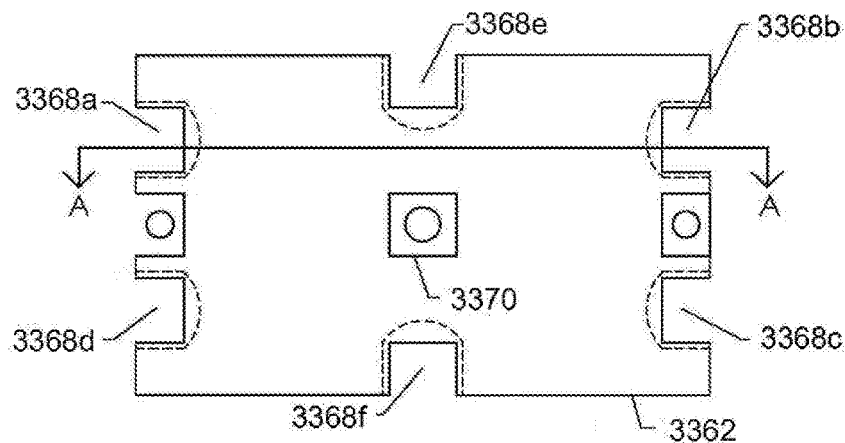

A front view of the optical substrate 3354 is shown in FIGS. 39A-39C, and the cross-sectional views of the optical substrate 3354 is shown in FIGS. 38A-38F. As depicted in FIGS. 34A, 38A, 38D, and 39A, the at least one light source 3352a, 3352b (shown as four light sources 3352a-d in FIG. 39A) may be positioned adjacent an edge 3362 of the optical substrate 3354. In this configuration, as shown in FIG. 39A, light 3364a-d emitted by the at least one light source 3352a-d may exit the at least one light source 3352a-d through a single light-emitting surface.

Alternatively, as shown in the front view of the optical substrate 3354 depicted in FIG. 39B and the cross-sectional views of the optical substrate 3354 depicted in FIGS. 38B and 38C, the at least one light source 3352 may be positioned on the back major surface 3358 at locations 3366a-f. In this configuration light may exit the at least one light source 3352 through a single light-emitting surface (e.g., light may leave the light-emitting surface) and be reflected from the chamfered edge 3360 and directed towards the optical axis.

Alternatively, as shown in the front view of the optical substrate 3354 depicted in FIG. 39C, the at least one light source 3352 may be positioned within a recess 3368a-f in the optical substrate 3354. In this example, the at least one light source 3352 may emit light from multiple light-emitting surfaces and the light from all of the light-emitting surfaces may enter the optical substrate 3354.

Each of the one or more light sources 3352 may comprise one or more LEDs. As will be understood by one of ordinary skill in the art, the one or more light sources 3352 may comprise any suitable light-emitting device. Further, the multiple light sources 3352 may emit illumination with different characteristics. For example, a portion of the light sources 3352 may be white LEDs (with a broad illumination spectrum) while another portion may be colored LEDs (with a narrow illumination spectrum) such as red LEDs or LEDs of another color.

The optical substrate 3354 may comprise a substantially flat plate. For example, the optical substrate 3354 may comprise a clear and colorless acrylic substrate which may be made from any other material suitable for transferring light by total internal reflection. The optical substrate 3354 may be positioned within the attachment 3340 so that a front major surface 3356 and a back major surface 3358 of the optical substrate 3354 are located in a plane that is substantially perpendicular to the optical axis 3345 of the camera of the mobile device 18 when the attachment 3340 is secured to the mobile device 18. In one embodiment, "substantially perpendicular" means within five degrees of perpendicular while in an alternative embodiment substantially perpendicular means within 15 or 20 degrees of perpendicular.

Alternatively, the optical substrate 3354 may be shaped such that the shape of the front major surface 3356 and/or the back major surface 3358 of the optical substrate 3354 is concave, convex, parabolic, or some combination thereof (not shown). These embodiments are depicted in more detail in U.S. patent application Ser. No. 14/510,341, which is incorporated by reference as if fully set forth.

The light emitted from the optical substrate 3354 may be diffuse illumination emitted substantially parallel to the optical axis 3345. For example, light may be emitted within 10 degrees of parallel to the optical axis 3345.

The diffuse bright field illumination system 3350 directs diffuse bright field illumination into the field of view 3346 substantially parallel to the optical axis 3345. The diffuse bright field illumination is optimal for barcode reading within a center zone 3463 of the field of view 3346. The dark field illumination system 3381 directs dark field illumination 3388 into the field of view 3346 at an angle greater than 45 degrees from the optical axis. The dark field illumination is optimal for barcode reading within a near zone 3460 of the field of view 3346.

In embodiments in which the diffuse bright field illumination system 3350 emits diffuse illumination, the diffuse illumination may be optimal for reading a barcode that has a reflective surface that is located in a near zone 3460 and/or a center zone 3463 of the field of view 3346. The center zone 3463 may begin at a center zone starting boundary 3464 and end at a center zone ending boundary 3465. The center zone starting boundary 3464 is closer to the attachment 3340 than a far zone starting boundary 3467. For example, the center zone starting boundary 3464 may be located approximately 25 mm away from the attachment 3340. The center zone ending boundary 3465 may be located within the far zone 3466. Thus, the center zone 3463 and the far zone 3466 may overlap.

As discussed, the optical substrate 3354 may be positioned between the one or more light sources 3352a-d. For example, as shown in FIG. 39A the one or more light sources 3352a-d may be located along an edge 3362 of the optical substrate 3354 that is located between the front major surface 3356 and the back major surface 3358. The one or more light sources 3352a-d introduce light into the edge 3362 of the optical substrate 3354 in a direction generally perpendicular to the optical axis 3345 and generally towards the optical axis 3345. For example, as shown in FIG. 38B, the one or more light sources 3352a-b may be located along an edge of the back major surface 3358 of the optical substrate 3354 with the chamfered edge 3360 reflecting illumination in a direction between the front major surface 3356 and the back major surface 3358 in a direction generally perpendicular to the optical axis 3345 and generally towards the optical axis 3345.

The center of the optical substrate 3354 may include an opening 3370, as shown in FIGS. 39A-39C, through which objects (such as a barcode) within the field of view 3346 may be visible to the lens assembly 40 and the photo sensor array 42 of the camera of the mobile device 18. The opening 3370 may be of sufficient size such that the optical substrate 3354 is not within the field of view 3346 of the camera of the mobile device 18. The internal surface of the opening 3370 may be coated with a reflective material which may cause illumination within the optical substrate 3354 that is incident on the surface of the opening 3370 to be reflected back into the optical substrate 3354 regardless of its angle of incidence. Reflecting illumination back into the optical substrate 3354 prevents illumination from exiting the optical substrate 3354 through the surface of the opening 3370 at an angle where it would illuminate the region behind the optical substrate 3354, such as directly illuminating the lens of the camera of the mobile device 18 and degrading the quality of the image of an object within the field of view 3346.

To prevent the optical substrate 3354 from functioning simply as a light pipe or light guide, the optical substrate 3354 may include one or more extraction features 3372 configured to extract light from the optical substrate 3354 and into the field of view 3346. The extraction features 3372 may introduce a variation in the index of refraction (i.e., a location of a non-uniform index of refraction) of the optical substrate 3354. Each extraction feature 3372 functions to disrupt the total internal reflection of the propagating light that is incident on the extraction feature 3372.

As described above with respect to FIGS. 38A-38D, the illumination directed to the edge of the optical substrate 3354 (or to the back major surface 3358 and reflected into the optical substrate 3354) generally propagates through the optical substrate 3354 due to total internal reflection. Any illumination that is incident on the one or more extraction features 3372 may be diffused with a first portion being diffused at an angle such that the illumination continues propagating within the optical substrate 3354 (based on total internal reflection) and a second portion may be diffused at an angle (i.e., an escape angle) that overcomes total internal reflection, "escapes" the surface, and is directed into the field of view 3346.

The extraction of illumination through the front major surface 3356 introduced by the extraction features 3372 may comprise at least one of: i) one or more particles within the optical substrate 3354, ii) a planar surface within the optical substrate 3354, iii) a variation in the surface topography of the back major surface 3358, and iv) a variation in the surface topography of the front major surface 3356. For example, in FIGS. 38A and 38B, the optical substrate 3354 is embedded with particles (i.e., an extraction feature 3372) having an index of refraction greater or less than the optical substrate 3354. As light travels from the edge of the optical substrate 3354 through total internal reflection towards a center of the optical substrate 3354, the particles disrupt the total internal reflection of the light, causing a portion of the propagating light to exit through the front major surface 3356.

The extraction features 3372 may be configured to extract light in a defined intensity profile over the front major surface 3356, such as a uniform intensity profile, and/or a defined light ray angle distribution. In FIG. 38A, the one or more extraction features 3372 are distributed non-uniformly throughout the optical substrate 3354. In this example, the one or more extraction features 3372 are distributed throughout the optical substrate such that light is uniformly emitted from the front major surface 3356 of the optical substrate 3354. For example, the extraction features 3372 may be spread throughout the optical substrate 3354 in concentrations that increase with distance from the at least one light source 3352.

Alternatively, the one or more extraction features 3372 may be distributed uniformly or non-uniformly throughout the optical substrate 3354. In this example, the one or more extraction features 3372 are distributed throughout the optical substrate 3354 such that light is not uniformly emitted from the front major surface 3356 of the optical substrate 3354. Instead the light is emitted from the front major surface 3356 in a desired intensity pattern. While not shown, the one or more extraction features 3372 may be distributed in alternative patterns that result in the light being emitted from the front major surface 3356 of the optical substrate 3354 having a more structured appearance (i.e., a non-uniform intensity pattern).

As shown in FIG. 38C the extraction features 3372 may comprise a surface variation in the topography of at least one of the front major surface 3356 and the back major surface 3358. In the depicted embodiment of FIG. 38C the one or more extraction features 3372 comprise variations in the back major surface 3358 of the optical substrate 3354. The front major surface 3356 of the optical substrate 3354 may be smooth and planar while the back major surface 3358 may include a topography of convex and concave indentations and protrusions.

As shown in FIG. 38E, both the back major surface 3358 and the front major surface 3356 may include extraction features 3372 comprising convex and concave indentations and protrusions. These embodiments are configured to result in a homogenous output of light from the front major surface 3356.

The convex and concave indentations and protrusions may be: i) extraction features 3372 with specific optical properties, such as micro lenses formed by, for example, molding or laser cutting; or ii) extraction features 3372 with no specific optic properties (i.e., random) such as a roughened surface formed by any of a textured tool or sanding of the surface after molding. Further, the shape, density, or other optical properties of the extraction features 3372 may increase with distance from the light source 3352 in order to produce uniform illumination from the optical substrate 3354.

Turning to FIGS. 38D and 38F, the one or more extraction features 3372 comprise a surface within the optical substrate 3354. In this embodiment, the optical substrate 3354 may be made of two different materials 3374, 3376. These materials 3374, 3376 may have different indices of refraction, and they may be in contact with one another. In FIG. 38D, the contact is along a surface forming the one or more extraction features 3372. In FIG. 38F the contact is along a surface of convex and concave shapes, either patterned or random, forming the one or more extraction features 3372. Refraction at the one or more extraction features 3372 directs illumination towards the front major surface 3356 of the optical substrate 3354 at an angle where the illumination exits the front major surface 3356 into the field of view 3346. As a variation of these embodiments, the materials 3374, 3376 may have the same index of refraction, but a material with a different index of refraction may be sandwiched between the materials 3374, 3376 at the non-planar contact surface 3378.

As will be understood by one of ordinary skill in the art, the optical substrate 3354 and the extraction features 3372 are not limited to these described embodiments. Other embodiments of the optical substrate 3354 including extraction features 3372 are also within the scope of the present disclosure.

In all of these embodiments, to further increase the quantity of illumination exiting through the front major surface 3356, a reflective backing 3380 may be applied to the back major surface 3358. The reflective backing 3380 may be applied uniformly such that it covers the entire back major surface 3358. The reflective backing 3380 reduces, or eliminates, the amount of light that escapes through the back major surface 3358 by reflecting light back inward into the optical substrate 3354. In another embodiment, a cladding film (not shown) having an index of refraction less than the index of refraction of the optical substrate 3354 may be adjacent the back major surface 3358. The cladding film reduces the amount of light that escapes by reflecting light inward through total internal reflection. Similarly, all edges and surfaces of the optical substrate 3354 (except for the edges 3362 where the one or more light sources 3352 project illumination into the optical substrate 3354) may also be coated with a reflective material.

Returning to FIG. 34A, the dark field illuminating system 3381 includes at least one tertiary light source 3382a-b. Light from the at least one tertiary light source 3382a-b may be emitted at an angle closer to perpendicular to the optical axis 3345 than the light from either of the diffuse bright field illumination system 3350 or from the white light source 84 of the mobile device 18.

Each of the at least one tertiary light sources 3382a, 3382b may comprise multiple light sources (e.g., LEDs) 3384a, 3384b mounted on circuit boards within the housing of the attachment 3340 facing the sides of the field of view 3346. Additional optics 3386a, 3386b may also be associated with each of the at least one tertiary light sources 3382a, 3382b to direct illumination to the field of view 3346. The additional optics 3386a, 3386b may utilize refraction, diffusion, prismatic effect, and/or total internal reflection to direct illumination 3388a, 3388b into the field of view 3346. The additional optics 3386a, 3386b may comprise lenses, gratings, or diffusion material that diffuses the illumination emitted from the light sources 3384a, 3384b.

Light from the at least one tertiary light source 3382a, 3382b of the dark field illumination system 3381 may be emitted at an angle of no more than 45 degrees from a plane perpendicular to the optical axis 3345. The illumination 3388a, 3388b may be optimal for reading a barcode that is located within a near zone 3460 of the field of view 3346. The near zone 3460 may begin at a near zone starting boundary 3461 and may end at a near zone ending boundary 3462. The near zone starting boundary 3461 may be closer to the attachment 3340 than the center zone starting boundary 3464. The near zone starting boundary 3461 may correspond to the face of the attachment 3340. The near zone ending boundary 3462 may be within the center zone 3463. Thus, the near zone 3460 and the center zone 3463 may overlap. However, the illumination 3388a, 3388b may not be sufficiently bright to provide optimal illumination for reading a barcode that is located farther away from the attachment 3340 than the near zone ending boundary 3462.

The attachment 3340 includes circuitry 270, a battery 272, and a user control 288. The circuitry 270 may control each of the illumination systems, e.g., the diffuse bright field illumination system 3350 and the dark field illumination system 3381 disclosed above.

The battery 272 provides an operating power for the illumination systems of the attachment 3340. The illumination systems 3350, 3381 may be connected to the battery 272, either independently of the circuitry 270, or via the circuitry 270. Thus, the illumination systems 3350, 3381 may be controlled by the circuitry 270 and powered by the battery 272 included in the attachment 3340.

The user control 288 may be actuated by the user to perform various functions, such as initiating the capture of a barcode. The user control 288 may include any form of user input known in the art, including but not limited to switches, levers, knobs, touch screens, microphones coupled to voice-operation software, and the like. The user control 288 may advantageously take the form of a trigger that can be actuated, for example, with the index finger of the user. In alternative embodiments, the housing 460 may be modified to have a pistol grip or other grip that enhances the ergonomics of the housing 460 and/or facilitates actuation of the user control similar to the housing depicted in FIG. 14.

In one embodiment, the attachment 3340 may include an interface (not shown) for communication with the mobile device 18. The interface may be a hardware power/data connector such that when the two matching connectors of the attachment 3340 and the mobile device 18 are coupled, both: i) a power connection is established for providing supplemental operating power from the battery 272 of the attachment 3340 to the mobile device 18, which may be in the form of power for charging a battery; and ii) a point-to-point hardware communication interface is established for data communication between the circuitry 270 of the attachment 3340 and a processor (not shown) of the mobile device 18. More details about the communication between the attachment 3340 and the mobile device 18 are disclosed in U.S. patent application Ser. No. 14/319,193, which is incorporated herein by reference as if fully set forth.

Figure 34B:
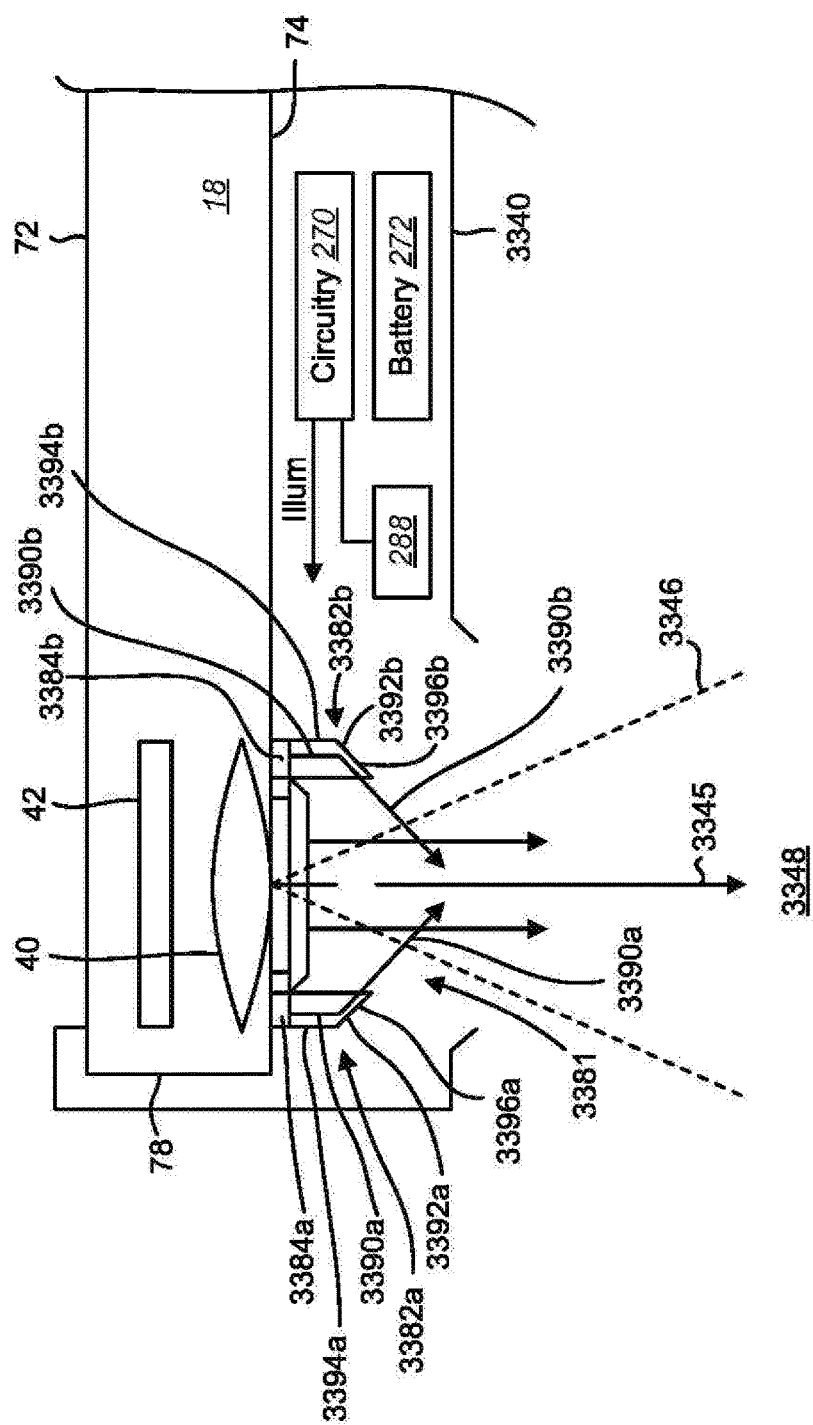

With reference to FIG. 34B, an alternative embodiment of the attachment 3340 is depicted. In this embodiment, the at least one tertiary light source 3382a, 3382b of the dark field illumination system 3381 is mounted on a circuit board that is substantially perpendicular to the optical axis 3345. Illumination 3390a, 3390b from at least one light sources (e.g., LEDs) 3384a, 3384b is directed substantially parallel to the optical axis 3345 toward prism optics 3392a, 3392b. More specifically, the at least one light source 3384a, 3384b may project illumination 3390a, 3390b into light pipes 3394a, 3394b which use total internal reflection to propagate the illumination 3390a, 3390b toward the prism optics 3392a, 3392b. The prism optics 3392a, 3392b are used to re-direct the illumination 3390a, 3390b into the target area 3348 at the desired dark field illumination angle.

The light pipes 3394a, 3394b may comprise chamfered ends 3396a, 3396b. These chamfered ends 3396a, 3396b may serve as the prism optics 3392a, 3392b that re-direct the illumination 3390a, 3390b toward the target area 3348.

Each of the chamfered ends 3396a, 3396b may be angled such that total internal reflection redirects the illumination 3390a, 3390b at a non-zero angle (e.g., 45°) relative to the plane that is perpendicular to the optical axis 3345. The illumination 3390a, 3390b may exit the light pipes 3394a, 3394b through the side facing the optical axis 3345. It should be appreciated that the light pipes 3394a, 3394b are shown in cross section and may be on each side of the camera of the mobile device 18 (all four sides—left, right, top, bottom) or may even form an annular ring around the field of view 3346.

In yet other embodiments, the structure of the diffuse bright field illumination system and the dark field illumination system depicted in FIGS. 1-8 of U.S. patent application Ser. No. 14/510,341 may be implemented within the attachment 3340.

It should also be appreciated that each of these illumination sources may generate illumination with different characteristics. For example, the diffuse bright field illumination may be white LEDs (e.g., illumination with an intensity across a wide spectrum of wavelengths) while the tertiary light source may be red LEDs (e.g., illumination with an intensity of 660 nm).

The two illumination systems can be independently operated such that a barcode can be read with the illumination system that provides the best illumination for reading the barcode.

Figure 35:
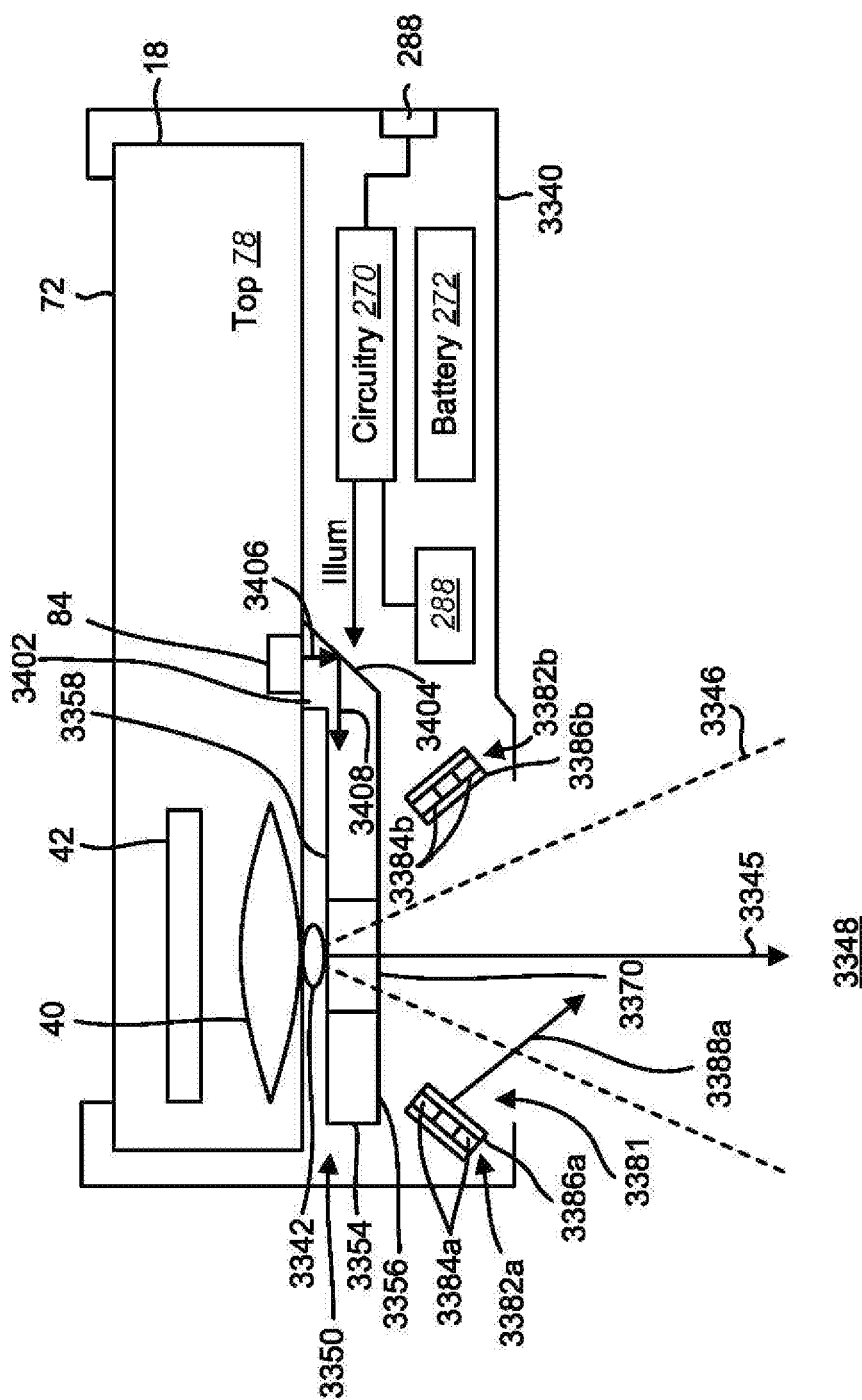
FIGS. 35-37 depict exemplary mobile device attachments in accordance with different embodiments.

With reference to FIG. 35, an alternative embodiment of the attachment 3340 is depicted. In this embodiment, the diffuse bright field illumination system 3350 includes the optical substrate 3354 with extraction features as described with respect to FIGS. 34A, 34B, 38A-38F, and 39A-39C except that the white light source 84 of the mobile device 18 provides the illumination that is introduced into the optical substrate 3354 between the front major surface 3356 and the back major surface 3358.

In more detail, a light pipe region 3402 of the optical substrate 3354 is positioned adjacent to the white light source 84 of the mobile device 18 (e.g., within the field of illumination of the white light source 84 of the mobile device 18) when the attachment 3340 is secured to the mobile device 18. The light pipe region 3402 receives illumination 3406 emitted by the white light source 84 of the mobile device 18. A reflective or prismatic surface 3404 redirects the illumination 3406 into the optical substrate 3354 (i.e., illumination 3408 after redirection) between the front major surface 3356 and the back major surface 3358.

The embodiment of the attachment 3340 depicted in FIG. 35 may also include the dark field illumination system 3381 as described above. The embodiment in FIG. 35 shows the dark field illumination system 3381 described with respect to FIG. 34A for illustrative purposes. It should be appreciated that the embodiment of the attachment 3340 depicted in FIG. 35, with the diffuse bright field illumination system 3350 being illuminated by the white light source 84 of the mobile device, may include the dark field illumination system described with respect to any of FIG. 34A or 34B, or to any of FIG. 1, 5, 6, or 7 of U.S. patent application Ser. No. 14/510,341 without departing from the scope of the present invention.

Figure 36:
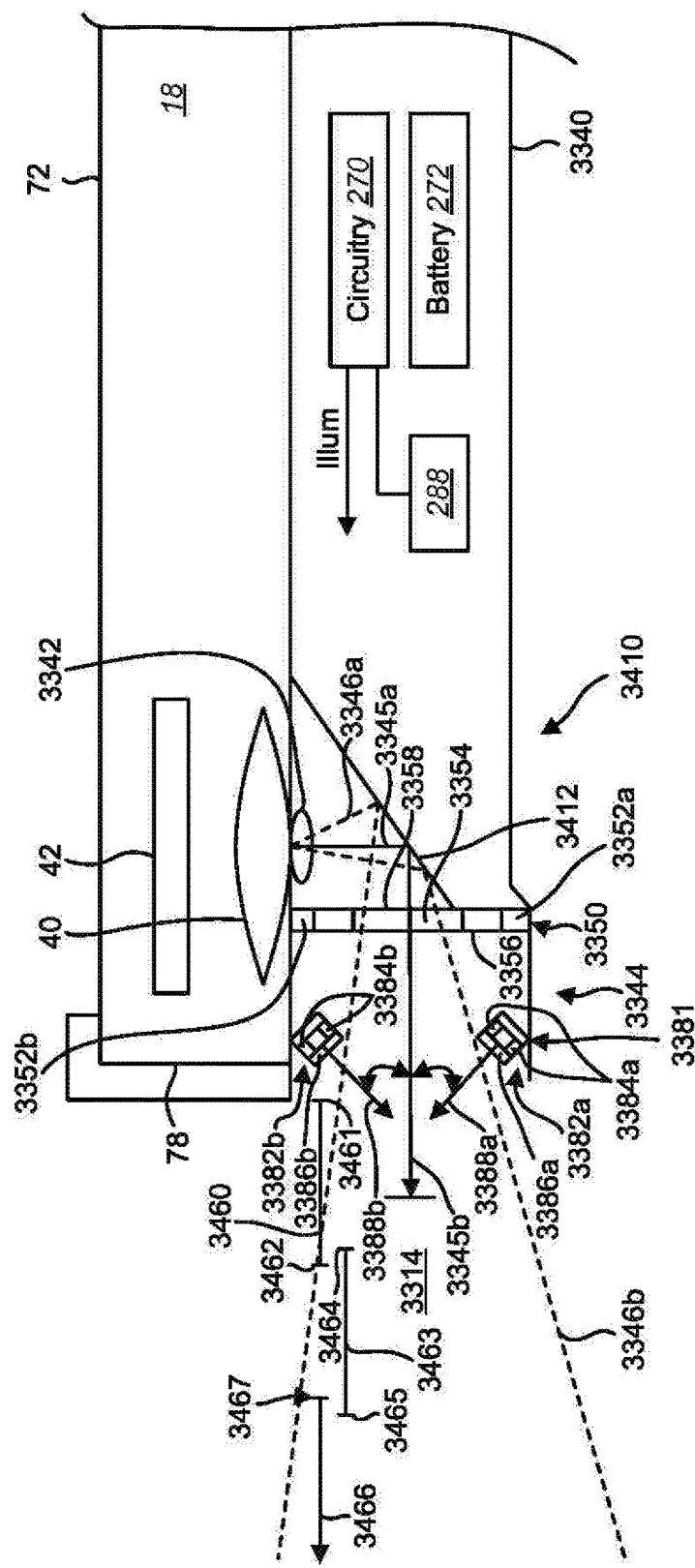

FIG. 36 depicts an example of a mobile device attachment 3340 (shown as an encapsulating attachment in partial view) that includes a supplementary optic system 3410. The supplementary optic system 3410 includes at least one of a supplementary lens system 3342, a supplementary illumination system 3344, and a reflective surface 3412 which redirects the optical axis 3345a and the field of view 3346a (as modified by the supplementary lens system 3342) from its original direction extending to a region to the back surface of the mobile device 18 to the optical axis 3345b and the field of view 3346b in a redirected direction extending into the target area 3314 to the top edge 78 of the mobile device 18.

In FIG. 36, the reflective surface 3412 is shown at approximately 45 degrees such that the optical axis 3345b and the field of view 3346b are approximately 90 degrees, similar to that of the attachment 110 depicted in FIG. 10C. However, it is envisioned that the reflective surface 3412 may be positioned at other angles (for example, the angle depicted in FIG. 10D), such that the optical axis 3345a and the field of view 3346a are folded to extend into a target area 3314 that beyond the top edge 78 of the mobile device 18.

Similar to FIGS. 34A, 34B, and 35, the supplementary lens system 3342 is depicted as a single lens for illustration purposes only and the supplementary lens system 3342 may be any of the supplementary lens systems described herein including those described with respect to FIGS. 6A, 6B, 10A, 10B, 10C, 13, 14, and 15.

Again, although FIG. 36 depicts the attachment 3340 as an encapsulating attachment, the supplementary optic system 3410 including the supplementary lens system 3342 and the supplementary illumination system 3344 may be implemented in any of the mounted attachments, corner-positioned attachments, and encapsulating attachments described herein.

Similar to the embodiment depicted in FIGS. 34A and 34B, the supplementary illumination system 3344 of the attachment 3340 in FIG. 36 may include at least two exposure illumination systems such as a midfield illumination system (or diffuse bright field illumination system) 3350 and a near-field illumination system (or dark field illumination system) 3381.

The diffuse bright field illumination system 3350 is configured to illuminate a barcode within the field of view 3346 while the camera captures an image of the barcode. Similar to the embodiments depicted in FIGS. 34A and 34B, the diffuse bright field illumination system 3350 includes at least one light source 3352a, 3352b and an optical substrate 3354 including one or more extraction features. The optical substrate 3354 has a front major surface 3356 and a back major surface 3358 arranged generally perpendicular to the optical axis 3345b after it has been folded by the reflective surface 3412. Light is introduced from the at least one light source 3352a, 3352b between the front major surface 3356 and the back major surface 3358. The introduced light is transferred by total internal reflection through the optical substrate 3354 between the front major surface 3356 and back major surface 3358 in a direction transverse to the optical axis 3345b. Any of the optical substrates 3354 discussed with respect to FIGS. 34A, 34B, 38A-38F, and 39A-39C may be used with the at least one light source 3352a-b being positioned on the edges of the optical substrate 3354 or on the back major surface 3358.

As discussed, the optical substrate 3354 may comprise a substantially flat plate. For example, the optical substrate 3354 may comprise a clear and colorless acrylic substrate which may be made from any other material suitable for transferring light by total internal reflection. The optical substrate 3354 may be positioned within the attachment 3340 so that the front major surface 3356 and the back major surface 3358 of the optical substrate 3354 are located in a plane that is substantially perpendicular to the optical axis 3345b. In one embodiment, "substantially perpendicular" means within five degrees of perpendicular while in an alternative embodiment substantially perpendicular means within 15 or 20 degrees of perpendicular.

Alternatively, the optical substrate 3354 may be shaped such that the shape of the front major surface 3356 and/or the back major surface 3358 is concave, convex, parabolic, or some combination thereof (not shown) as described in more detail in U.S. patent application Ser. No. 14/510,341.

The light emitted from the optical substrate 3354 may be diffuse illumination emitted substantially parallel to the optical axis 3345b. For example, light may be emitted within 10 degrees of parallel to the optical axis 3345b.

The diffuse bright field illumination 3350 system directs diffuse bright field illumination into the field of view 3346b substantially parallel to the optical axis 3345b. The diffuse bright field illumination is optimal for barcode reading within a center zone 3463 of the field of view 3346. The dark field illumination system 3381 directs dark field illumination 3388 into the field of view 3346b at an angle greater than 45 degrees from the folded optical axis 3345b. The dark field illumination is optimal for barcode reading within a near zone 3460 of the field of view 3346.

In embodiments in which the diffuse bright field illumination system 3350 emits diffuse light, the illumination may be optimal for reading a barcode that has a reflective surface that is located in a near zone 3460 and/or a center zone 3463 of the field of view 3346b. The center zone 3463 may begin at a center zone starting boundary 3464 and end at a center zone ending boundary 3465. The center zone starting boundary 3464 is closer to the attachment 3340 than a far zone starting boundary 3467. For example, the center zone starting boundary 3464 may be located approximately 25 mm away from the attachment 3340. The center zone ending boundary 3465 may be located within the far zone 3466. Thus, the center zone 3463 and the far zone 3466 may overlap.

As discussed, the optical substrate 3354 may be positioned between the one or more light sources 3352a-d. For example, as shown in FIG. 39A the one or more light sources 3352a-d may be located along an edge 3362 of the optical substrate 3354 that is located between the front major surface 3356 and the back major surface 3358. The one or more light sources 3352a-d introduce light into the edge 3362 of the optical substrate 3354 in a direction generally perpendicular to the optical axis 3345 and generally towards the optical axis 3345. For example, as shown in FIG. 38B the one or more light sources 3352a-b may be located along an edge of the back major surface 3358 of the optical substrate 3354 with the chamfered edge 3360 reflecting illumination in a direction between the front major surface 3356 and the back major surface 3358 in a direction generally perpendicular to the optical axis 3345 and generally towards the optical axis 3345.

The dark field illuminating system 3381 includes at least one tertiary light source 3382a, 3382b. Light from the at least one tertiary light source 3382a, 3382b may be emitted at an angle closer to perpendicular to the optical axis 3345b than the light from the diffuse bright field illumination system 3350.

Each of the at least one tertiary light sources 3382a, 3382b may comprise multiple light sources (e.g., LEDs) 3384a, 3384b mounted on circuit boards with the housing of the attachment 3340 facing the sides of the field of view 3346b. Additional optics 3386a, 3386b may also be associated with each of the at least one tertiary light sources 3382a, 3382b to direct illumination to the field of view 3346b. The additional optics 3386a, 3386b may utilize refraction, diffusion, prismatic effect, and/or total internal reflection to direct illumination 3388a, 3388b into the field of view 3346b. The additional optics 3386a, 3386b may comprise lenses, gratings, or diffusion material that diffuses the illumination emitted from the light sources 3384a, 3384b.

Light from the at least one tertiary light source 3382a, 3382b of the dark field illumination system 3381 may be emitted at an angle of no more than 45 degrees from a plane perpendicular to the optical axis 3345b. The dark field illumination 3388a, 3388b may be optimal for reading a barcode that is located within a near zone 3460 of the field of view 3346b. The near zone 3460 may begin at a near zone starting boundary 3461 and may end at a near zone ending boundary 3462. The near zone starting boundary 3461 may be closer to the attachment 3340 than the center zone starting boundary 3464. The near zone starting boundary 3461 may correspond to the face of the attachment 3340. The near zone ending boundary 3462 may be within the center zone 3463. Thus, the near zone 3460 and the center zone 3463 may overlap. However, the dark field illumination 3388a, 3388b may not be sufficiently bright to provide optimal illumination for reading a barcode that is located farther away from the attachment 3340 than the near zone ending boundary 3462.

The embodiment of the attachment 3340 depicted in FIG. 36 includes the dark field illumination system 3381 described with respect to FIG. 34A for illustrative purposes. It should be appreciated that the embodiment of the attachment 3340 depicted in FIG. 36 may include the dark field illumination system described with respect to any of FIG. 34A or 34B, or to any of FIG. 1, 5, 6, or 7 of U.S. patent application Ser. No. 14/510,341, emitting illumination at an angle of less than 45 degrees from a plane perpendicular to the optical axis 3345b without departing from the scope of the present disclosure.

Figure 37:
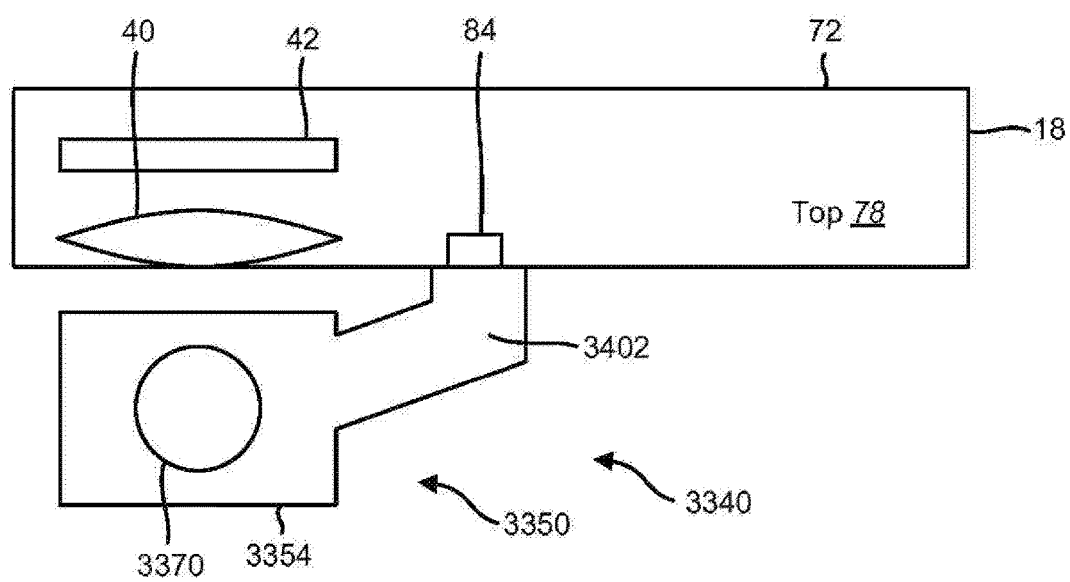

FIG. 37 is a schematic drawing of an example of a barcode-reading enhancement accessory 3340 attached to a mobile device 18 in accordance with one embodiment of the present disclosure. In this embodiment, the diffuse bright field illumination system 3350 includes the optical substrate 3354 with extraction features as described with respect to FIGS. 34A, 34B, 38A-38F, and 39A-39C except that the white light source 84 of the mobile device 18 provides the illumination that is introduced into the optical substrate 3354 between the front major surface and the back major surface of the optical substrate 3354.

In more detail, a light pipe region 3402 of the optical substrate 3354 is positioned adjacent to the white light source 84 of the mobile device 18 (e.g., within the field of illumination of the white light source 84 of the mobile device 18) when the attachment 3340 is secured to the mobile device 18. The light pipe region 3402 receives illumination emitted by the white light source 84 of the mobile device 18, and redirects the illumination into the optical substrate 3354 between the front major surface and the back major surface of the optical substrate 3354.

The attachment 3340 may include a reflective surface (not shown in FIG. 37) to fold the optical axis and the field of view of the camera to the top region of the mobile device 18, as disclosed in the embodiment of FIG. 36. FIG. 37 also shows the opening 3370 formed in the optical substrate 3354. The attachment 3340 depicted in FIG. 37 may also include the dark field illumination system as described above.

Referring to FIG. 2A and FIGS. 40-48, functions of the barcode-reading application 24 are disclosed hereafter. If multiple exposure illumination systems are available for reading a barcode, such as when any of the attachments described with respect to FIGS. 34A, 34B, 35, 36 and 37 are utilized, the barcode-reading application 24 may determine whether one or more of the multiple exposure illumination systems are illuminated by the white light source 84 of the mobile device 18 or by separate illumination systems within the attachment 3340, and whether one or more of the exposure illumination systems also function as a targeting system, activating exposure illumination (such as was previously described with respect to step 546 of FIG. 19A, step 554' of FIG. 19B, or the combination of steps 546 and 552 of FIG. 19A and the combination of steps 554' and 552' of FIG. 19B).

Figure 40:
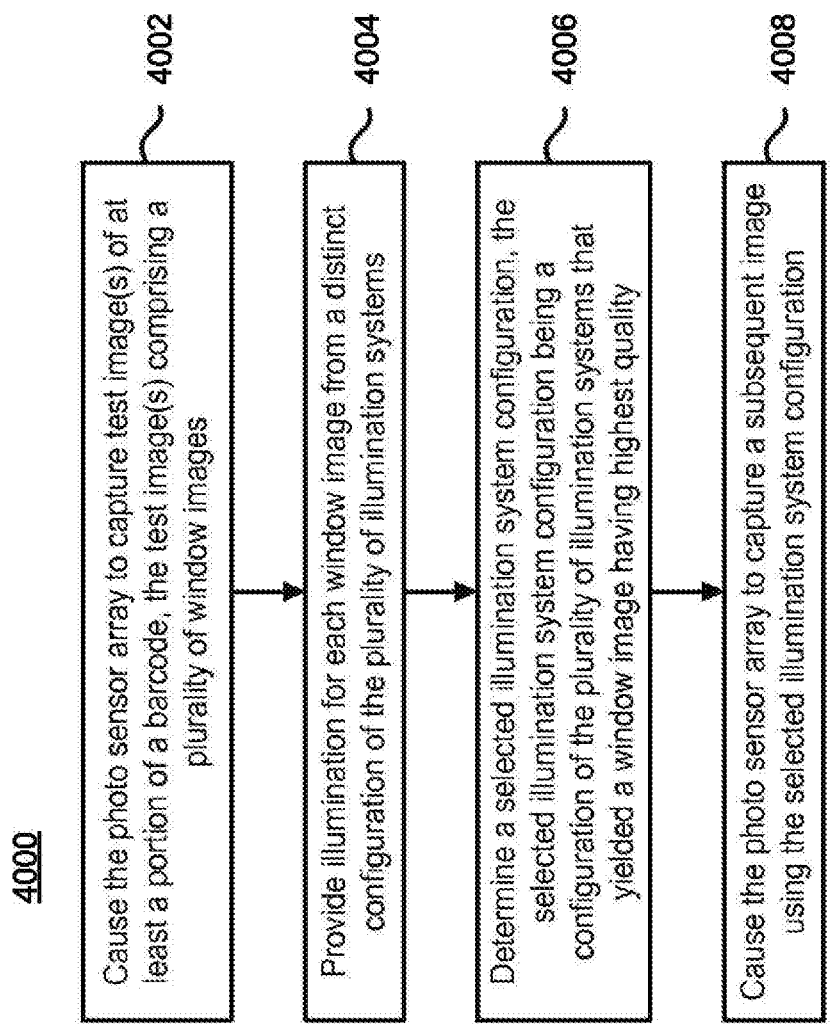
FIG. 40 illustrates an example of a method that may be performed by the barcode-reading application in accordance with the present disclosure.
Figure 41:
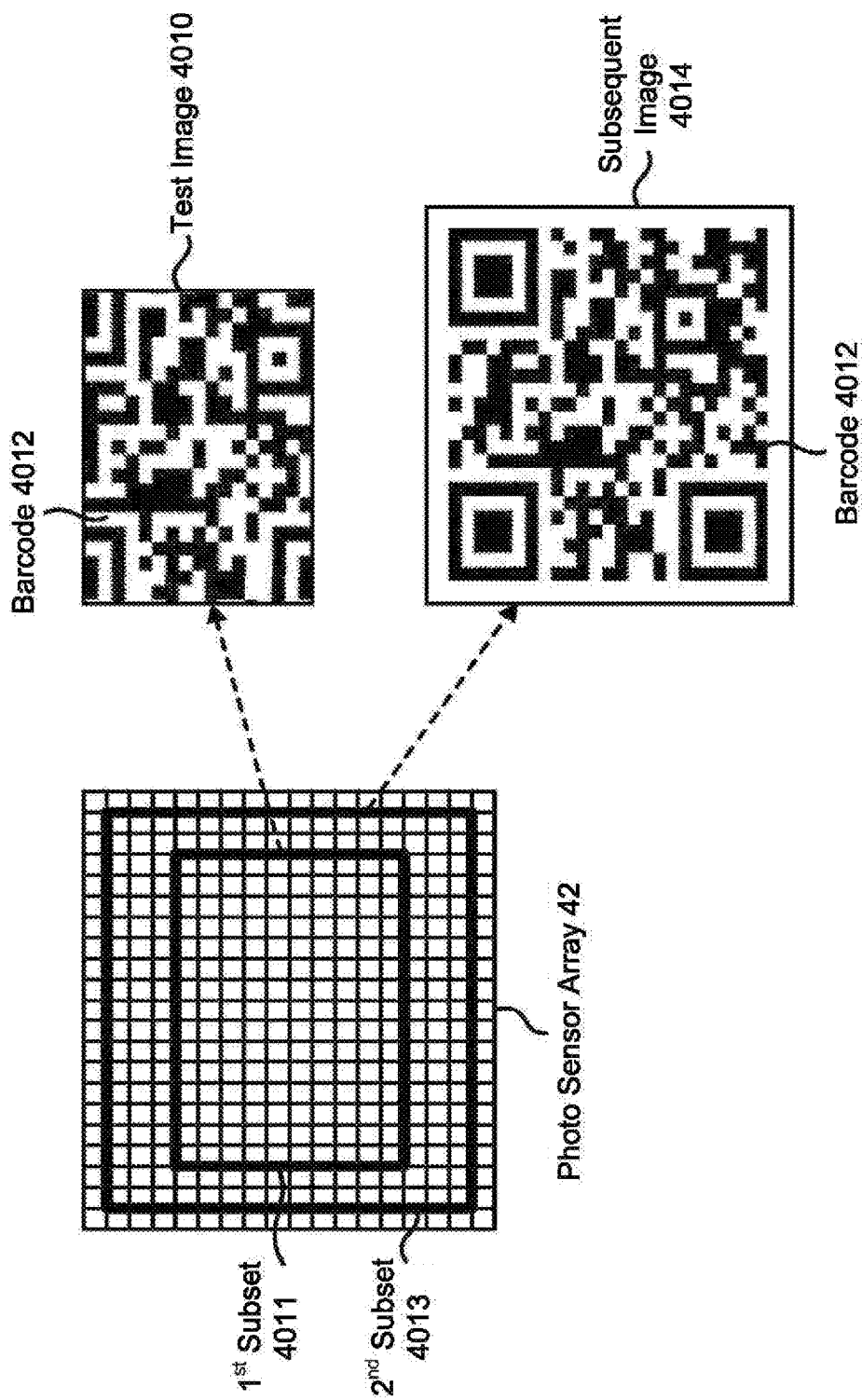
FIG. 41 illustrates an example showing the relative size of a test image compared with a subsequent image.

FIG. 40 illustrates an example of a method 4000 that may be performed by the barcode-reading application 24 in accordance with the present disclosure. The barcode-reading application 24 may be configured to cause the photo sensor array 42 to capture 4002 at least one test image. For example, the photo sensor array 42 may capture 4002 a single test image 4030 (see, e.g., FIGS. 42 and 43A). Alternatively, the photo sensor array 42 may capture 4002 a plurality of test images 4046a-b (see, e.g., FIGS. 44, 45A and 45B).

The test image(s) may include at least a portion of a barcode. That is, only a portion of a barcode (i.e., less than an entire barcode) may be visible in the test image(s). Alternatively, an entire barcode may be visible in the test image(s).

The test image(s) may include a plurality of window images. As used herein, the term "window image" refers to an image that is smaller than a full photo sensor array image. In one possible configuration, a single test image 4030 may be captured, and the single test image 4030 may comprise a plurality of window images 4026a-b. (See, e.g., FIG. 43A.) In another possible configuration, a plurality of test images 4046a-b may be captured, and each test image 4046 may comprise a window image 4048. (See, e.g., FIGS. 45A and 45B.)

Returning to FIG. 40, the barcode-reading application 24 may be configured to provide 4004 illumination for each window image from a distinct configuration of the plurality of illumination systems. For example, if the combination of the mobile device 18 and the attachment 3340 includes a diffuse bright field illumination system and a dark field illumination system, the test image(s) may include at least two different window images. For example, the illumination for capturing a first window image may be provided solely by the diffuse bright field illumination system, and the illumination for capturing a second window image may be provided solely by the dark field illumination system.

Alternatively, multiple illumination systems may be activated at the same time with various permutations of balanced intensity. For example, the illumination for capturing the first window image may be provided by the diffuse bright field illumination system at 60% power and the dark field illumination system at 40% power. The illumination for capturing the second window image may be provided by the diffuse bright field illumination system at 40% power and the dark field illumination system at 60% power.

The barcode-reading application 24 may also be configured to determine 4006 a selected illumination system configuration. The selected illumination system configuration may be a configuration of the plurality of illumination systems that yielded a window image having the highest quality among the plurality of window images.

Generally speaking, the quality of an image of a barcode may be measured in terms of the contrast between the light cells and the dark cells within the barcode. A barcode image having relatively high contrast between dark cells and light cells may be considered to have higher quality than another barcode image having relatively low contrast between dark cells and light cells.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of an intensity such that the exposure of the image yields both dark cells and light cells that are within the dynamic range of the photo sensor array 42. This yields better contrast than any of the following: (i) a dimly lit barcode; (ii) a brightly lit barcode wherein the image is washed out beyond the dynamic range of the photo sensor array 42; (iii) an unevenly lit barcode with bright washed-out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

If the quality of a window image is measured in terms of contrast, determining 4006 the selected illumination system configuration may include determining which window image of the plurality of window images has the highest contrast between light and dark cells of the barcode, and determining which configuration of the plurality of illumination systems was activated when the window image having the highest contrast was captured.

Alternatively, the quality of the window images may be measured in terms of the presence of desired barcode features and/or patterns. A score or metric may be calculated for each window image. A particular window image's score/metric may indicate the number of desired barcode features and/or patterns that are detected in the window image. For example, a higher score/metric may indicate a greater number of desired barcode features and/or patterns (or vice versa). If the quality of the window images is measured in this way, then determining 4006 the selected illumination system configuration may include determining which window image of the plurality of window images has the most favorable score/metric based on features or patterns of the barcode, and determining which configuration of the plurality of illumination systems was activated when the window image having the most favorable score/metric was captured.

The barcode-reading application 24 may also be configured to cause the photo sensor array 42 to capture 4008 a subsequent image using the selected illumination system configuration. The subsequent image may be captured using a global shutter or a rolling shutter mode of operation. As indicated above, the test image(s) may include only a portion of a barcode (i.e., only part of the barcode may be visible within the test image(s)). However, the subsequent image may include an entire barcode (i.e., the entire barcode may be visible within the subsequent image).

The subsequent image may be a full photo sensor array image. That is, the subsequent image may include pixels corresponding to all of the photo sensors in the photo sensor array 42. Alternatively, the subsequent image may include pixels corresponding to substantially all of the photo sensors in the photo sensor array 42. In this context, the phrase "substantially all" of the photo sensors in the photo sensor array 42 may mean at least 95% of the photo sensors in the photo sensor array 42.

Alternatively still, the size of the subsequent image may be larger than the test image(s), but smaller than a full photo sensor array image. For example, referring to FIG. 41, a test image 4010 may include pixels corresponding to a first subset 4011 of the photo sensors in the photo sensor array 42, and the subsequent image 4014 may include pixels corresponding to a second subset 4013 of the photo sensors in the photo sensor array 42. The second subset 4013 may be larger than the first subset 4011. However, the second subset 4013 may or may not include all of the photo sensors in the photo sensor array 42.

The size and location of the second subset 4013 may be determined based on defined rules. For example, the size and location of the second subset 4013 may correspond to the size and location of a previously read barcode.

Alternatively, the size and location of the second subset 4013 may be determined by estimating the border of the barcode 4012 in the test image 4010 based on characteristics of the barcode 4012 visible in the test image 4010, and then setting the size and location of the second subset 4013 to include the estimated border.

As another example, if the dark field illumination system yields a higher quality window image than the diffuse bright field illumination system, then the entire photo sensor array 42 may be utilized to capture the subsequent image 4014 (because the "up close" barcode 4012 will be larger). Conversely, if the diffuse bright field illumination system yields a higher quality window image than the dark field illumination system, then a subset 4011 (e.g., a central portion) of the photo sensors within the photo sensor array 42 may be utilized to capture the subsequent image 4014 (because the "far away" barcode 4012 will be smaller).

Figure 42:
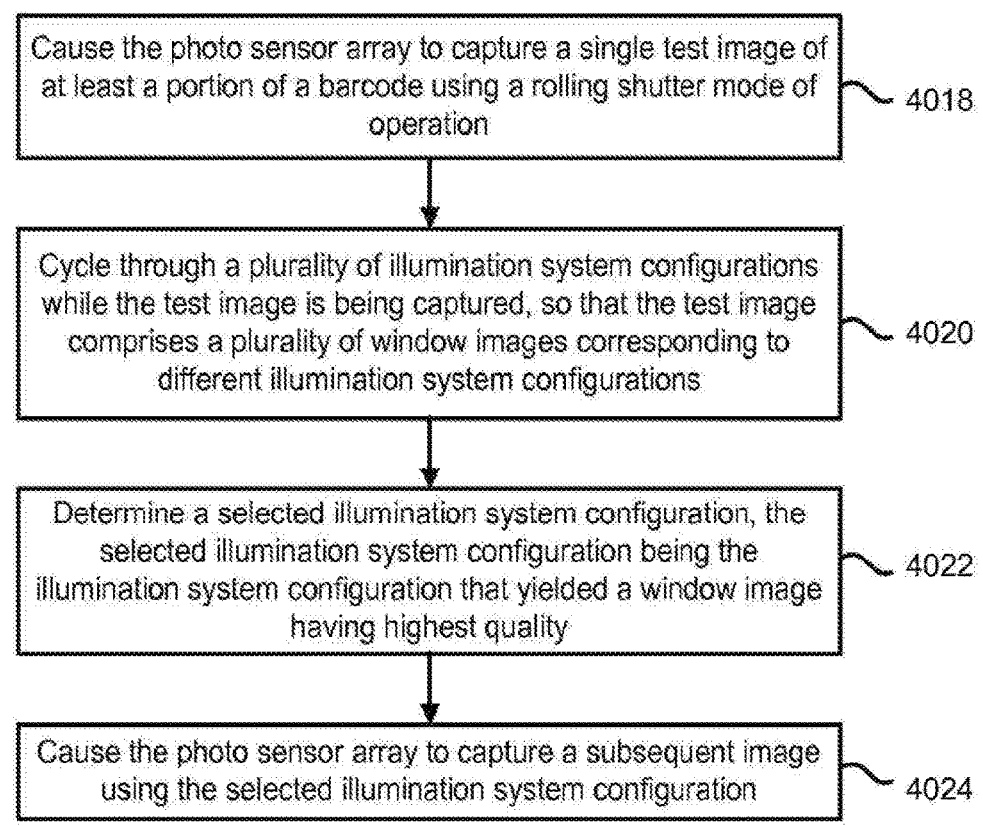
FIG. 42 illustrates another example of a method that may be performed by the barcode-reading application in accordance with the present disclosure.

FIG. 42 illustrates another example of a method 4017 that may be performed by the barcode-reading application 24 in accordance with the present disclosure. The barcode-reading application 24 may be configured to cause the photo sensor array 42 to capture 4018 a single test image 4030 (shown in FIG. 43A) of at least a portion of a barcode using a rolling shutter mode of operation.

Windowing may be utilized, so that the test image 4030 may be smaller than a full photo sensor array image.

The barcode-reading application 24 may be configured to cycle through 4020 a plurality of configurations of the plurality of illumination systems while the test image 4030 is being captured, so that each illumination system configuration is activated for a distinct time period while the test image 4030 is being captured and is not otherwise activated while the test image 4030 is being captured. Consequently, the test image 4030 may include a plurality of window images 4026*a*-*b*. For example in FIG. 43A, each window image 4026 may correspond to a distinct band (e.g., a horizontal band) within the test image 4030, and each window image 4026 may correspond to a distinct illumination system configuration. For example, during exposure of a first section 4028*a* of the photo sensor array 42, the diffuse bright field illumination system may be activated, while the dark field illumination system may be deactivated. During exposure of a second section 4028*b* of the photo sensor array 42, the dark field illumination system may be activated, while the bright field illumination system may be deactivated. Both the bright field illumination system and the dark field illumination system may be activated during exposure of the section of the photo sensor array 42 between the first section 4028a and the second section 4028b, as the transition is made from one system to the other.

In this example, the test image 4030 that is captured includes two distinct bands. In the example described above, the band corresponding to the first section 4028a of the photo sensor array 42 may be captured using illumination solely from the diffuse bright field illumination system. Thus, this window image 4026a may indicate the suitability of the bright field illumination system for capturing an image of a barcode. In the example described above, the band corresponding to the second section 4028b of the photo sensor array may be captured using illumination solely from the dark field illumination system. Thus, this window image 4026b may indicate the suitability of the dark field illumination system for capturing a barcode.

In the example just described, there is one window image 4026 for each illumination system. However, under some circumstances multiple window images may be captured for one or more of the illumination systems. For example, during exposure of a first section of the photo sensor array 42, the diffuse bright field illumination system may be activated, while the dark field illumination system may be deactivated. During exposure of a second section of the photo sensor array 42, the dark field illumination system may be activated, while the diffuse bright field illumination system may be deactivated. During exposure of a third section of the photo sensor array 42, the diffuse bright field illumination system may be activated at reduced power (e.g., 50%), while the dark field illumination system may be deactivated. The test image in this example may include three window images corresponding to three distinct bands within the test image. The first window image may indicate the suitability of the diffuse bright field illumination system for capturing an image of a barcode. The second window image may indicate the suitability of the dark field illumination system for capturing an image of a barcode. The third window image may indicate the suitability of the diffuse bright field illumination system, operating at reduced power, for capturing an image of a barcode.

Alternatively, both illumination systems may be activated at the same time with various permutations of balanced intensity. For example, the band corresponding to the first section 4028a of the photo sensor array 42 may be captured using illumination from the diffuse bright field illumination system powered at 60% and the dark field illumination system powered at 40%. The band corresponding to the second section 4028b of the photo sensor array 42 may be captured using illumination from the bright field illumination system powered at 40% and the dark field illumination system powered at 60%.

Figure 43A:
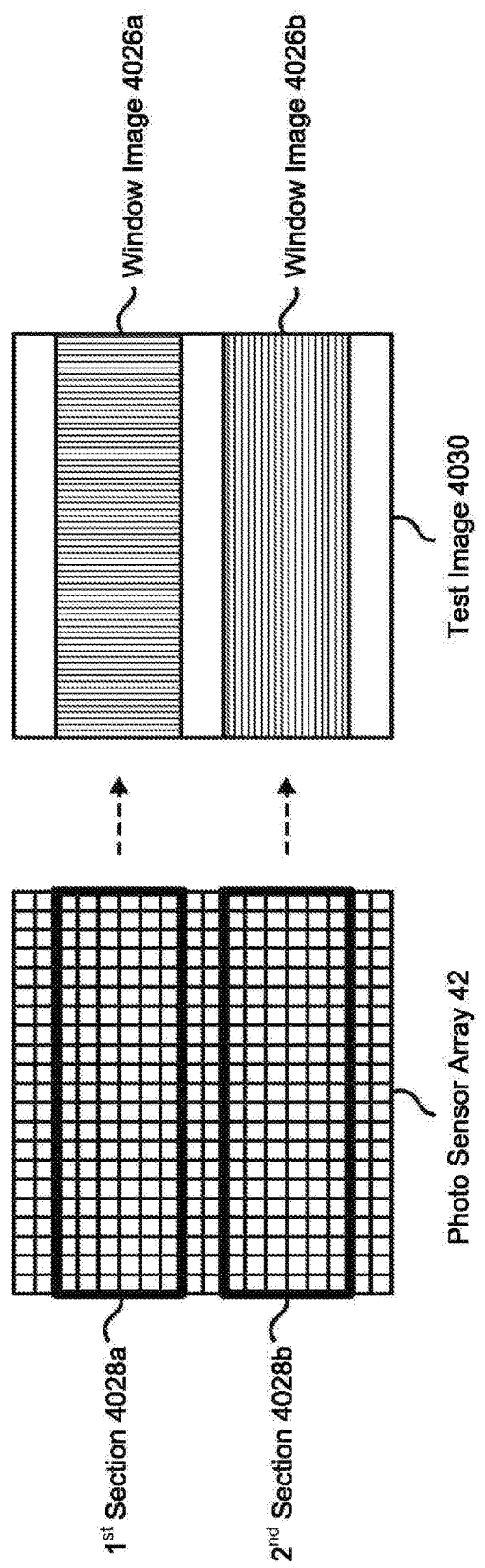
FIGS. 43A and 43B illustrate examples of a single test image comprising a plurality of window images.
Figure 43B:
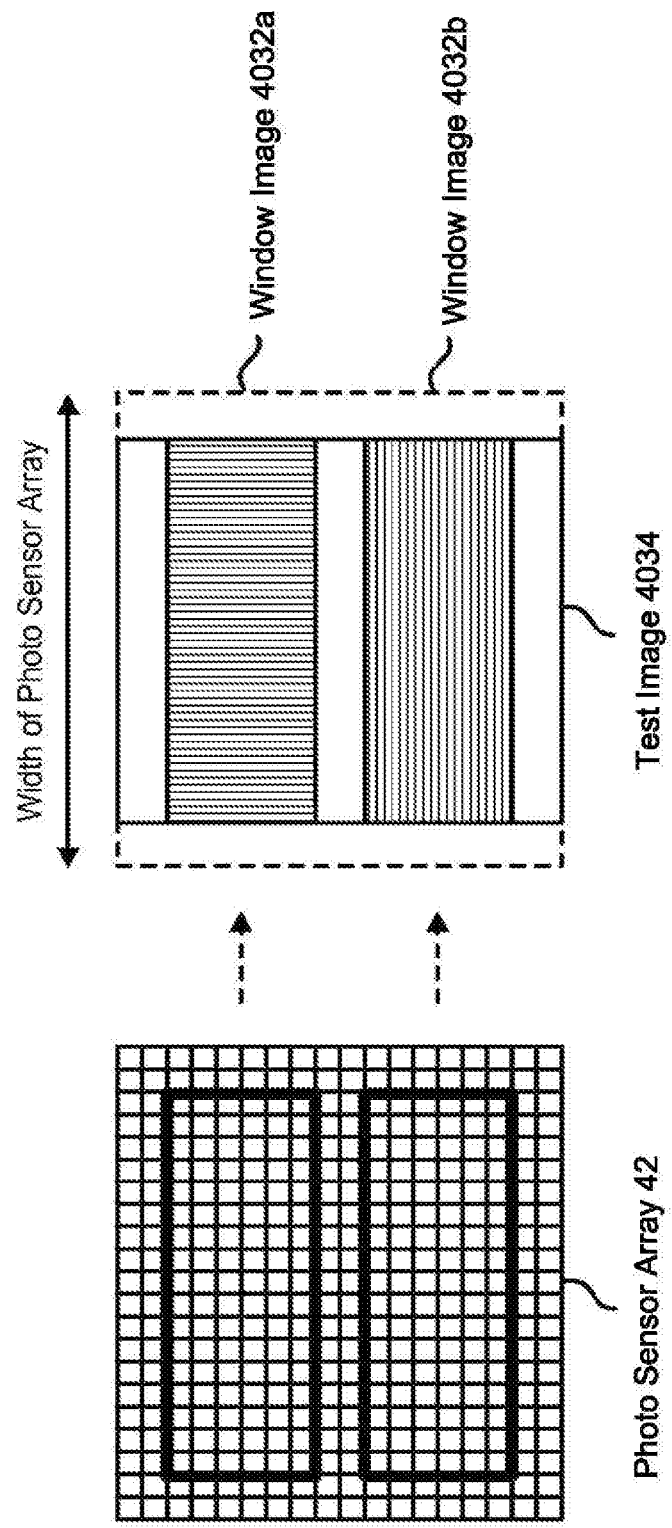

In FIG. 43A, the width of the test image 4030 and the width of the window images 4026a, 4026b within the test image 4030 are shown as being equal to the width of the photo sensor array 42. As shown in FIG. 43B, however, the width of the test image 4034 and the width of the window images 4032a, 4032b within the test image 4034 may alternatively be less than the width of the photo sensor array 42.

Returning to FIG. 42, the barcode-reading application 24 may also be configured to determine 4022 a selected configuration of the plurality of illumination systems. The selected illumination system configuration may be the configuration of the plurality of illumination systems that yielded a window image having the highest quality among the plurality of window images. The barcode-reading application 24 may also be configured to cause the photo sensor array 42 to capture 4024 a subsequent image using the selected illumination system configuration.

Figure 44:
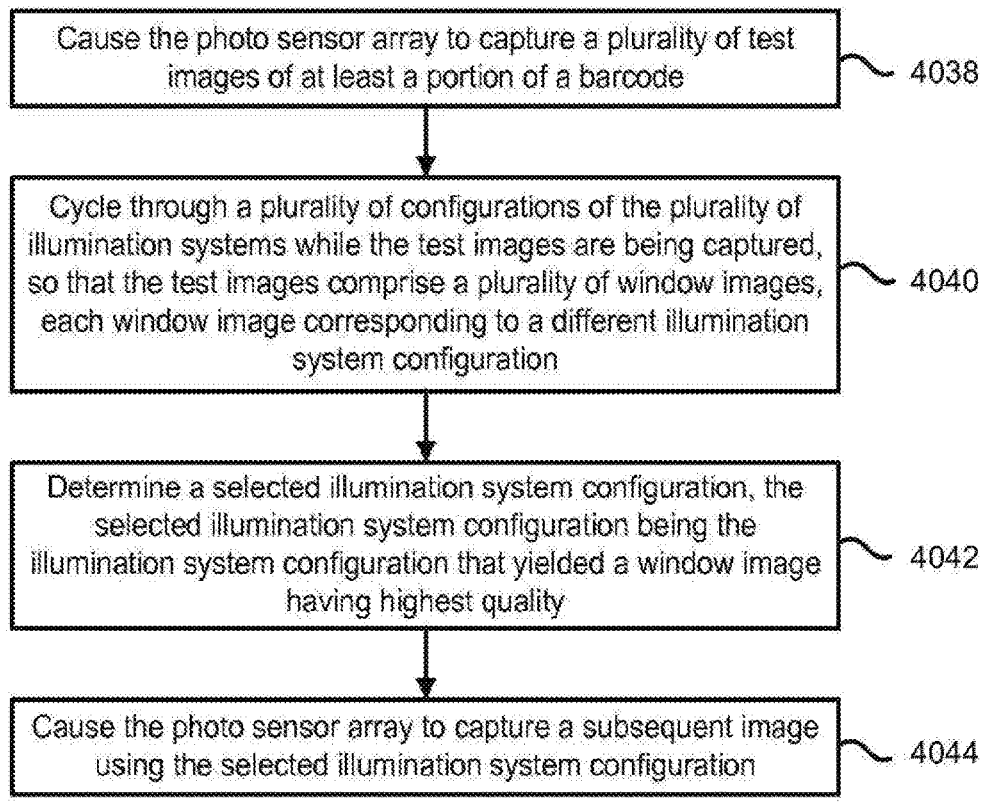
FIG. 44 illustrates another example of a method that may be performed by the barcode-reading application in accordance with the present disclosure.
Figure 45A:
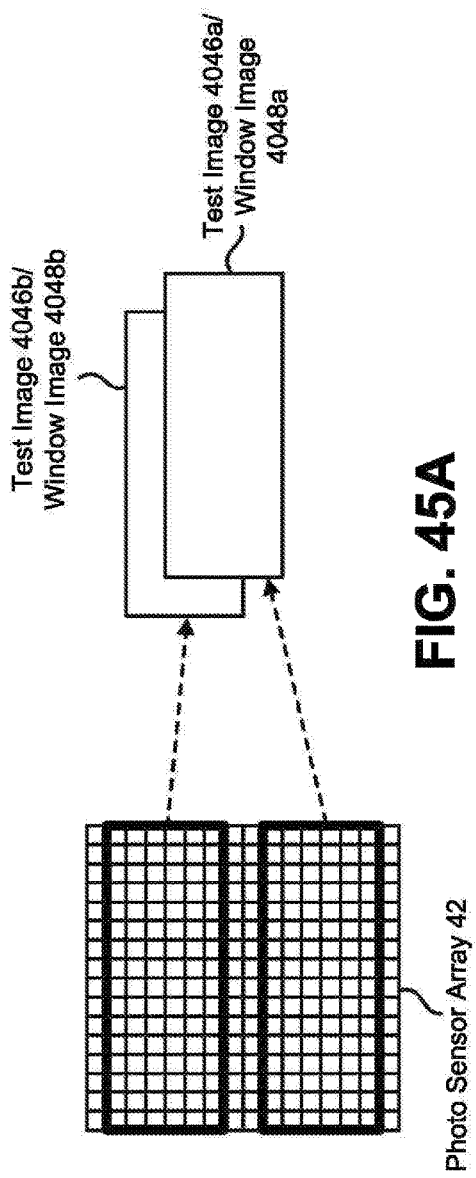
FIGS. 45A and 45B illustrate a plurality of test images comprising a plurality of window images.
Figure 45B:
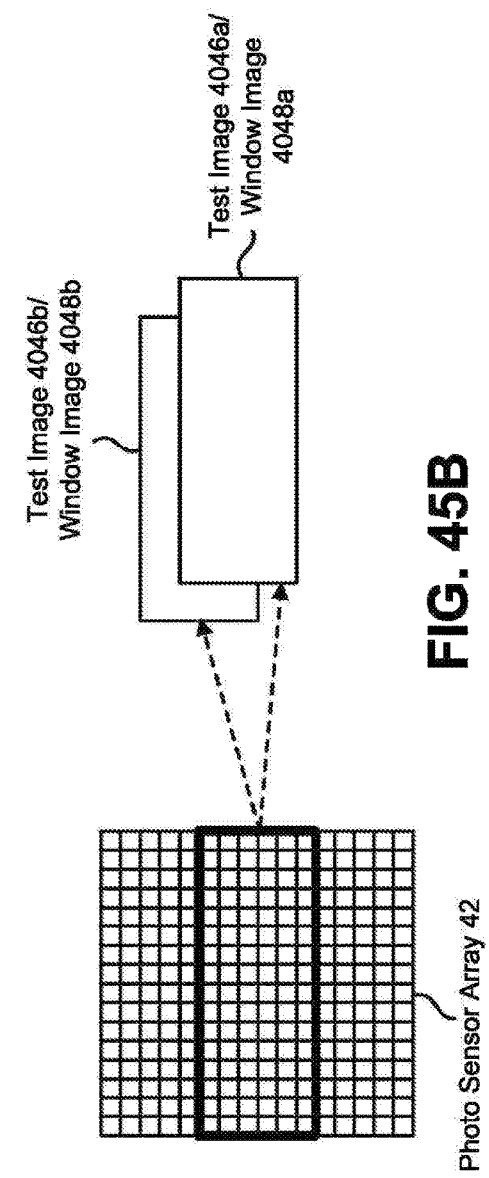

FIG. 44 illustrates another example of a method 4036 that may be performed by the barcode-reading application 24 in accordance with the present disclosure. The barcode-reading application 24 may be configured to cause the photo sensor array 42 to capture 4038 a plurality of test images 4046a-b (shown in FIGS. 45A and 45B) of at least a portion of a barcode. The plurality of test images 4046a-b may be captured 4038 using a rolling shutter mode of operation or using a global shutter mode of operation. As shown in FIG. 45A, the plurality of test images 4046a-b may correspond to different sections of the photo sensor array 42. In other words, a first section of the photo sensor array 42 may be exposed and read out in order to capture the first test image 4046a, and a second section of the photo sensor array 42 may be exposed and read out in order to capture the second test image 4046b. Alternatively, as shown in FIG. 45B, the plurality of test images 4046a-b may correspond to the same section of the photo sensor array 42. In other words, the same section of the photo sensor array 42 may be exposed and read out in order to capture both test images 4046a-b.

The barcode-reading application 24 may be configured to cycle through 4040 a plurality of configurations of the plurality of illumination systems while the plurality of test images 4046a-b are being captured. Each illumination system configuration may be used as a sole source of illumination for at least one test image 4046. Each test image 4046 may therefore be considered to be a window image 4048 corresponding to a particular illumination system configuration. In other words, the plurality of test images 4046a-b may comprise a plurality of window images 4048a-b. Each window image 4048 may correspond to a different one of the plurality of test images 4046a-b. Each window image 4048 may correspond to a different one of the plurality of illumination system configurations.

For example, a first test image 4046a and a second test image 4046b may be captured. The diffuse bright field illumination system may be activated and the dark field illumination system may be deactivated while the first test image 4046a is being captured. Conversely, the dark field illumination system may be activated and the bright field illumination system may be deactivated while the second test image 4046b is being captured. The first test image 4046a may be considered to be a window image 4048a corresponding to the bright field illumination system. The second test image 4046b may be considered to be a window image 4048b corresponding to the dark field illumination system.

Alternatively, the bright field illumination system may be activated at 60% power and the dark field illumination system may be activated at 40% power while the first test image 4046a is being captured. The bright field illumination system may be activated at 40% power and the dark field illumination system may be activated at 60% power while the second test image 4046b is being captured.

Returning to FIG. 44, the barcode-reading application 24 may also be configured to determine 4042 a selected illumination system configuration. The selected illumination system configuration may be the configuration of the plurality of illumination systems that yielded a window image 4048 having the highest quality among the plurality of window images 4048a-b. The barcode-reading application 24 may also be configured to cause the photo sensor array 42 to capture 4044 a subsequent image using the selected illumination system configuration.

In the examples that are shown in FIGS. 45A and 45B, the width of the test images 4046a-b and window images 4048a-b are equal to the width of the photo sensor array 42. Alternatively, however, the width of the test images and window images may be less than the width of the photo sensor array 42.

Figure 46:
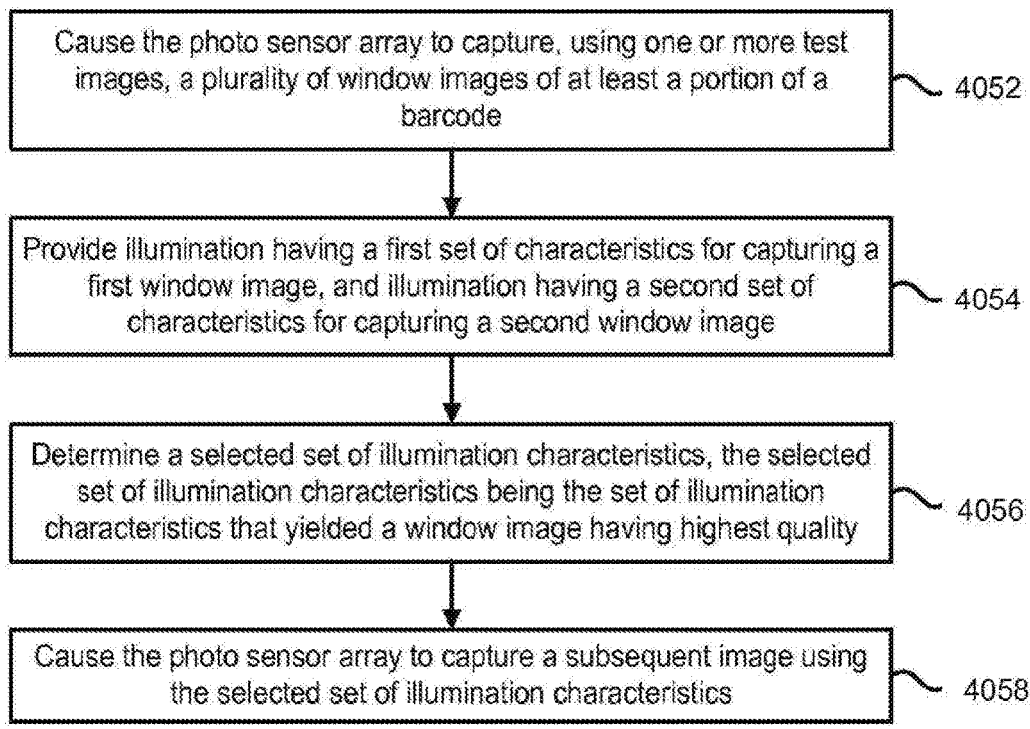
FIG. 46 illustrates another example of a method that may be performed by the barcode-reading application in accordance with the present disclosure.

FIG. 46 illustrates another example of a method 4050 that may be performed by the barcode-reading application 24 in accordance with the present disclosure. The barcode-reading application 24 may be configured to cause the photo sensor array 42 to capture 4052, using one or more test images, a plurality of window images of at least a portion of a barcode.

The plurality of window images may include a first window image and a second window image. The barcode-reading application 24 may be configured to provide 4054 illumination having a first set of illumination characteristics for capturing the first window image and illumination having a second set of illumination characteristics (different than the first set of illumination characteristics) for capturing the second window image. In this context, a "set of illumination characteristics" may include multiple illumination characteristics, or only a single illumination characteristic. Some examples of different illumination characteristics were described above.

Different illumination systems may be utilized to provide illumination having different illumination characteristics. Alternatively, a single illumination system may be utilized, but the illumination system may be capable of providing illumination having different illumination characteristics.

The barcode-reading application 24 may also be configured to determine 4056 a selected set of illumination characteristics. The selected set of illumination characteristics may be the set of illumination characteristics that yielded a window image having the highest quality among the plurality of window images.

As indicated above, the quality of a window image may be measured in terms of image contrast. Therefore, determining 4056 the selected set of illumination characteristics may include determining which window image of the plurality of window images has the highest contrast between light and dark cells of the barcode, and determining which set of illumination characteristics was utilized when the window image having the highest contrast was captured.

Alternatively, as indicated above, the quality of a window image may be measured in terms of the presence of desired barcode features and/or patterns. Therefore, determining 4056 the selected set of illumination characteristics may include determining which window image of the plurality of window images has the most favorable score/metric based on features or patterns of the barcode, and determining which set of illumination characteristics was utilized when the window image having the most favorable score/metric was captured.

The barcode-reading application 24 may also be configured to cause the photo sensor array 42 to capture 4058 a subsequent image using the selected set of illumination characteristics. The subsequent image may be captured using a global shutter or a rolling shutter mode of operation. As indicated above, the test image(s) may include a portion of a barcode but the subsequent image may include an entire barcode.

Figure 47:
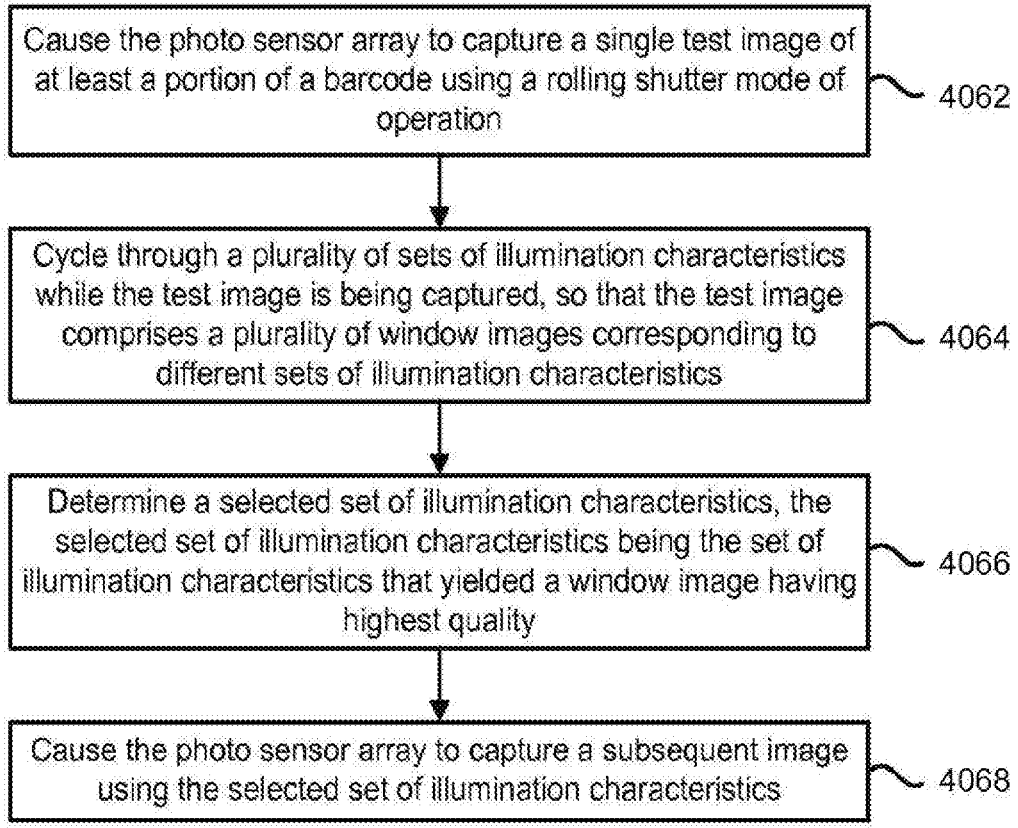
FIG. 47 illustrates another example of a method that may be performed by the barcode-reading application in accordance with the present disclosure.

FIG. 47 illustrates another example of a method 4060 that may be performed by the barcode-reading application 24 in accordance with the present disclosure. The barcode-reading application 24 may be configured to cause the photo sensor array 42 to capture 4062 a single test image (e.g., 4030 in FIG. 43A) of at least a portion of a barcode using a rolling shutter mode of operation. Windowing may be utilized, so that the test image 4030 may be smaller than a full photo sensor array image.

The barcode-reading application 24 may be configured to cycle 4064 through a plurality of sets of illumination characteristics while the test image 4030 is being captured, so that each set of illumination characteristics is utilized for a distinct time period while the single test image 4030 is being captured and is not otherwise utilized while the single test image 4030 is being captured. Consequently, the test image 4030 may include a plurality of window images 4026a-b, where each window image 4026 corresponds to a distinct band within the test image 4030, and where each window image 4026 corresponds to a distinct one of the plurality of sets of illumination characteristics.

For example, during exposure of a first section 4028a of the photo sensor array 42, a first set of illumination characteristics (e.g., direct, high intensity illumination) may be utilized. The window image 4026a may correspond to this first set of illumination characteristics. During exposure of a second section 4028b of the photo sensor array 42, a second set of illumination characteristics (e.g., angled, low intensity, diffuse illumination) may be utilized. The window image 4026b may correspond to this second set of illumination characteristics.

Alternatively, during exposure of the first section 4028a of the photo sensor array 42, both the bright field illumination system and the dark field illumination system may be activated, for example, with the bright field illumination system powered at 60% and the dark field illumination system powered at 40%. During exposure of the second section 4028b of the photo sensor array 42, both the bright field illumination system and the dark field illumination system may be activated, for example, with the bright field illumination system powered at 40% and the dark field illumination system powered at 60%.

The barcode-reading application 24 may also be configured to determine 4066 a selected set of illumination characteristics. The selected set of illumination characteristics may be the set of illumination characteristics that yielded a window image 4026 having the highest quality among the plurality of window images 4026a-b. The barcode-reading application 24 may also be configured to cause the photo sensor array 42 to capture 4068 a subsequent image using the selected set of illumination characteristics.

Figure 48:
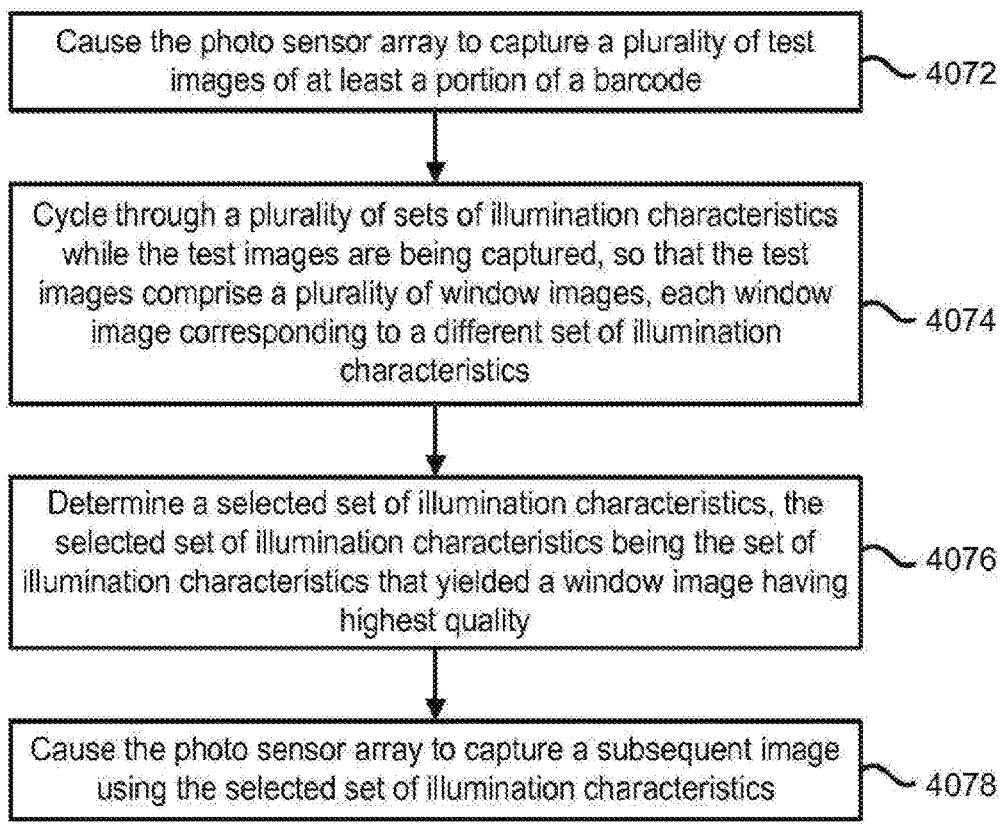
FIG. 48 illustrates another example of a method that may be performed by the barcode-reading application in accordance with the present disclosure.

FIG. 48 illustrates another example of a method 4070 that may be performed by the barcode-reading application 24 in accordance with the present disclosure. The barcode-reading application 24 may be configured to cause the photo sensor array 42 to capture 4072 a plurality of test images (e.g., 4046a-b in FIGS. 45A and 45B) of at least a portion of a barcode. The plurality of test images 4046a-b may be captured using a rolling shutter mode of operation or using a global shutter mode of operation.

The plurality of test images may correspond to different sections of the photo sensor array 42 (as shown in FIG. 45A), or to the same section of the photo sensor array 42 (as shown in FIG. 45B).

The barcode-reading application 24 may be configured to cycle 4074 through a plurality of sets of illumination characteristics while the plurality of test images 4046a-b are being captured. Each set of illumination characteristics may be used as the sole source of illumination for at least one test image 4046. Each test image 4046 may therefore be considered to be a window image 4048 corresponding to a particular set of illumination characteristics. In other words, the plurality of test images 4046a-b may include a plurality of window images 4048*a-b*, where each window image 4048 may correspond to a different one of the plurality of test images 4046*a-b*, and where each window image 4048 may correspond to a different one of the plurality of sets of illumination characteristics.

The barcode-reading application 24 may also be configured to determine 4076 a selected set of illumination characteristics. The selected set of illumination characteristics may be the set of illumination characteristics that yielded a window image having the highest quality among the plurality of window images. The barcode-reading application 24 may also be configured to cause the photo sensor array 42 to capture 4078 a subsequent image using the selected set of illumination characteristics.

Figure 49:
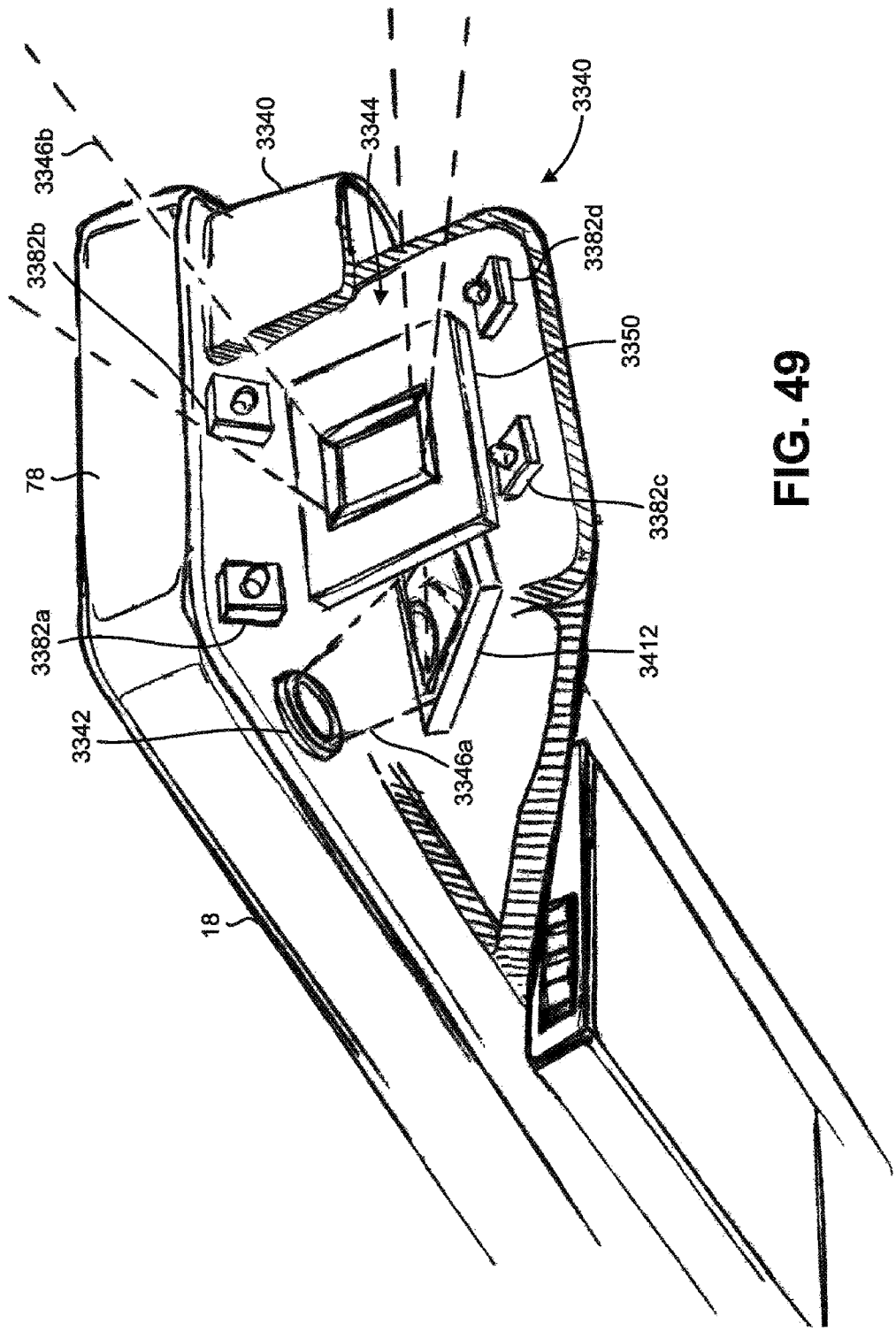
FIG. 49 illustrates an example of an attachment attached to a mobile device in accordance with another embodiment of the present disclosure.

FIG. 49 illustrates an example of an attachment 3340 attached to a mobile device in accordance with another embodiment of the present disclosure. The attachment 3340 is configured to fold the optical axis 3345*a* and the field of view 3346*a* of the camera of the mobile device 18 to the top part of the mobile device 18, as shown in FIG. 36.

The attachment 3340 includes a supplementary optic system 3410. The supplementary optic system 3410 may include at least one of a supplementary lens system 3342, a supplementary illumination system 3344, and a reflective surface 3412 which redirects the field of view 3346*a* and the optical axis (as modified by the supplementary lens system 3342) from its original direction to the field of view 3346*b* in a redirected direction extending into the area around the top edge 78 of the mobile device 18.

In FIG. 49, the reflective surface 3412 is shown at approximately 45 degrees such that the field of view 3346*b* is approximately 90 degrees, similar to that of the attachment 110 depicted in FIG. 10C. However, the reflective surface 3412 may be positioned at other angles (for example, the angle depicted in FIG. 10D).

Similar to FIGS. 34A, 34B, and 35, the supplementary lens system 3342 is depicted as a single lens for illustration purposes only and the supplementary lens system 3342 may be any of the supplementary lens systems described herein including those described with respect to FIGS. 6A, 6B, 10A, 10B, 10C, 13, 14, and 15.

Although FIG. 49 depicts the attachment 3340 as an encapsulating attachment, the supplementary optic system 3410 including the supplementary lens system 3342 and the supplementary illumination system 3344 may be implemented in any of the mounted attachments, corner-positioned attachments, and encapsulating attachments described herein.

Similar to the embodiment depicted in FIGS. 34A, 34B and 36, the supplementary illumination system 3344 of the attachment 3340 in FIG. 49 may include at least two exposure illumination systems such as a diffuse bright field illumination system 3350 and a dark field illumination system 3381.

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode-reading system for a mobile device, the mobile device comprising a camera configured to capture an image of a barcode in a field of view of the camera, a white light source configured to project a field of illumination into the field of view of the camera, a memory, and a processor, the barcode-reading system comprising:
   a barcode-reading enhancement accessory secured to the mobile device, the barcode-reading enhancement accessory comprising an optic system that is positioned within the field of illumination of the white light source, the optic system comprising a dark field illumination system that directs illumination from the white light source into the field of view of the camera at a non-zero angle relative to an optical axis of the camera; and
   a barcode-reading application stored in the memory of the mobile device and executable by the processor of the mobile device.

2. The barcode-reading system of claim 1, wherein the non-zero angle comprises an angle greater than 45 degrees relative to the optical axis of the camera.

3. The barcode-reading system of claim 1, wherein the dark field illumination system comprises:
   at least one light pipe that directs the illumination from the white light source to a periphery of the field of view of the camera; and
   at least one prism optic that redirects the illumination from the white light source into the field of view of the camera at the non-zero angle relative to the optical axis of the camera.

4. The barcode-reading system of claim 3, wherein:
   the at least one light pipe is oriented substantially parallel to the optical axis of the camera; and
   the at least one light pipe uses total internal reflection to propagate the illumination from the white light source toward the at least one prism optic.

5. The barcode-reading system of claim 3, wherein:
   the at least one light pipe comprises a chamfered end; and
   the at least one prism optic comprises the chamfered end of the at least one light pipe.

6. The barcode-reading system of claim 1, wherein the optic system further comprises a filter that passes a narrow band of the illumination from the white light source.

7. The barcode-reading system of claim 1, wherein:
   the barcode-reading enhancement accessory further comprises a supplementary optic system that is positioned within the field of view of the camera; and
   the supplementary optic system comprises a narrow band filter.

8. The barcode-reading system of claim 1, wherein the barcode-reading enhancement accessory further comprises:
   a first reflective surface that is configured to fold the field of view of the camera from its initial direction extending generally perpendicular from a back side of the mobile device to a folded direction extending into a region around a top side of the mobile device; and
   a second reflective surface that is configured to fold the illumination from the white light source toward the region around the top side of the mobile device.

9. The barcode-reading system of claim 1, wherein the barcode-reading enhancement accessory further comprises:
a reflective surface that is configured to fold the field of view of the camera from its initial direction extending generally perpendicular from a back side of the mobile device to a folded direction extending into a region around a top side of the mobile device; and
at least one light pipe that is configured to use total internal reflection to propagate the illumination from the white light source toward the region around the top side of the mobile device.

10. The barcode-reading system of claim 1, wherein the barcode-reading application comprises:
an image capture function configured to control the white light source and the camera to capture the image of the barcode; and
a decoder function configured to receive the image of the barcode and generate decoded data representing data encoded in the barcode.

11. A barcode-reading system for a mobile device, the mobile device comprising a camera configured to capture an image of a barcode in a field of view of the camera, a white light source configured to project a field of illumination into the field of view of the camera, a memory, and a processor configured to execute an operating system and one or more applications stored in the memory, the barcode-reading system comprising:
a barcode-reading enhancement accessory secured to the mobile device, the barcode-reading enhancement accessory comprising at least one optic system, the at least one optic system being positioned within the field of illumination of the white light source and comprising a dark field illumination system that directs illumination from the white light source into the field of view of the camera at an angle greater than 45 degrees relative to an optical axis of the camera; and
a barcode-reading application stored in the memory of the mobile device and executable by the processor of the mobile device, the barcode-reading application including:
an image capture function configured to control the white light source and the camera to capture the image of the barcode; and
a decoder function configured to receive the image of the barcode and generate decoded data representing data encoded in the barcode.

12. The barcode-reading system of claim 11, wherein the dark field illumination system comprises:
at least one light pipe that directs the illumination from the white light source to a periphery of the field of view of the camera; and
at least one prism optic that redirects the illumination from the white light source into the field of view of the camera at the angle greater than 45 degrees relative to the optical axis of the camera.

13. The barcode-reading system of claim 12, wherein:
the at least one light pipe is oriented substantially parallel to the optical axis of the camera; and
the at least one light pipe uses total internal reflection to propagate the illumination from the white light source toward the at least one prism optic.

14. The barcode-reading system of claim 12, wherein:
the at least one light pipe comprises a chamfered end; and
the at least one prism optic comprises the chamfered end of the at least one light pipe.

15. The barcode-reading system of claim 11, wherein the at least one optic system further comprises a filter that passes a narrow band of the illumination from the white light source.

16. The barcode-reading system of claim 11, wherein:
the barcode-reading enhancement accessory further comprises a supplementary optic system that is positioned within the field of view of the camera; and
the supplementary optic system comprises a narrow band filter.

17. The barcode-reading system of claim 11, wherein the barcode-reading enhancement accessory further comprises:
a first reflective surface that is configured to fold the field of view of the camera from its initial direction extending generally perpendicular from a back side of the mobile device to a folded direction extending into a region around a top side of the mobile device; and
a second reflective surface that is configured to fold the illumination from the white light source toward the region around the top side of the mobile device.

18. The barcode-reading system of claim 11, wherein the barcode-reading enhancement accessory further comprises:
a reflective surface that is configured to fold the field of view of the camera from its initial direction extending generally perpendicular from a back side of the mobile device to a folded direction extending into a region around a top side of the mobile device; and
at least one light pipe that is configured to use total internal reflection to propagate the illumination from the white light source toward the region around the top side of the mobile device.

19. The barcode-reading system of claim 11, wherein the barcode-reading application further comprises a relay function configured to send the decoded data to a remote server via a wireless connection established between the mobile device and a network.

20. A barcode-reading enhancement accessory for a mobile device, the mobile device comprising a camera and a white light source, the barcode-reading enhancement accessory comprising:
a dark field illumination system configured to direct illumination from the white light source into a field of view of the camera at a non-zero angle relative to an optical axis of the camera;
at least one light pipe within the dark field illumination system, the at least one light pipe being configured to direct the illumination from the white light source to a periphery of the field of view of the camera; and
at least one prism optic that redirects the illumination from the white light source into the field of view of the camera at the non-zero angle relative to the optical axis of the camera.

* * * * *